United States Patent
Park et al.

(10) Patent No.: US 9,985,709 B2
(45) Date of Patent: May 29, 2018

(54) METHOD FOR REPORTING CHANNEL STATE INFORMATION FOR THREE-DIMENSIONAL BEAMFORMING IN WIRELESS COMMUNICATION SYSTEM AND DEVICE THEREFOR

(71) Applicant: LG ELECTRONICS INC., Seoul (KR)

(72) Inventors: Jonghyun Park, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 201 days.

(21) Appl. No.: 14/760,439

(22) PCT Filed: Jan. 14, 2014

(86) PCT No.: PCT/KR2014/000388
§ 371 (c)(1),
(2) Date: Jul. 10, 2015

(87) PCT Pub. No.: WO2014/109622
PCT Pub. Date: Jul. 17, 2014

(65) Prior Publication Data
US 2015/0358060 A1 Dec. 10, 2015

Related U.S. Application Data

(60) Provisional application No. 61/752,420, filed on Jan. 14, 2013, provisional application No. 61/766,670, filed on Feb. 19, 2013.

(51) Int. Cl.
*H04B 7/04* (2017.01)
*H04B 7/06* (2006.01)

(52) U.S. Cl.
CPC ......... *H04B 7/0632* (2013.01); *H04B 7/0473* (2013.01); *H04B 7/0617* (2013.01)

(58) Field of Classification Search
CPC ... H04B 7/0473; H04B 7/0617; H04B 7/0632
See application file for complete search history.

(56) References Cited

U.S. PATENT DOCUMENTS

2005/0135498 A1 * 6/2005 Yee ................... H04L 1/0631
375/267
2010/0027697 A1 2/2010 Malladi et al.
(Continued)

FOREIGN PATENT DOCUMENTS

| CN | 101800628 A | 8/2010 |
| CN | 101834707 A | 9/2010 |

(Continued)

OTHER PUBLICATIONS

3GPP, "3rd Generation Partnership Project; Technical Specification Group Radio Access Network; Evolved Universal Terrestrial Radio Access (E-UTRA); Physical layer procedures (Release 9)," 3GPP TS 36.213 V9.1.0, Mar. 2010, pp. 1-83.

(Continued)

*Primary Examiner* — Wei Zhao
(74) *Attorney, Agent, or Firm* — Birch, Stewart, Kolasch & Birch, LLP

(57) ABSTRACT

A method for transmitting channel state information (CSI) for 3-dimensional multi-input multi-output (3D-MIMO) beamforming by a user equipment (UE) in a wireless communication system, and the UE therefore are discussed. The method includes, for example, receiving a reference signal from a base station supporting a 2-dimensional (2D) antenna array; determining the CSI using the reference signal; and transmitting the determined CSI to the base station. The CSI comprises a channel quality indicator (CQI). The CQI is determined using a codeword-to-layer (Continued)

mapping rule. A codeword-to-layer mapping rule for a first dimension is different from a codeword-to-layer mapping rule for a second dimension. The first dimension and the second dimension each correspond to a horizontal or vertical direction in the 2D antenna array.

9 Claims, 23 Drawing Sheets

(56) References Cited

U.S. PATENT DOCUMENTS

| | | | |
|---|---|---|---|
| 2010/0177653 A1 | 7/2010 | Luo et al. | |
| 2011/0122819 A1* | 5/2011 | Jongren | H04L 1/1635 370/328 |
| 2011/0274075 A1 | 11/2011 | Lee et al. | |
| 2011/0305289 A1 | 12/2011 | Lee et al. | |
| 2012/0033643 A1* | 2/2012 | Noh | H04L 1/0083 370/335 |

FOREIGN PATENT DOCUMENTS

| | | |
|---|---|---|
| CN | 101958773 A | 1/2011 |
| CN | 102273117 A | 12/2011 |
| KR | 10-2009-0093388 A | 9/2009 |
| KR | 10-2010-0096016 A | 9/2010 |
| KR | 10-2010-0099650 A | 9/2010 |
| WO | WO 2011/087272 A2 | 7/2011 |
| WO | 2011/138979 A1 | 11/2011 |

OTHER PUBLICATIONS

Alcatel-Lucent Shanghai Bell et al., "Considerations on CSI feedback enhancements for high-priority antenna configurations," 3GPP TSG-RAN WG1 #66, R1-112420, Athens, Greece, Aug. 22-26, 2011, 7 pages.

Lee et al., "Mimo Technologies in 3GPP LTE and LTE-Advanced," EURASIP Journal on Wireless Communications and Networking, vol. 48, No. 10, Jan. 2009, pp. 1-10.

* cited by examiner (a) control-plane protocol stack (b) user-plane protocol stack ▨ : DMRS group 1

▩ : DMRS group 2

Examples of CW-to-layer mapping
— Option 1b: 
— Option 2b: 
⋮

METHOD FOR REPORTING CHANNEL STATE INFORMATION FOR THREE-DIMENSIONAL BEAMFORMING IN WIRELESS COMMUNICATION SYSTEM AND DEVICE THEREFOR

CROSS REFERENCE TO RELATED APPLICATIONS

This application is the National Phase of PCT/KR2014/000388 filed on Jan. 14, 2014, which claims priority under 35 U.S.C. 119(e) to U.S. Provisional Application No. 61/752,420 filed on Jan. 14, 2013 and U.S. Provisional Application No. 61/766,670 filed on Feb. 19, 2013, all of which are hereby expressly incorporated by reference into the present application.

TECHNICAL FIELD

The present invention relates to a wireless communication system and, more particularly, to a method for reporting channel state information (CSI) for 3-dimensional (3D) beamforming in a wireless communication system, and an apparatus therefor.

BACKGROUND ART

A structure of an LTE system which is an example of a wireless communication system to which the present invention may be applied will be described with reference to FIG. 1.

FIG. 1 illustrates a schematic structure a network structure of an evolved universal mobile telecommunication system (E-UMTS). An E-UMTS system is an evolved version of the UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist for one BS. The cell provides a downlink or uplink transmission service to several UEs using any one of bandwidths of 1.4, 3, 5, 10, 15 and 20 MHz. Different cells may be set to provide different bandwidths. A BS controls data transmission or reception to or from a plurality of UEs. The BS transmits downlink scheduling information to a UE with respect to downlink (DL) data so as to inform the UE of time/frequency domain, coding, data size, Hybrid Automatic Repeat and reQuest (HARQ) associated information of data to be transmitted, or the like. The BS transmits uplink scheduling information to a UE with respect to uplink (UL) data so as to inform the UE of time/frequency domain, coding, data size, HARQ associated information used by the UE, or the like. An interface for transmitting user traffic or control traffic can be used between BSs. A Core Network (CN) may include the AG, a network node for user registration of the UE, or the like. The AG manages mobility of a UE on a Tracking Area (TA) basis. One TA includes a plurality of cells.

Wireless communication technology has been developed to reach the LTE based on Wideband Code Division Multiple Access (WCDMA), but demands and expectations of users and providers have continuously increased. In addition, since other aspects of wireless access technology continue to evolve, new advances are required to remain competitive in the future. There is a need for reduction in cost per bit, service availability increase, the use of a flexible frequency band, a simple structure and an open type interface, appropriate power consumption of a UE, etc.

Multiple-Input Multiple-Output (MIMO) technology is a technology capable of improving data transmission/reception efficiency using multiple transmit (Tx) antennas and multiple receive (Rx) antennas instead of using a single Tx antenna and a single Rx antenna. A receiver using a single antenna receives data through a single antenna path, but a receiver using multiple antennas receives data through multiple paths. Accordingly, data transfer rate and data throughput may be improved, and coverage may be expanded.

To increase a multiplexing gain of MIMO operation, a MIMO transmitter may receive and use channel state information (CSI) fed back from a MIMO receiver.

DISCLOSURE

Technical Problem

An object of the present invention devised to solve the problem lies in a method for reporting channel state information (CSI) for 3-dimensional (3D) beamforming in a wireless communication system, and an apparatus therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The object of the present invention can be achieved by providing a method for transmitting channel state information (CSI) by a user equipment (UE) in a wireless communication system, the method including receiving a reference signal from a base station supporting a 2-dimensional (2D) antenna array, determining the CSI using the reference signal, and transmitting the determined CSI to the base station. The CSI may include a channel quality indicator (CQI), and the CQI may be determined using a codeword-to-layer mapping rule. A codeword-to-layer mapping rule for a first dimension may be different from a codeword-to-layer mapping rule for a second dimension.

In another aspect of the present invention, provided herein is a user equipment (UE) for transmitting channel state information (CSI) in a wireless communication system, the UE including a transmission module, a reception module, and a processor. The processor may be configured to receive a reference signal from a base station supporting a 2-dimensional (2D) antenna array, using the reception module, to determine the CSI using the reference signal, and to transmit the determined CSI to the base station using the transmission module. The CSI may include a channel quality indicator (CQI), and the CQI may be determined using a codeword-to-layer mapping rule. A codeword-to-layer mapping rule for a first dimension may be different from a codeword-to-layer mapping rule for a second dimension.

The following is commonly applicable to the above aspects of the present invention.

The codeword-to-layer mapping rule for the first dimension may be defined to map multiple layers of the first dimension to multiple codewords to be as evenly distributed as possible. The codeword-to-layer mapping rule for the second dimension may be defined to map all of multiple layers of the second dimension to one codeword.

The codeword-to-layer mapping rule for the first dimension may be defined to map multiple layers of the first dimension to multiple codewords to be as evenly distributed as possible. The codeword-to-layer mapping rule for the second dimension may be defined to include a first mapping type for mapping all of multiple layers of the second dimension to one codeword, and a second mapping type for mapping multiple layers of the second dimension to multiple codewords to be as evenly distributed as possible.

A number of cases of the first mapping type may be greater than a number of cases of the second mapping type. A sum of the number of cases of the first mapping type and the number of cases of the second mapping type may equal a number of the multiple layers of the first dimension.

The number of cases of the second mapping type may be 1.

The first dimension may correspond to a horizontal direction of the 2D antenna array, and the second dimension may correspond to a vertical direction of the 2D antenna array.

The first dimension may correspond to a vertical direction of the 2D antenna array, and the second dimension may correspond to a horizontal direction of the 2D antenna array.

According to the codeword-to-layer mapping rule for the first dimension and the codeword-to-layer mapping rule for the second dimension, a CQI for one codeword may be calculated using an average of signal-to-interference plus noise ratio (SINR) values of multiple layers corresponding to the codeword.

Multiple CQIs may be determined based on a plurality of candidates of the codeword-to-layer mapping rule, and the CSI including the multiple CQIs may be transmitted.

When periodic CSI feedback is applied, the multiple CQIs may be transmitted at different transmission timings.

One CQI may be determined based on a plurality of candidates of the codeword-to-layer mapping rule, and the CSI including the CQI may be transmitted.

Information indicating the codeword-to-layer mapping rule may be provided from the base station to the UE through higher layer signaling or dynamic signaling.

The dynamic signaling may include information for triggering aperiodic CSI transmission.

It is to be understood that both the foregoing general description and the following detailed description of the present invention are exemplary and explanatory and are intended to provide further explanation of the invention as claimed.

Advantageous Effects

According to an embodiment of the present invention, channel state information (CSI) for 3-dimensional (3D) beamforming may be accurately and efficiently reported in a wireless communication system.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention.

BEST MODE

Reference will now be made in detail to the preferred embodiments of the present invention, examples of which are illustrated in the accompanying drawings. The following embodiments are examples in which the technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In this specification, the term base station may be comprehensively used to include remote radio head (RRH), evolved node B (eNB), transmission point (TP), reception point (RP), relay, etc.

Figure 1:
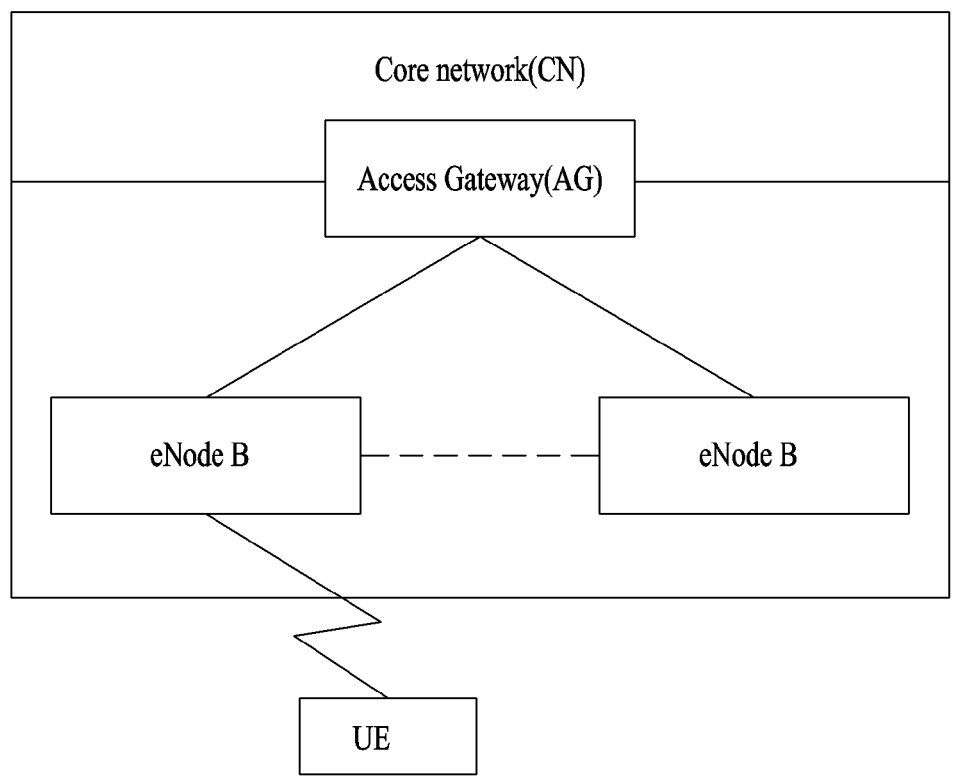
FIG. 1 is a schematic diagram showing a network architecture of an Evolved Universal Mobile Telecommunications System (E-UMTS) as an example of a mobile communication system.
Figure 2:
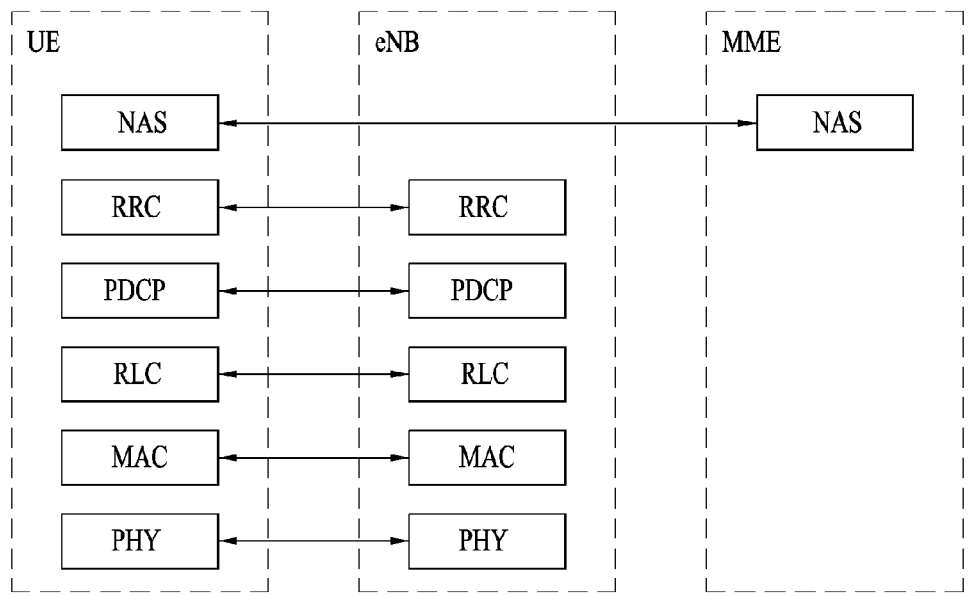
FIG. 2 is a diagram showing the structure of a control plane and a user plane of a radio interface protocol between a User Equipment (UE) and an E-UTRAN based on the 3GPP radio access network standard.
Figure 2:
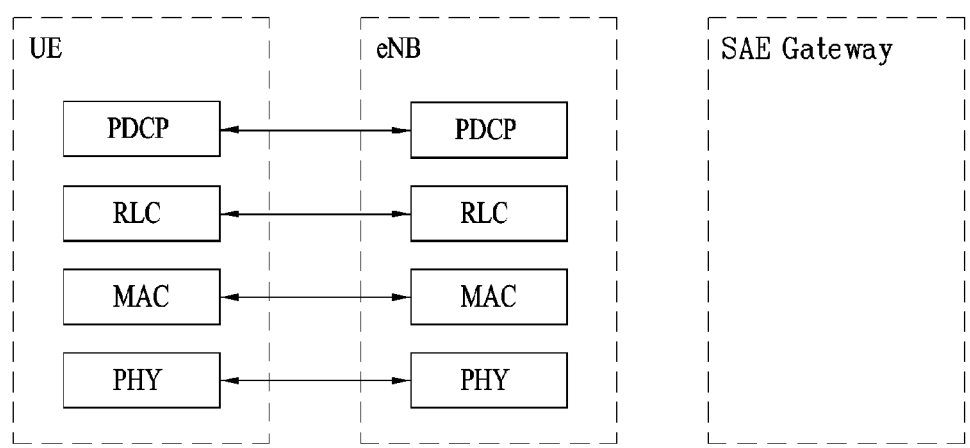

FIG. 2 is a diagram showing the structure of a control plane and a user plane of a radio interface protocol between a UE and an E-UTRAN based on the 3GPP radio access network standard. The control plane refers to a path through which control messages used for managing a call by the UE and the E-UTRAN are transmitted. The user plane refers to a path through which data generated at an application layer, for example, voice data, Internet packet data or the like is transmitted.

The physical layer, which is the first layer, provides an information transfer service to a higher layer using a physical channel. The physical layer is connected with a medium access control (MAC) layer located at a higher level through a transport channel, and data is transferred between the MAC layer and the physical layer via the transport channel. Data is transferred between physical layers of a transmission side and a reception side via the physical channel. The physical channel uses time and frequency as radio resources. In detail, the physical channel is modulated using an Orthogonal Frequency Division Multiple Access (OFDMA) scheme in downlink and is modulated using a Single Carrier Frequency Division Multiple Access (SC-FDMA) scheme in uplink.

The MAC layer of the second layer provides services to a radio link control (RLC) layer, which is a higher layer, via a logical channel. The RLC layer of the second layer enables reliable data transmission. The function of the RLC layer is included as the functional block of the MAC layer. A Packet Data Convergence Protocol (PDCP) layer of the second layer performs a header compression function that reduces the size of an Internet protocol (IP) packet header containing unnecessary control information having a relatively large size in order to efficiently transmit the IP packets such as IPv4 or IPv6 packets over a radio interface having a limited bandwidth.

A Radio Resource Control (RRC) located at a lowest portion of the third layer is defined only in the control plane. The RRC layer handles logical channels, transport channels and physical channels for the configuration, re-configuration and release of Radio Bearers (RBs). Here, the RBs refer to services provided by the second layer, for data transfer between the UE and the network. The RRC layers of the UE and the network exchange RRC messages with each other. If the RRC layers of the UE and the network are RRC-connected, the UE is in an RRC connected mode and, if so not, is in an RRC idle mode. A Non-Access Stratum (NAS) layer located at a layer higher than the RRC layer performs a function such as session management and mobility management.

One cell configuring a base station (eNB) provides a downlink or uplink transmission service to several UEs using any one of bandwidths of 1.4, 3, 5, 10, 15 and 20 MHz. Different cells may be set to provide different bandwidths.

Examples of a downlink transport channel for transmitting data from the network to the UE include a Broadcast Channel (BCH) for transmitting system information, a Paging Channel (PCH) for transmitting a paging message, or a downlink Shared Channel (SCH) for transmitting user traffic or a control message. Traffic or a control message of a broadcast service or downlink multicast may be transmitted through the downlink SCH or a separate downlink Multicast Channel (MCH). Examples of an uplink transport channel for transmitting data from the UE to the network include a Random Access Channel (RACH) for transmitting an initial control message and an uplink SCH for transmitting user traffic or a control message. Examples of a logical channel located at a layer above the transport channel and mapped to the transport channel includes a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
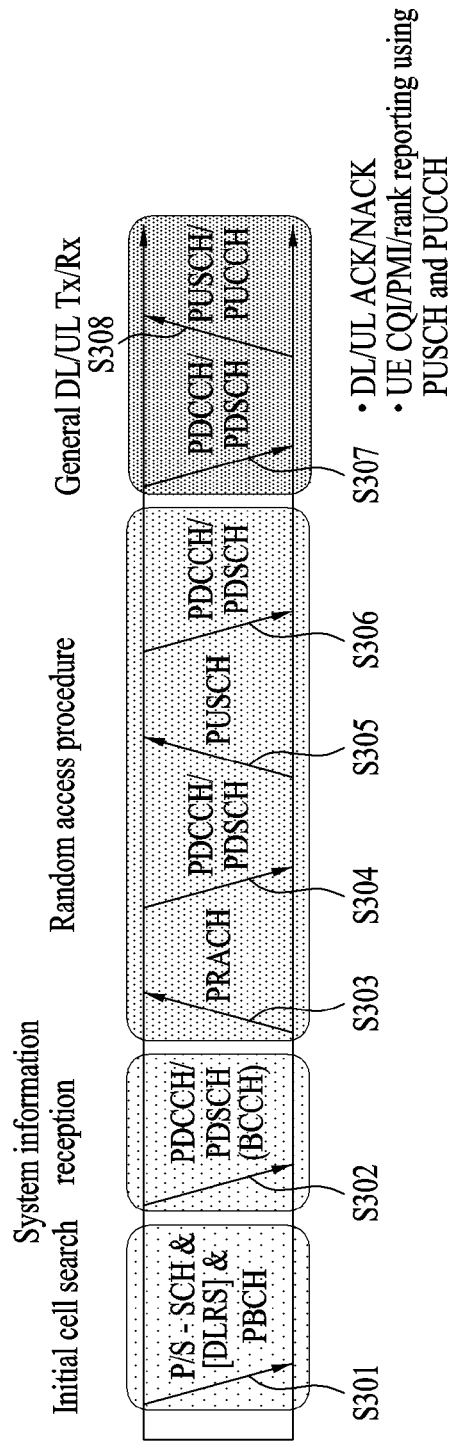
FIG. 3 is a diagram illustrating physical channels used in a 3GPP system and a general signal transmitting method using the same.

FIG. 3 is a diagram illustrating physical channels used in a 3GPP system and a general signal transmitting method using the same.

If a UE is powered on or newly enters a cell, the UE performs an initial cell search operation such as synchronization with a base station (S301). The UE receives a primary synchronization channel (P-SCH) and a secondary synchronization channel (S-SCH) from the base station so as to synchronize with the base station and to acquire information such as a cell ID. Thereafter, the UE may receive a physical broadcast channel from the base station so as to acquire a broadcast signal in the cell. The UE may receive a downlink reference signal (DL RS) so as to check a downlink channel state in the initial cell search step.

The UE, upon completion of initial cell search, may receive a Physical Downlink Control Channel (PDCCH) and a Physical Downlink Shared Channel (PDSCH) according to information carried in the PDCCH so as to acquire more detailed system information (S302).

When the UE initially accesses the base station or when radio resources for signal transmission are not present, the UE may perform a Random Access Procedure (RACH) with respect to the base station (steps S303 to S306). The UE may transmit a specific sequence using a preamble through a Physical Random Access Channel (PRACH) (S303 and S305) and receive a response message of the preamble through the PDCCH and the PDSCH corresponding thereto (S304 and S306). In the contention-based RACH, a contention resolution procedure may be additionally performed.

The UE which performs the above-described procedure may receive the PDCCH/PDSCH (S307) and transmit a Physical Uplink Shared Channel (PUSCH)/Physical Uplink Control Channel (PUCCH) (S308), as a general uplink/downlink signal transmission procedure. Specifically, the UE receives downlink control information (DCI) through the PDCCH. Here, the DCI includes control information such as resource allocation information for the UE, and has a different format depending on the use thereof.

Meanwhile, the information transmitted from the UE to the base station in uplink and transmitted from the base station to the UE may include a downlink/uplink ACK/NACK signal, a Channel Quality Indicator (CQI), a Precoding Matrix Index (PMI), a Rank Indicator (RI), etc. In the 3GPP LTE system, the UE may transmit the above-described information such as CQI/PMI/RI through the PUSCH and/or the PUCCH.

Figure 4:
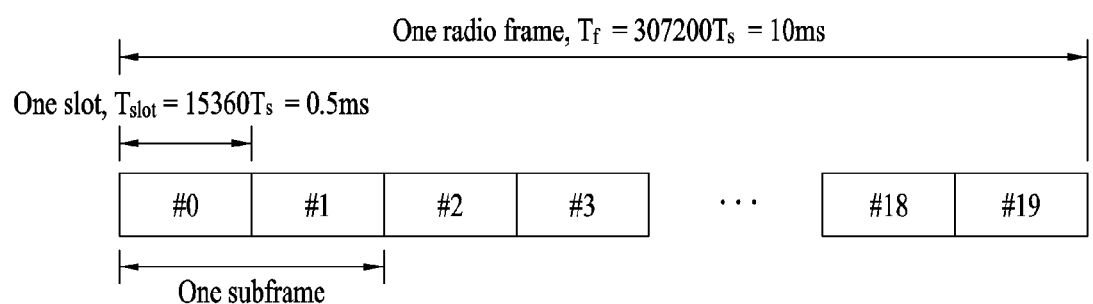
FIG. 4 illustrates exemplary radio frame structures in a LTE system.

FIG. 4 illustrates exemplary radio frame structures in a LTE system.

Referring to FIG. 4, a radio frame is 10 ms (307200 $T_s$) and divided into 10 equal-sized subframes. The 10 subframes of a radio frame may be indexed. Herein, $T_s$ represents a sampling time and $T_s=1/(2048*15\text{ kHz})$ (approximately, 33 ns). Each subframe is 1 ms long, including two slots. Each slot is 0.5 ms (15360 $T_s$) long. A slot includes a plurality of orthogonal frequency division multiplexing (OFDM) symbols in the time domain and a plurality of resource blocks (RBs) in the frequency time. In a LTE system, single resource block includes 12 (subcarriers)*7 (or 6) OFDM symbols. TTI (Transmission Time Interval), which is unit time for data transfer, can be defined by one or more subframes. The aforementioned structure of the radio frame is shown for exemplary purposes only. Thus, the number of subframes included in the radio frame or the number of slots included in the subframe or the number of OFDM symbols included in the slot may be modified in various manners.

Figure 5:
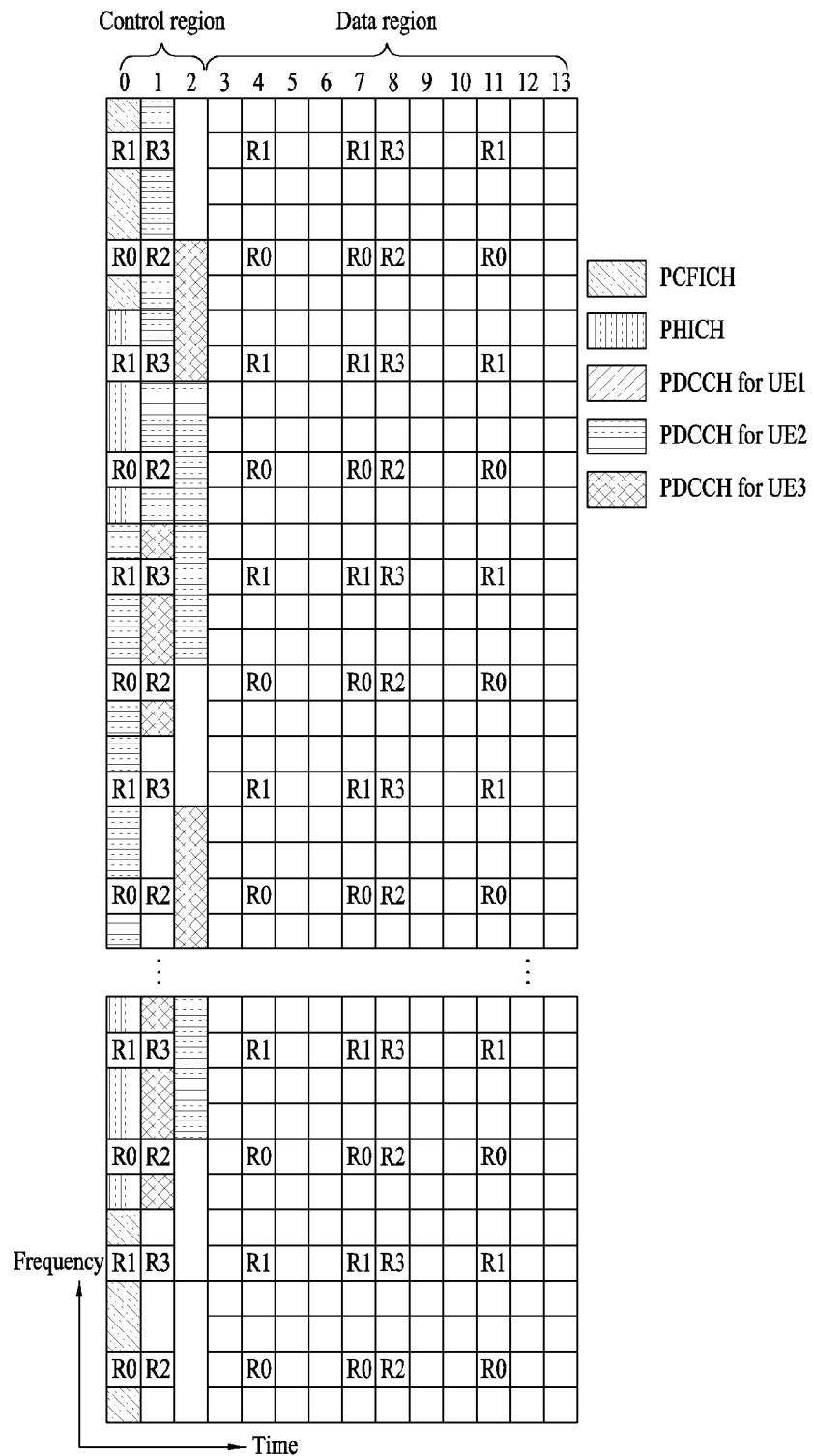
FIG. 5 illustrates a structure of a DL (DownLink) subframe in a LTE system.

FIG. 5 illustrates control channels included in a control region of one subframe in a downlink radio frame.

Referring to FIG. 5, the subframe consists of 14 OFDM symbols. Initial 1 to 3 OFDM symbols are used as the control region and the other 13 to 11 OFDM symbols are used as a data region depending on a subframe configuration. In this figure, R1 to R4 denote reference signals (RSs) (or pilot signals) for antennas 0 to 3. The RSs are fixed as a certain pattern in the subframe irrespective of the control region and the data region. The control channels are allocated to resources of the control region to which no RS is allocated, and traffic channels are allocated to resources of the data region to which no RS is allocated. The control channels allocated to the control region include a Physical Control Format Indicator Channel (PCFICH), a Physical HARQ (Hybrid-Automatic Repeat and Request) Indicator Channel (PHICH), a Physical Downlink Control Channel (PDCCH), etc.

The PCFICH signals the number of OFDM symbols used for the PDCCH in every subframe to the UE. The PCFICH is located in the first OFDM symbol and is configured prior to the PHICH and the PDCCH. The PCFICH consists of 4 resource element groups (REGs) each distributed over the control region based on cell identity (ID). One REG consists of 4 resource elements (REs). The RE refers to a minimum physical resource defined as one subcarrier×one OFDM symbol. The value of the PCFICH indicates one of values 1 to 3 or 2 to 4 depending on a bandwidth and is modulated through quadrature phase shift keying (QPSK).

The PHICH is used to carry HARQ ACK/NACK for uplink transmission. That is, the PHICH refers to a channel for transmitting DL ACK/NACK information for UL HARQ. The PHICH consists of 1 REG, and is scrambled cell-specifically. ACK/NACK is indicated using 1 bit, and is modulated through binary phase shift keying (BPSK). The modulated ACK/NACK is spread using a spreading factor (SF)=2 or 4. A plurality of PHICH channels mapped to the same resource form a PHICH group. The number of PHICH channels multiplexed into the PHICH group is determined depending on the number of spreading codes. The PHICH (group) is repeated 3 times to achieve diversity gain in the frequency domain and/or the time domain.

The PDCCH is allocated to initial n OFDM symbols of the subframe. Here, n is an integer equal to or greater than 1 and is indicated by the PCFICH. The PDCCH consists of one or more CCEs. The PDCCH signals information related to resource allocation of a Paging Channel (PCH) and a Downlink-Shared Channel (DL-SCH) which are transmission channels, uplink scheduling grant, HARQ information, etc. to each UE or UE group. The PCH and the DL-SCH are transmitted through a PDSCH. Accordingly, the base station and the UE generally transmit and receive data other than specific control information or specific service data through the PDSCH.

Information about a UE (or UEs) targeted by the data of the PDSCH, information about schemes for receiving and decoding the PDSCH data by the UEs, etc. are carried by the PDCCH. For example, it is assumed that a specific PDCCH is CRC-masked with radio network temporary identity (RNTI) "A" and information about data to be transmitted using radio resource (e.g., frequency location) "B" and DCI format (i.e., transmission format information (e.g., transmission block size, modulation scheme, coding information, etc.)) "C" is transmitted in a specific subframe. In this case, a UE within a cell monitors, i.e., blind-decodes, the PDCCH in a search area using RNTI information of the UE. If one or more UEs have RNTI "A", the UEs receive the PDCCH, and receive a PDSCH indicated by "B" and "C" using information of the received PDCCH.

Figure 6:
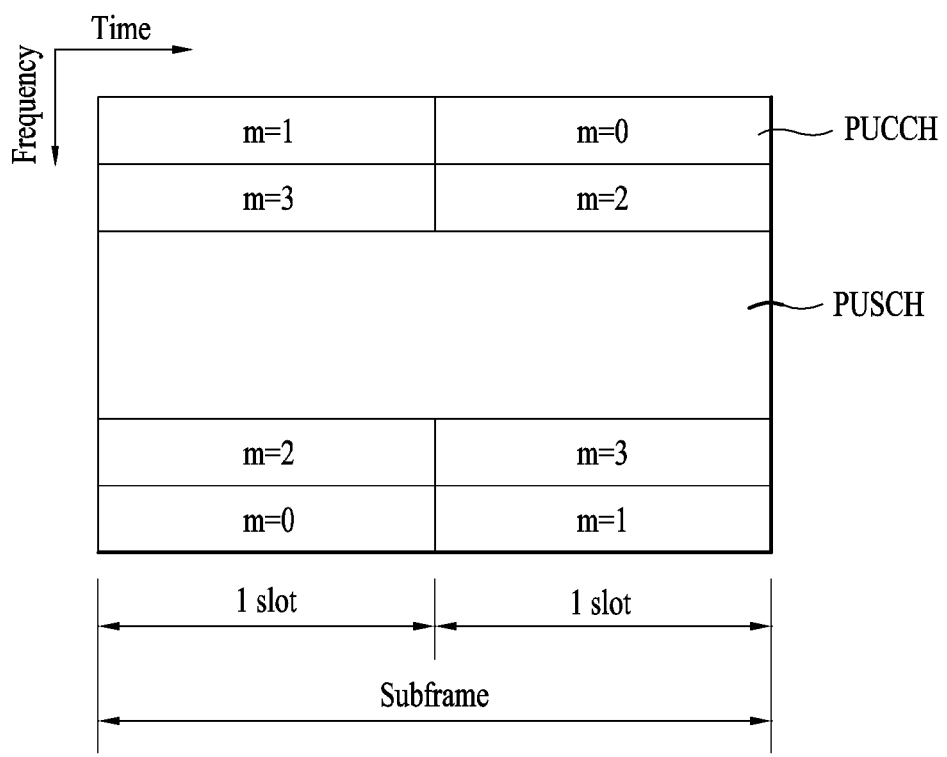
FIG. 6 illustrates the structure of a UL (UpLink) subframe in a LTE system.

FIG. 6 illustrates the structure of a UL subframe in a LTE system.

Referring to FIG. 6, the UL subframe can be divided into a region to which Physical Uplink Control Channels (PUCCHs) carrying control information are allocated, and a region to which Physical Uplink Shared Channels (PUSCHs) carrying user data are allocated. A middle part of the subframe is allocated for the PUSCHs, and two side parts of the data region in the frequency domain are allocated for the PUCCHs. The control information carried by the PUCCH includes ACK/NACK used for HARQ, a channel quality indicator (CQI) indicating DL channel state, a rank indicator (RI) for MIMO, a scheduling request (SR) which is a UL resource allocation request, etc. The PUCCH for one UE uses one resource block which occupies different frequencies in slots of the subframe. That is, 2 resource blocks allocated for the PUCCH are frequency hopped at a slot boundary. Specifically, FIG. 6 exemplarily shows that a PUCCH of m=0, a PUCCH of m=1, a PUCCH of m=2, and a PUCCH of m=3 are allocated to the subframe.

A description is now given of a MIMO system. Multiple-Input Multiple-Output (MIMO) is a method using multiple Tx antennas and multiple Rx antennas, and this method may improve transmission and reception efficiency of data. That is, a transmitter or receiver of a wireless communication system uses multiple antennas and thus the capacity and performance thereof may be improved. In the following description of the present invention, MIMO can be called 'multiple antenna technology'.

In the multiple antenna technology, reception of one whole message does not depend on a single antenna path. Instead, in the multiple antenna technology, data fragments received through multiple antennas are collected and combined to complete data. If the multiple antenna technology is used, a data transfer rate within a cell region of a specific size may be improved, or system coverage may be improved while ensuring a specific data transfer rate. In addition, this technology can be broadly used by mobile communication devices and relays. Due to the multiple antenna technology, restriction on mobile communication traffic based on a legacy technology using a single antenna can be solved.

Figure 7:
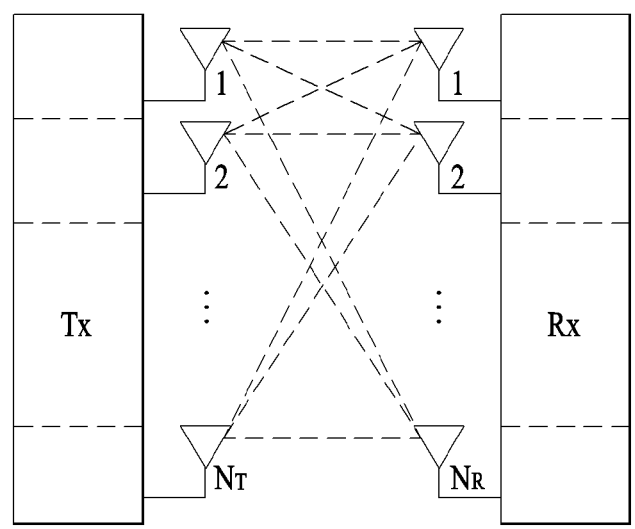
FIG. 7 is a structural diagram of a general Multiple-Input Multiple-Output (MIMO) communication system.

FIG. 7 shows the configuration of a wireless communication system including multiple antennas. When both the number of transmit (Tx) antennas and the number of Rx antennas respectively to $N_T$ and $N_R$, a theoretical channel transmission capacity of the MIMO communication system increases in proportion to the number of antennas, differently from the above-mentioned case in which only a transmitter or receiver uses several antennas, so that transmission rate and frequency efficiency can be greatly increased. In this case, the transfer rate acquired by the increasing channel transmission capacity can theoretically increase by a predetermined amount that corresponds to multiplication of a maximum transfer rate ($R_o$) acquired when one antenna is used and a rate of increase ($R_i$). The rate of increase ($R_i$) can be represented by the following equation 1.

$$R_i = \min(N_T, N_R) \quad \text{[Equation 1]}$$

For example, provided that a MIMO system uses four Tx antennas and four Rx antennas, the MIMO system can theoretically acquire a high transfer rate which is four times higher than that of a single antenna system. After the above-mentioned theoretical capacity increase of the MIMO system was demonstrated in the mid-1990s, many developers began to conduct intensive research into a variety of technologies which can substantially increase data transfer rate using the theoretical capacity increase. Some of the above technologies have been reflected in a variety of wireless communication standards, for example, third-generation mobile communication or next-generation wireless LAN, etc.

A variety of MIMO-associated technologies have been intensively researched by many companies or developers, for example, research into information theory associated with MIMO communication capacity under various channel environments or multiple access environments, research into a radio frequency (RF) channel measurement and modeling of the MIMO system, and research into a space-time signal processing technology.

Mathematical modeling of a communication method for use in the above-mentioned MIMO system will hereinafter be described in detail. As can be seen from FIG. 7, it is assumed that there are $N_T$ Tx antennas and $N_R$ Rx antennas. In the case of a transmission signal, a maximum number of transmission information pieces is $N_T$ under the condition that $N_T$ Tx antennas are used, so that the transmission information can be represented by a specific vector shown in the following equation 2.

$$s = [s_1, s_2, \ldots, s_{N_T}]^T \quad \text{[Equation 2]}$$

In the meantime, individual transmission information pieces $s_1, s_2, \ldots, s_{N_T}$ may have different transmission powers. In this case, if the individual transmission powers are denoted by $P_1, P_2, \ldots, P_{N_T}$, transmission information having an adjusted transmission power can be represented by a specific vector shown in the following equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In Equation 3, $\hat{s}$ is a transmission vector, and can be represented by the following equation 4 using a diagonal matrix P of a transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

In the meantime, the information vector $\hat{s}$ having an adjusted transmission power is applied to a weight matrix W, so that $N_T$ transmission signals $x_1, x_2, \ldots, x_{N_T}$ to be actually transmitted are configured. In this case, the weight matrix W is adapted to properly distribute transmission information to individual antennas according to transmission channel situations. The above-mentioned transmission signals $x_1, x_2, \ldots, x_{N_T}$ can be represented by the following equation 5 using the vector X. Here, $W_{ij}$ denotes a weight corresponding to i-th Tx antenna and j-th information. W represents a weight matrix or precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

Generally, a matrix rank is defined by a smaller number between the number of rows and the number of columns, in which the rows and the columns are independent of each other. Therefore, the matrix rank cannot be higher than the number of rows or columns. The rank of the channel matrix H can be represented by the following equation 6.

$$\text{rank}(H) \leq \min(N_T, N_R) \quad \text{[Equation 6]}$$

In addition, each of different pieces of information transmitted using the multiple antenna technology is now defined as a 'transport stream' or simply a 'stream'. This 'stream' can be called a 'layer'. Then, the number of transport streams cannot be greater than a channel rank which is the maximum number of different pieces of information transmittable using the multiple antenna technology. Accordingly, a channel matrix H can be expressed as given by Equation 7.

$$\# \text{ of streams} \leq \text{rank}(H) \leq \min(N_T, N_R) \quad \text{[Equation 7]}$$

Here, "# of streams" denotes the number of streams. Meanwhile, it should be noted here that one stream can be transmitted through one or more antennas.

There can be a variety of methods for mapping one or more streams to multiple antennas. These methods may be described as follows depending on the type of the multiple antenna technology. A case in which a single stream is transmitted through multiple antennas can be regarded as a spatial diversity scheme, and a case in which multiple streams are transmitted through multiple antennas can be regarded as a spatial multiplexing scheme. Alternatively, a hybrid of spatial diversity and spatial multiplexing can also be used.

A detailed description is now given of reference signals (RSs).

In general, a reference signal known to both a transmitter and a receiver is transmitted from the transmitter to the receiver for channel measurement together with data. This reference signal indicates a modulation scheme as well as a channel measurement scheme to perform a demodulation procedure. The reference signal is divided into a dedicated RS (DRS), i.e., a UE-specific RS, for a base station and a specific UE, and a common RS (CRS), i.e., a cell-specific RS, for all UEs in a cell. In addition, the cell-specific RS includes a reference signal for reporting CQI/PMI/RI measured by the UE to the base station, which is called a channel state information-RS (CSI-RS).

Figure 8:
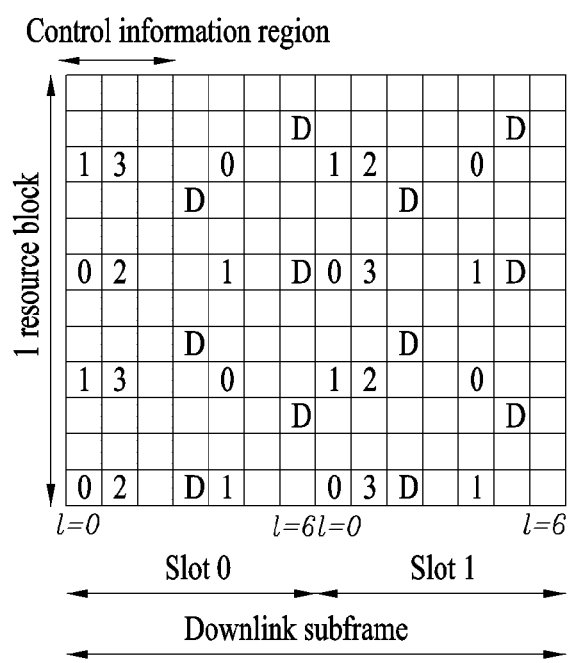
FIGS. 8 and 9 are diagrams showing the structures of downlink reference signals in a LTE system supporting downlink transmission using 4 antennas.
Figure 9:
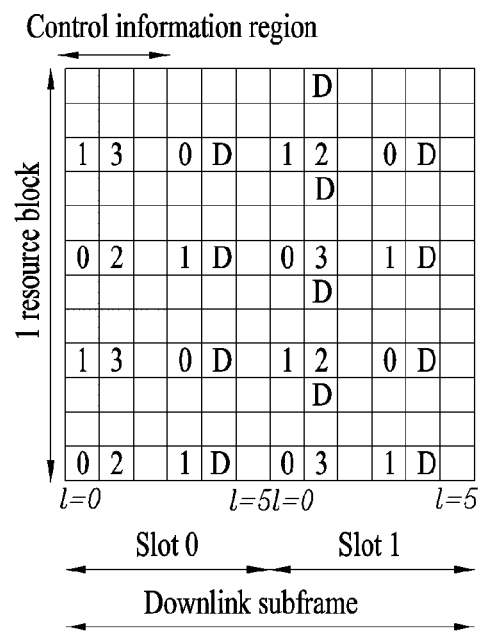

FIGS. 8 and 9 are diagrams showing the structures of reference signals in a LTE system supporting downlink transmission using 4 antennas. Specifically, FIG. 8 illustrates the case of a normal cyclic prefix (CP), and FIG. 9 illustrates the case of an extended CP.

Referring to FIGS. 8 and 9, 0 to 3 marked in the grid denote common RSs (CRSs) which are cell-specific RSs transmitted through antenna ports 0 to 3 for channel measurement and data demodulation, and the CRSs which are the cell-specific RSs can be transmitted to UEs over a control information region as well as a data information region.

In addition, 'D' marked in the grid denotes a downlink demodulation-reference signal (DM-RS) which is a UE-specific RS, and the DM-RS supports single antenna port transmission through a data region, i.e., PDSCH. The UE receives a higher layer signal indicating whether a DM-RS, which is a UE-specific RS, is present. FIGS. 8 and 9 exemplarily illustrate a DM-RS corresponding to antenna port 5, and 3GPP 36.211 also defines DM-RSs corresponding to antenna ports 7 to 14, i.e., a total of 8 antenna ports.

Figure 10:
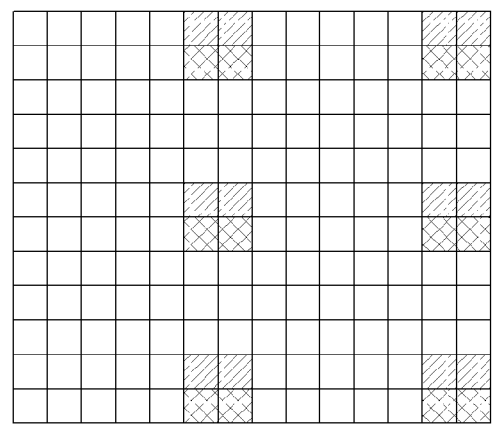
FIG. 10 exemplarily illustrates downlink demodulation-reference signal (DM-RS) allocation currently defined by the 3GPP specification.

FIG. 10 exemplarily illustrates downlink DM-RS allocation currently defined by the 3GPP specification.

Referring to FIG. 10, DM-RSs corresponding to antenna ports {7, 8, 11, 13} are mapped to DM-RS group 1 using antenna port sequences, and DM-RSs corresponding to antenna ports {9, 10, 12, 14} are mapped to DM-RS group 2 using antenna port sequences.

Meanwhile, unlike CRS, CSI-RS has been proposed above for PDSCH channel measurement, and can be defined as up to 32 different CSI-RS configurations to reduce inter-cell interference (ICI) in a multiple-cell environment.

The CSI-RS configuration differs depending on the number of antenna ports, and neighboring cells are configured to transmit CSI-RSs defined as different CSI-RS configurations as possible. Unlike CRS, CSI-RS supports up to 8 antenna ports, and a total of 8 antenna ports from antenna port 15 to antenna port 22 are allocated as antenna ports for CSI-RS in the 3GPP specification. Tables 1 and 2 show CSI-RS configurations defined in the 3GPP specification. Specifically, Table 1 shows the case of a normal CP, and Table 2 shows the case of an extended CP.

TABLE 1

| | CSI reference signal configuration | Number of CSI reference signals configured | | | | | |
|---|---|---|---|---|---|---|---|
| | | 1 or 2 | | 4 | | 8 | |
| | | (k', l') | $n_s \bmod 2$ | (k', l') | $n_s \bmod 2$ | (k', l') | $n_s \bmod 2$ |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 2

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod2 | (k', l') | $n_s$ mod2 | (k', l') | $n_s$ mod2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Figure 11:
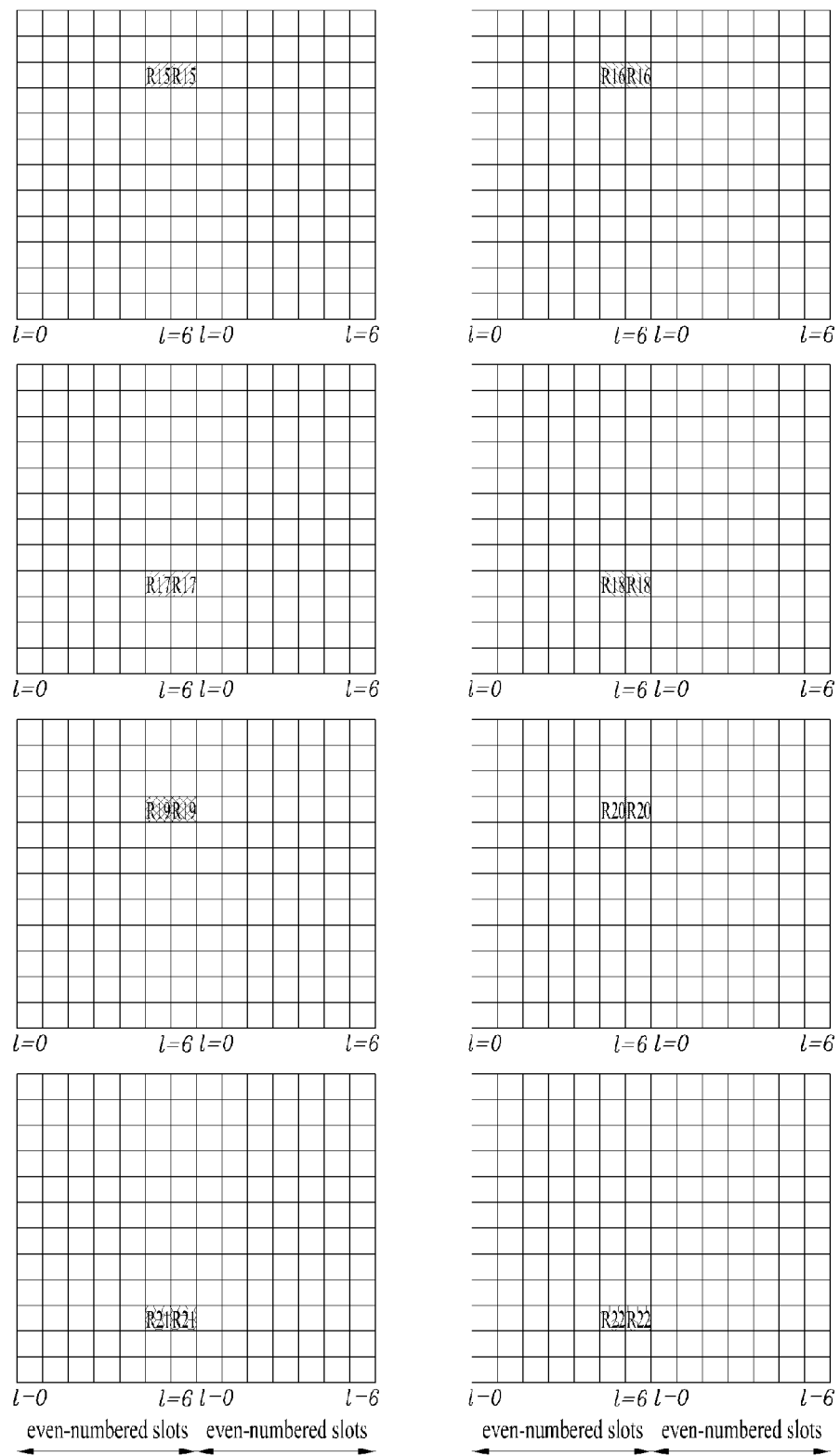
FIG. 11 exemplarily illustrates channel state information-reference signal (CSI-RS) configuration #0 in the case of a normal cyclic prefix (CP) among downlink CSI-RS configurations currently defined in the 3GPP specification.

In Tables 1 and 2, (k', l') denotes an RE index, k' denotes a subcarrier index, l' denotes an OFDM symbol index. FIG. 11 exemplarily illustrates CSI-RS configuration #0 in the case of a normal CP among CSI-RS configurations currently defined in the 3GPP specification.

CSI-RS subframe configurations can also be defined, and each CSI-RS subframe configuration includes a periodicity $T_{CSI-RS}$ and a subframe offset $\Delta_{CSI-RS}$ which are expressed on a subframe basis. Table 3 shows the CSI-RS subframe configurations defined in the 3GPP specification.

TABLE 3

| CSI-RS-SubframeConfig $I_{CSI-RS}$ | CSI-RS periodicity $T_{CSI-RS}$ (subframes) | CSI-RS subframe offset $\Delta_{CS-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

The present invention proposes a method for efficiently feeding back channel state information (CSI) for uplink and downlink in a massive MIMO system having multiple I/O antennas and a multi-dimensional antenna structure.

Employment of an active antenna system (AAS) in a next-generation wireless communication system is under consideration. Unlike a legacy passive antenna separate from an amplifier capable of adjusting the phase and magnitude of a signal, an active antenna refers to an antenna including an active device such as an amplifier. The AAS does not require an additional cable, connector, other hardware, etc. for connecting the amplifier to the antenna, and has high efficiency in view of energy consumption and operating costs. Specifically, since electronic beam control per antenna is supported, the AAS allows advanced MIMO technology, e.g., precise beam pattern forming in consideration of beam direction and beam width or 3-dimensional (3D) beam pattern forming.

Due to employment of an advanced antenna system such as the above-described AAS, a massive MIMO structure having multiple I/O antennas and a multi-dimensional antenna structure is also under consideration. For example, unlike a legacy linear antenna array (or 1-dimensional (1D) antenna array), when a 2-dimensional (2D) antenna array is formed, a 3D beam pattern can be formed using active antennas of the AAS.

Figure 12:
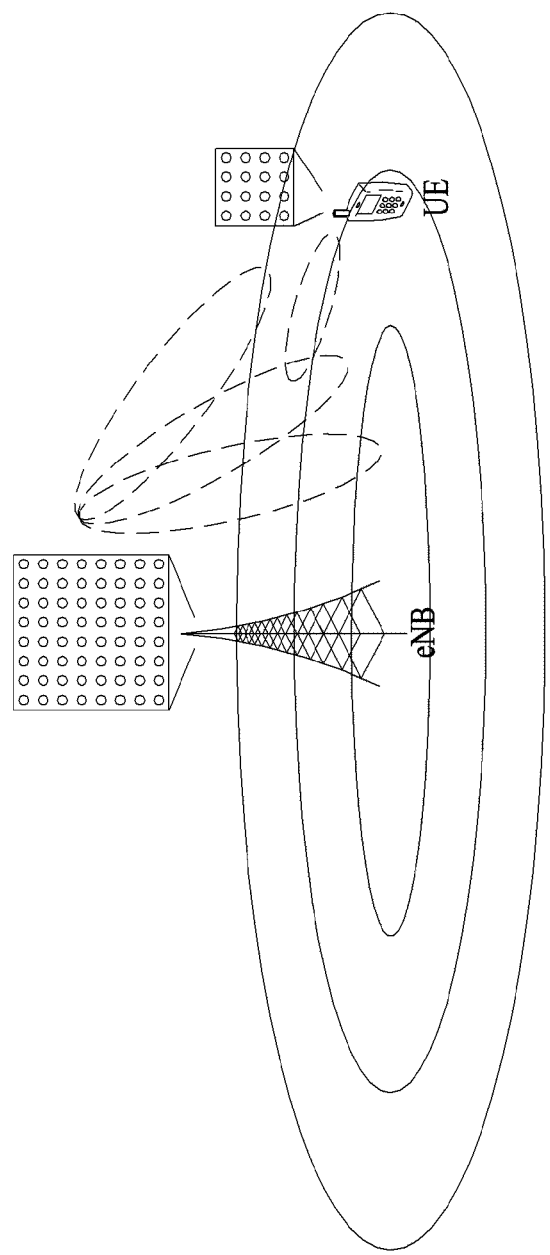
FIG. 12 is a diagram showing the concept of massive MIMO technology.

FIG. 12 is a diagram showing the concept of massive MIMO technology. Specifically, FIG. 12 illustrates a system in which an eNB or a UE has multiple Tx/Rx antennas capable of 3D beamforming base on an AAS system.

Referring to FIG. 12, when a 3D beam pattern is used in view of Tx antennas, quasi-static or dynamic beamforming can be performed not only in the horizontal beam direction but also in the vertical beam direction, and application such as vertical-direction sector forming can be considered. In view of Rx antennas, when Rx beams are formed using a massive Rx antenna, increase in signal power based on an antenna array gain may be expected.

Accordingly, in the case of uplink, the eNB may receive signals transmitted from the UE, through multiple antennas. In this case, the UE may configure Tx power thereof to a very low level in consideration of a gain of the massive Rx antenna to reduce the influence of interference.

A description is now given of antenna virtualization to apply massive MIMO technology.

Figure 13:
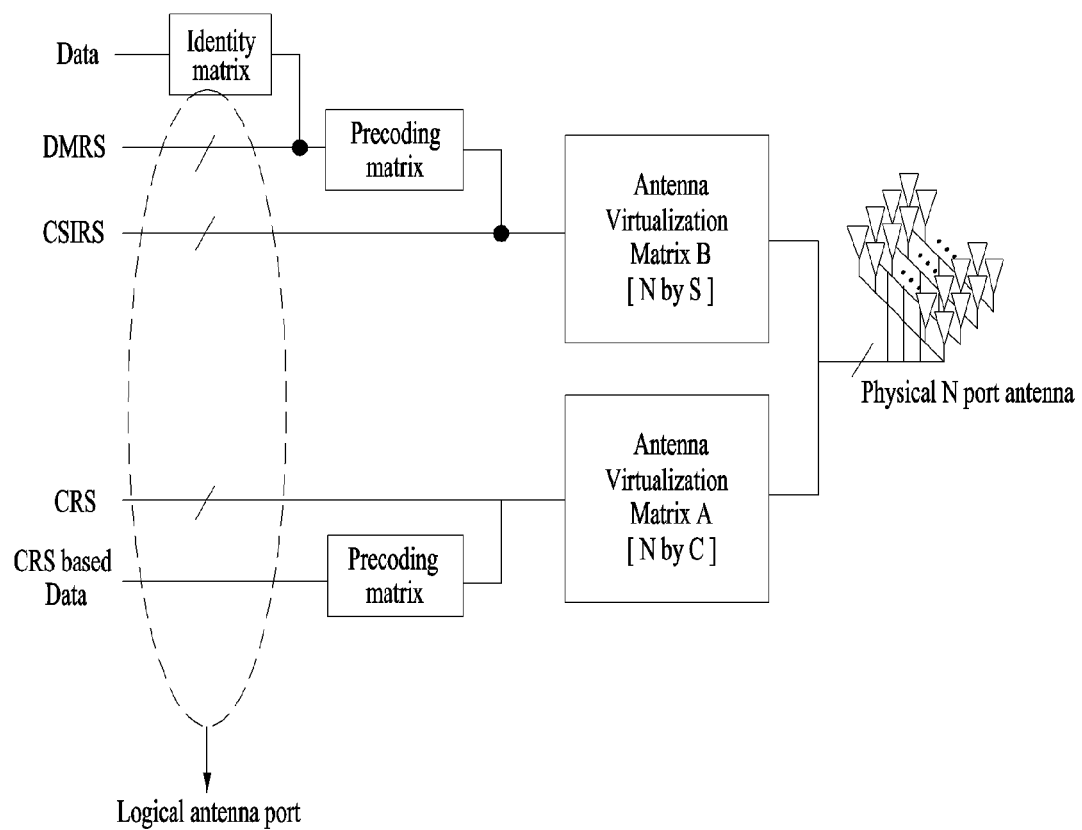
FIG. 13 is a diagram showing the concept of antenna virtualization.

FIG. 13 is a diagram showing the concept of antenna virtualization. Specifically, FIG. 13 illustrates a case in which CSI-RS uses S antenna ports and CRS uses C antenna ports. Furthermore, it is assumed that an antenna virtualization matrix B for the CSI-RS is defined UE-specifically, and an antenna virtualization matrix A for the CRS is defined equally to all UEs.

Referring to FIG. 13, when the CSI-RS is given as $x=[x_1 \ x_2 \ \ldots \ x_S]^T$ the signal after antenna virtualization can be expressed as $z=[z_1 \ z_2 \ \ldots \ z_N]^T = B \cdot x$. In addition, when the CRS is given as $y=[y_1 \ y_2 \ \ldots \ y_C]^T$, the signal after antenna virtualization can be expressed as $z=[z_1 \ z_2 \ \ldots \ z_N]^T = A \cdot y$.

Furthermore, different time delays can be applied to final antenna transmission signals as given by Equation 8 for application of frequency-selective antenna virtualization.

$$z=[z_1(t-\tau_1)z_2(t-\tau_2) \ldots z_N(t-\tau_N)]^T \qquad \text{[Equation 8]}$$

Here, the antenna virtualization matrix B is preferably configured to achieve a maximum level of energy in the signals received by the corresponding UE, and should be determined per UE depending on, for example, the location of the UE. To define the antenna virtualization matrix B, a sounding reference signal (SRS) can be used based on channel reciprocity between uplink and downlink, and an optimal antenna virtualization matrix B based on variation in UE location, channel environment, etc. can be found using the SRS, preliminarily reported CSI feedback information, etc.

The present invention proposes a CSI feedback method for closed-loop 3D MIMO beamforming using a panel antenna to implement massive MIMO technology as in an AAS system.

Figure 14:
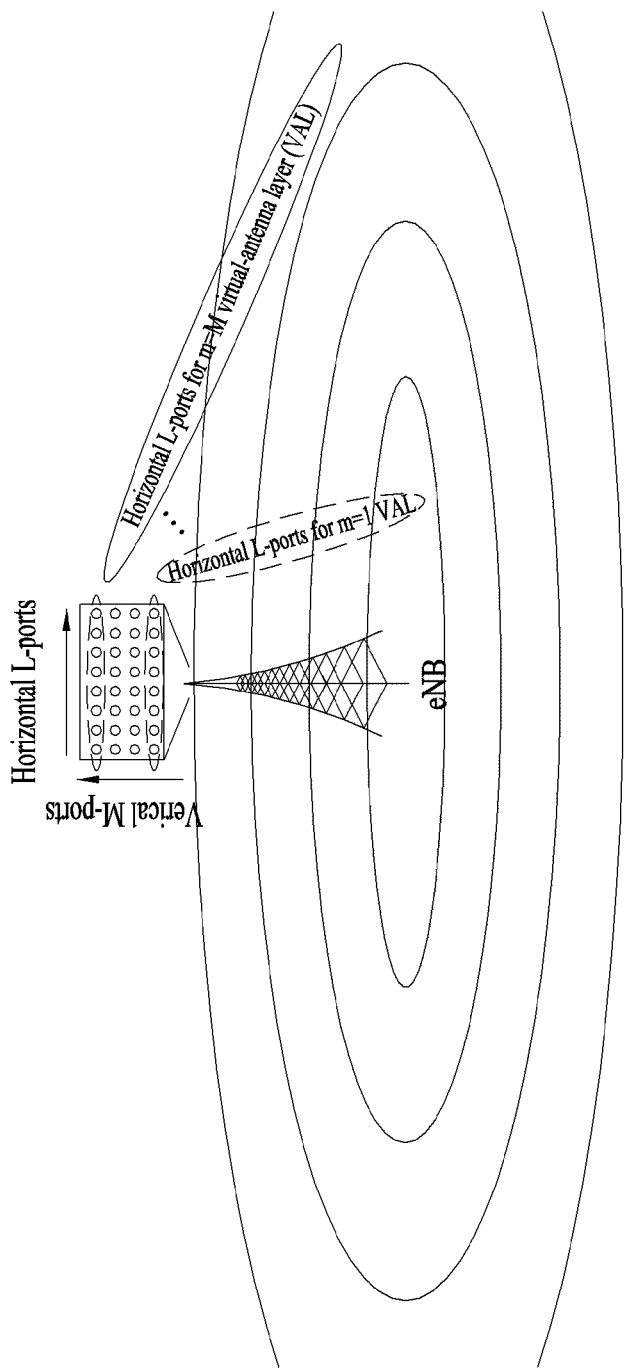
FIG. 14 is a diagram showing the concept of 3-dimensional (3D) MIMO beamforming according to the present invention.

FIG. 14 is a diagram showing the concept of 3D MIMO beamforming according to the present invention. Specifically, FIG. 14 assumes that an antenna of an eNB has L antenna ports in the horizontal direction (or H-direction) and has M antenna ports in the vertical direction (or V-direction). That is, this figure assumes an L*M panel antenna structure. Here, the L antenna ports and the M antenna ports can be physical antenna ports, or logical antenna ports expressed as an antenna virtualization matrix.

For convenience of explanation, FIG. 14 exemplarily illustrates a case in which L=8 and M=4. That is, this case corresponds to an 8*4 panel antenna structure, and signals transmitted from a total of 32 antenna ports form beams in the horizontal and vertical directions, thereby implementing 3D MIMO transmission.

Specifically, the above structure means that a specific antenna virtualization matrix is applied as described above in relation to FIG. 13 before the L antenna ports configured in the horizontal direction transmit signals from a total of N=L*M antenna ports which are present in each of physical-antenna-layers (PALs) 1, 2, ..., M, and thus beams formed by the signals transmitted from the horizontal-direction L antenna ports can be gathered to any specific layer among virtual-antenna-layers (VALs) 1, 2, ..., M.

Accordingly, the L antenna ports in VAL m=1 can be called L antenna ports targeting VAL 1, and the L antenna ports in VAL m=M can be called L antenna ports targeting VAL M. Furthermore, if the eNB defines L-port CSI-RS configurations, an L-port CSI-RS configuration targeting VAL 1 and an L-port CSI-RS configuration targeting VAL M can differ from each other.

1. When an active antenna system capable of 3D beamforming as illustrated in FIG. 14 is implemented in an eNB, as operation of legacy UEs, a method for configuring M L-port CSI-RSs precoded in different vertical directions optimized for VALs (or having specific virtualization matrices B applied thereto) may be considered. Here, the legacy UE refers to a UE incapable of recognizing that the antenna of the eNB has the above-described panel antenna structure, and the Rx antenna of the UE in this case does not have the panel antenna structure.

In addition, precoding of the L-port CSI-RSs in vertical directions means that, when the eNB transmits the L-port CSI-RSs in horizontal directions as illustrated in FIG. 14, instead of directly transmitting a corresponding CSI-RS sequence for every L antenna ports, specific vertical directivity is preliminarily formed by multiplying a CSI-RS sequence of every M vertical-direction antennas, by a specific coefficient.

That is, as illustrated in FIG. 14, the L-port CSI-RSs precoded in vertical directions are transmitted to optimize a case in which almost vertical-direction beams are formed based on M vertical-direction coefficient values to be focused on a ring-shaped area close to the eNB when the beams reach the ground, for VAL 1.

Alternatively, if a high building is located close to the eNB, the almost vertical-direction beams may be focused on an area corresponding to the height of the first floor of this building. Furthermore, when the building is located near the eNB, beams targeting the farthest ring area in FIG. 14 may be focused on an area corresponding to a high floor of this building. In the following description, the term "vertical directions" refer to directions obtained by electrically adjusting, for example, a tilting angle of the eNB to target a specific VAL by applying specific M coefficients.

For the above-described operation, the eNB may generate a total of M L-port CSI-RSs precoded in vertical directions individually optimized for VALs 1, 2, ..., M, and transmit the same in a resource management set. In addition, the legacy UE may report CSI-RS based reference signal received power (RSRP) for each of the total of M L-port CSI-RSs included in the resource management set, and thus a measurement set may be configured. For example, UE 1 performs CSI feedback on an L-port CSI-RS corresponding to VAL 1, UE 2 performs CSI feedback on an L-port CSI-RS corresponding to VAL M, and thus vertical-direction beams for the legacy UEs may also be accurately formed as specific-direction beams.

Furthermore, in the case of the legacy UE, if location information of the UE is predictable to a highly reliable level, a 3D beamforming effect may be UE-transparently provided by configuring a specific L-port CSI-RS optimized for any one layer. In this case, the legacy UEs preferably perform rate matching on PDSCH by defining CSI-RSs of all other layers as zero power (ZP) CSI-RSs.

Alternatively, if the reliability level of the location information of the legacy UE cannot be ensured, an additional 8-port CSI-RS for forming a wide beam having no specific directivity may be configured in the vertical direction as in a legacy case.

2. A description is now given of operation of UEs capable of recognizing that the antenna of an eNB has the above-described panel antenna structure.

(1) Even in this case, as described above in part 1, a method for configuring M L-port CSI-RSs precoded in different vertical directions optimized for VALs (or having specific virtualization matrices B applied thereto) may be considered.

For the above-described operation, the eNB may generate a total of M L-port CSI-RSs precoded in vertical directions individually optimized for VALs 1, 2, ..., M, and transmit the same in a resource management set. In addition, the UE may report CSI-RS based RSRP for each of the total of M L-port CSI-RSs included in the resource management set, and thus a measurement set may be configured. Accordingly, L-port CSI-RSs for different layers may be configured for UEs, and the UEs may perform feedback thereon.

Alternatively, instead of configuring (up to M) L-port CSI-RSs for multiple VALs and calculating an independent CSI value per layer to perform CSI feedback for each VAL, CSI (e.g., RI, PMI, and CQI) optimized over the L*M panel antenna may be calculated and fed back. At this time, information indicating that a PDSCH to which 3D beamforming is applied will be received from the L*M panel antenna needs to be preliminarily received using a higher layer signal, e.g., an RRC signal.

For the above-described operation, when the eNB transmits M L-port CSI-RSs, no antenna virtualization matrix may be applied and an L-port CSI-RS for only a specific PAL layer may be transmitted while L-port CSI-RSs for the other PAL layers may not be transmitted.

In addition, instead of reporting CSI feedback individually for the M layers, optimized CSI feedback may be redefined. That is, a single CSI feedback value optimized for the L*M panel antenna may be defined. For example, in the case of RI, the size thereof may be defined to 3 or more bits to support up to L*M as the maximum rank. Furthermore, in the case of PMI, a method for reporting M L-Tx PMIs for each layer or a method for feeding back 1 horizontal-direction L-Tx PMI and 1 vertical-direction M-Tx PMI may be considered. Particularly, in the latter case, the eNB applies 2D interpolation using 1 L-Tx PMI and 1 M-Tx PMI. Specifically, the vertical-direction M-Tx PMI refers to a PMI corresponding to a vertical-direction M-port CSI-RS on the assumption that the vertical-direction M-port CSI-RS is defined by selecting one antenna port from each of M L-port CSI-RS resources configured for the UE. In the case of CQI, a CQI value expected in transmission through the L*M panel antenna when the optimized RI/PMI is used may be calculated.

Additionally, although CSI (e.g., RI, PMI, and CQI) optimized over the L*M panel antenna is fed back, a restriction for selecting a common subband among layers may be given in the case of a subband CSI report.

Although CSI feedback is reported individually for the M layers, a restriction for selecting an RI commonly applied among layers may be given. Alternatively, a method for reporting subband CSI for only a specific reference layer and reporting the same value as the specific reference layer, reporting no value, or reporting another type of information as subband CSI for the other layers may be considered. Additionally, a restriction for configuring a period and offset of CSI-RS corresponding to each layer, within a certain range may be given.

(2) Alternatively, a method for configuring a non-precoded (or specifically precoded) horizontal-direction L-port CSI-RS resource (e.g., 1 CSI-RS representative of the horizontal direction) and a non-precoded (or specifically precoded) vertical-direction M-port CSI-RS resource (e.g., 1 CSI-RS resource representative of the vertical direction), which are capable of representing 2D interpolation assumed for an L*M panel antenna, for a UE may be considered.

According to the above method, signaling overhead of the network may be minimized because the horizontal-direction L-port CSI-RS of the network can also be configured for legacy UEs and used for CSI measurement, and thus only 1 vertical-direction M-port CSI-RS needs to be added. Specifically, the vertical-direction M-port CSI-RS may be regarded as a ZP CSI-RS by the legacy UEs.

At this time, information indicating that a PDSCH to which 3D beamforming is applied will be received from the L*M panel antenna needs to be preliminarily received using a higher layer signal, e.g., an RRC signal.

In the case of CSI feedback, CSI reporting may be performed individually for the horizontal-direction L-port CSI-RS and the vertical-direction M-port CSI-RS. At this time, a restriction for selecting a common RI and/or a common subband may be applied. Furthermore, a restriction for configuring a period and offset of CSI-RS in each direction, within a certain range may be given.

Alternatively, a restriction for feeding back only M-Tx PMI of rank 1 for the vertical-direction M-port CSI-RS may be given. That is, by feeding back vertical-direction M-Tx PMI when rank-1 restriction is given, this PMI may be applied in the vertical direction for subsequent PDSCH transmission.

Otherwise, a single CSI value optimized for the L*M panel antenna may be defined. For example, in the case of RI, the size thereof may be set to 3 or more bits to support up to L*M as the maximum rank. Furthermore, in the case of PMI, a case in which the UE reports 1 L-Tx PMI and 1 M-Tx PMI to allow the eNB to calculate a final PMI by applying 2D interpolation may be considered.

For example, 2D interpolation may be applied by interconnecting 1 L-Tx PMI (H-PM) and 1 M-Tx PMI (V-PM) using a Kronecker product operator $\otimes$. Specifically, if the H-PM is rank 8 and the V-PM is rank 2, the size of the panel antenna is L=8 in the horizontal direction, and M=4 in the vertical direction. If it is assumed that 32 antennas are constructed in total as described above, the final PM may be expressed as given by Equation 9.

$$[V\text{-}PM] \otimes [H\text{-}PM] = [PM] \qquad \text{[Equation 9]}$$
$$\phantom{xx}(4\times 2)\phantom{xxxx}(8\times 8)\phantom{xxx}(32\times 16)$$

At this time, when the two matrices are 2D-interpolated using the Kronecker product operator or another scheme, the connection scheme needs to be shared between the eNB and the UE. In the case of CQI, a CQI value expected in transmission through the L*M panel antenna when the optimized RI/PMI is used may be calculated.

Even when the horizontal-direction L-port CSI-RS resource and the vertical-direction M-port CSI-RS resource are configured, the UE may perform CSI reporting individually for a total of M layers of the L*M panel antenna. At this time, a restriction for selecting a common RI and/or a common subband may be applied. Furthermore, a restriction for configuring a period and offset of CSI-RS in each direction, within a certain range may be given. Particularly, in the case of subband, a method for reporting the same value as a specific reference layer, reporting no value, or reporting another type of information as CSI may be considered.

(3) Lastly, a vertical-direction M-port CSI-RS resource (e.g., 1 CSI-RS) randomized in the horizontal direction may be configured in a long-term cycle, and thus M RSRPs of antenna ports or M average power values of specific-type antenna ports may be reported. As such, a beam coefficient of the vertical direction may be determined in a long-term cycle, i.e., semi-statically. On the other hand, for CSI feedback of the horizontal direction, a non-precoded (or specifically precoded) horizontal-direction L-port CSI-RS resource (e.g., 1 CSI-RS) may be signaled in a short-term cycle as in a legacy case.

Here, the vertical-direction M-port CSI-RS randomized in the horizontal direction means that beams are randomized in the horizontal direction by randomly selecting different arbitrary horizontal-direction beam coefficients for specific frequency resource units, e.g., RBs or precoding resource block groups (PRGs), and applying the same to a CSI-RS sequence.

Since the vertical direction is used only for semi-static switching and then horizontal-direction CSI feedback is performed in the same manner as a legacy method, the above method may achieve low UE complexity compared to the above-described method of part (2).

In addition, the UE having received the vertical-direction M-port CSI-RS randomized in the horizontal direction may compare the level of energy accumulated in 1 RE (2 or more REs if code division multiplexing (CDM) is applied to the CSI-RS sequence) in each antenna port of the vertical direction, to the level of energy accumulated in another antenna port, and thus select one vertical-direction antenna port having a high energy level. Alternatively, if CDM is not applied, 1 vertical-direction 1-port CSI-RS randomized in the horizontal direction may be transmitted per layer to transmit a total of M CSI-RSs, and thus the UE may compare the levels of energy accumulated in the CSI-RSs. Otherwise, if CDM is applied and thus 1-port CSI-RSs are code-division-multiplexed to n REs, 1 vertical-direction 1-port CSI-RS randomized in the horizontal direction may be transmitted per layer to transmit a total of M CSI-RSs, and thus the UE may descramble the code-division-multiplexed CSI-RSs received in the n REs and then compare the levels of energy accumulated in the CSI-RSs.

On the other hand, short-term L-Tx CSI feedback in the horizontal direction may basically operate in the same manner as legacy L-Tx CSI feedback. At this time, the eNB may receive such CSI feedback and apply semi-statically preselected vertical-direction beams in PDSCH transmission to a corresponding UE. Accordingly, CQI may be corrected by the eNB. The UE needs to preliminarily acquire information about whether the eNB corrects CQI, using an explicit method such as RRC signaling or DCI signaling, or an implicit method.

Alternatively, the UE may overestimate and select RI having a size of 3 bits in consideration of a vertical direction selected by the UE, and may calculate and report PMI/CQI corresponding thereto. That is, the UE may calculate and report RI/PMI/CQI even in consideration of vertical-direction beams semi-statically selected/reported by the UE.

Otherwise, the UE may receive specific confirmation information about vertical-direction beams semi-statically selected/reported by the UE, from the eNB, and may calculate and report RI/PMI/CQI even in consideration of the vertical-direction beams from a specific timing at which the vertical-direction beams are applicable based on the confirmation information.

Additionally, the UE may calculate RI/PMI/CQI in consideration of RSRP of a selected antenna port. For example, additional scaling may be performed by applying a ratio of an average of M RSRP values of antenna ports to the value of RSRP of the selected antenna port, to the value of Pc (ratio of PDSCH EPRE to CSI-RS EPRE) signaled using a horizontal-direction L-port CSI-RS resource, and then RI/PMI/CQI may be calculated.

Here, the antenna port selection result may not be separately reported, but may be reported through joint encoding with RI or PMI having a long-term cycle in horizontal-direction L-Tx CSI feedback. Since the antenna port selection result is information having a long-term cycle and is used for vertical-direction beam switching, the antenna port selection result may be transmitted through joint encoding with other types of feedback information having a long-term cycle and thus may be reported without using a separate resource.

At this time, a method for additionally feeding back rank-1 M-Tx PMI for a vertical-direction M-port CSI-RS may be considered. That is, by feeding back vertical-direction M-Tx PMI when rank-1 restriction is given, this PMI may be applied in the vertical direction for subsequent PDSCH transmission.

Codeword-to-Layer Mapping Rule and CQI Calculation Method for 2D Antenna Array

When ranks (e.g., Rank_H and Rank_V) for multiple dimensions or directions are defined as described above, a final rank may be determined as a pair or product of the ranks having different properties. This rank is called a product rank in the following description.

In addition, when a precoding matrix is determined, optimal PMIs (e.g., PMI_H and PMI_V) for multiple dimensions or directions may be independently determined, or PMIs (e.g., PMI_H and PMI_V) for the dimensions or directions may be determined in consideration of a product rank to optimize a final PMI determined as a product of the PMIs.

When a CQI considering a product rank as described above is calculated or determined, if a legacy codeword (CW)-to-layer mapping rule and/or a legacy CQI definition and calculation method is used, CQIs in individual dimensions may be determined, but an actual channel state configured by 3D beamforming according to a 2D antenna array may not be accurately reflected. Accordingly, the present invention proposes a new CW-to-layer mapping rule and proposes a new CQI definition and calculation method related thereto.

For better understanding of the present invention, a description is now given of a legacy multiple codeword based MIMO transmission method.

Figure 15:
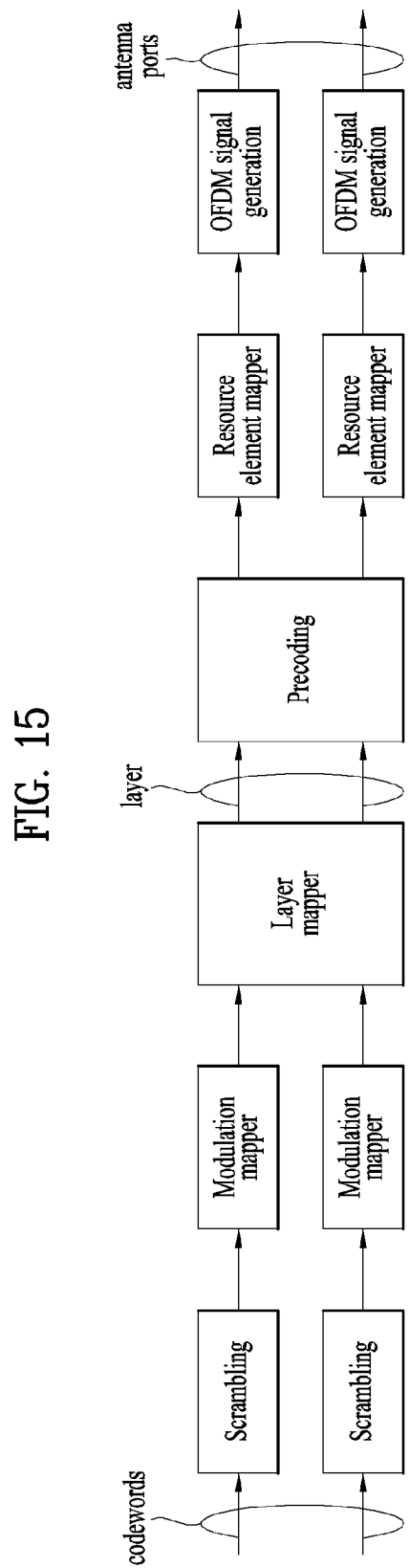
FIG. 15 is a block diagram for describing multiple codeword based MIMO transmission.

FIG. 15 is a block diagram for describing multiple codeword based MIMO transmission.

For spatial multiplexing, a method for transmitting multiple transport streams or multiple transport layers may be used. Link adaptation may be applied per transport stream/layer or per arbitrary transport stream/layer group. A modulation and coding scheme determined per stream/layer (or stream/layer group) may be applied for link adaptation. To this end, multiple codeword (MCW) based transmission may be performed.

Information bits are encoded on a transport block (TB) basis, and a result of encoding the TB may be referred to as a codeword (CW). One or more codewords may be scrambled using a scrambling signal. The scrambled codewords are modulated into complex symbols using BPSK, QPSK, 16 QAM or 64QAM based on transmission signal type and/or channel state. Thereafter, the modulated complex symbols are mapped to one or more layers.

The TB-to-CW mapping relationship may be defined as described below. For example, it is assumed that 2 transport blocks are expressed as TB1 and TB2, and 2 codewords are expressed as CW0 and CW1 (or the indexes of the 2 codewords may be expressed as CW1 and CW2). When the 2 transport blocks TB1 and TB2 are enabled, the first transport block TB1 may be mapped to the first codeword CW0, and the second transport block TB2 may be mapped to the second codeword CW1. If TB-to-CW swapping is applied, the first transport block TB1 may be mapped to the second codeword CW1, and the second transport block TB2 may be mapped to the first codeword CW0. Meanwhile, when one of the 2 transport blocks is disabled and only the other is enabled, the enabled transport block may be mapped to the first codeword CW0. That is, one transport block is mapped to one codeword. In addition, disabling of a transport block includes a case in which the size of the transport block is 0. When the size of the transport block is 0, the transport block is not mapped to any codeword.

The codeword-to-layer mapping relationship may be as shown in Table 4 and Table 5 depending on transmission scheme.

TABLE 4

| Number of layers | Number of codewords | Codeword-to-layer mapping $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$ <br> $x^{(1)}(i) = d^{(0)}(2i + 1)$ | $M_{symb}^{layer} = M_{symb}^{(0)}/2$ |
| 2 | 2 | $x^{(0)}(i) = d^{(0)}(i)$ <br> $x^{(1)}(i) = d^{(1)}(i)$ | $M_{symb}^{layer} = M_{symb}^{(0)} = M_{symb}^{(1)}$ |
| 3 | 1 | $x^{(0)}(i) = d^{(0)}(3i)$ <br> $x^{(1)}(i) = d^{(0)}(3i + 1)$ <br> $x^{(2)}(i) = d^{(0)}(3i + 2)$ | $M_{symb}^{layer} = M_{symb}^{(0)}/3$ |
| 3 | 2 | $x^{(0)}(i) = d^{(0)}(i)$ <br> $x^{(1)}(i) = d^{(1)}(2i)$ <br> $x^{(2)}(i) = d^{(1)}(2i + 1)$ | $M_{symb}^{layer} = M_{symb}^{(0)} = M_{symb}^{(1)}/2$ |
| 4 | 1 | $x^{(0)}(i) = d^{(0)}(4i)$ <br> $x^{(1)}(i) = d^{(0)}(4i + 1)$ <br> $x^{(2)}(i) = d^{(0)}(4i + 2)$ <br> $x^{(3)}(i) = d^{(0)}(4i + 3)$ | $M_{symb}^{layer} = M_{symb}^{(0)}/4$ |
| 4 | 2 | $x^{(0)}(i) = d^{(0)}(2i)$ <br> $x^{(1)}(i) = d^{(0)}(2i + 1)$ <br> $x^{(2)}(i) = d^{(1)}(2i)$ <br> $x^{(3)}(i) = d^{(1)}(2i + 1)$ | $M_{symb}^{layer} = M_{symb}^{(0)}/2 = M_{symb}^{(1)}/2$ |
| 5 | 2 | $x^{(0)}(i) = d^{(0)}(2i)$ <br> $x^{(1)}(i) = d^{(0)}(2i + 1)$ <br> $x^{(2)}(i) = d^{(1)}(3i)$ <br> $x^{(3)}(i) = d^{(1)}(3i + 1)$ <br> $x^{(4)}(i) = d^{(1)}(3i + 2)$ | $M_{symb}^{layer} = M_{symb}^{(0)}/2 = M_{symb}^{(1)}/3$ |
| 6 | 2 | $x^{(0)}(i) = d^{(0)}(3i)$ <br> $x^{(1)}(i) = d^{(0)}(3i + 1)$ <br> $x^{(2)}(i) = d^{(0)}(3i + 2)$ <br> $x^{(3)}(i) = d^{(1)}(3i)$ <br> $x^{(4)}(i) = d^{(1)}(3i + 1)$ <br> $x^{(5)}(i) = d^{(1)}(3i + 2)$ | $M_{symb}^{layer} = M_{symb}^{(0)}/3 = M_{symb}^{(1)}/3$ |
| 7 | 2 | $x^{(0)}(i) = d^{(0)}(3i)$ <br> $x^{(1)}(i) = d^{(0)}(3i + 1)$ <br> $x^{(2)}(i) = d^{(0)}(3i + 2)$ <br> $x^{(3)}(i) = d^{(1)}(4i)$ <br> $x^{(4)}(i) = d^{(1)}(4i + 1)$ <br> $x^{(5)}(i) = d^{(1)}(4i + 2)$ <br> $x^{(6)}(i) = d^{(1)}(4i + 3)$ | $M_{symb}^{layer} = M_{symb}^{(0)}/3 = M_{symb}^{(1)}/4$ |
| 8 | 2 | $x^{(0)}(i) = d^{(0)}(4i)$ <br> $x^{(1)}(i) = d^{(0)}(4i + 1)$ <br> $x^{(2)}(i) = d^{(0)}(4i + 2)$ <br> $x^{(3)}(i) = d^{(0)}(4i + 3)$ <br> $x^{(4)}(i) = d^{(1)}(4i)$ <br> $x^{(5)}(i) = d^{(1)}(4i + 1)$ <br> $x^{(6)}(i) = d^{(1)}(4i + 2)$ <br> $x^{(7)}(i) = d^{(1)}(4i + 3)$ | $M_{symb}^{layer} = M_{symb}^{(0)}/4 = M_{symb}^{(1)}/4$ |

TABLE 5

| Number of layers | Number of codewords | Codeword-to-layer mapping $i = 0, 1, \ldots, M_{symb}^{layer} - 1$ | |
|---|---|---|---|
| 2 | 1 | $x^{(0)}(i) = d^{(0)}(2i)$ <br> $x^{(1)}(i) = d^{(0)}(2i + 1)$ | $M_{symb}^{layer} = M_{symb}^{(0)}/2$ |
| 4 | 1 | $x^{(0)}(i) = d^{(0)}(4i)$ <br> $x^{(1)}(i) = d^{(0)}(4i + 1)$ <br> $x^{(2)}(i) = d^{(0)}(4i + 2)$ <br> $x^{(3)}(i) = d^{(0)}(4i + 3)$ | $M_{symb}^{layer} = \begin{cases} M_{symb}^{(0)}/4 & \text{if } M_{symb}^{(0)} \bmod 4 = 0 \\ (M_{symb}^{(0)} + 2)/4 & \text{if } M_{symb}^{(0)} \bmod 4 \neq 0 \end{cases}$ <br> If $M_{symb}^{(0)} \bmod 4 \neq 0$ two null symbols shall be appended to $d^{(0)}(M_{symb}^{(0)} - 1)$ |

Table 4 shows an example in which signals are transmitted using a spatial multiplexing method, and Table 5 shows an example in which signals are transmitted using a transmit diversity method. In Table 4 and Table 5, $x^{(a)}(i)$ denotes an i-th symbol of a layer having index a, and $d^{(q)}(i)$ denotes an i-th symbol of a codeword having index q. The mapping relationship between the number of codewords and the number of layers used for transmission may be known using the "Number of layers" and "Number of codewords" columns of Table 4 and Table 5, and the "Codeword-to-Layer mapping" column shows how symbols of each codeword are mapped to a layer.

As shown in Table 4 and Table 5, one codeword may be mapped to one layer on a symbol basis. However, as in the second case of Table 5, one codeword may be mapped to up to 4 layers in a distributed manner and, in this case, symbols of each codeword are sequentially mapped to the layers. Meanwhile, in the case of single codeword based transmission, only one encoder and one modulation block are present.

As illustrated in FIG. 15, signals mapped to layers may be allocated to one or more Tx antenna ports according to a certain precoding matrix selected depending on channel state. The transmission signals for the antenna ports, which are processed as described above, may be mapped to time-frequency resource elements to be used for transmission, and then transmitted through OFDM signal generation blocks.

Figure 16:
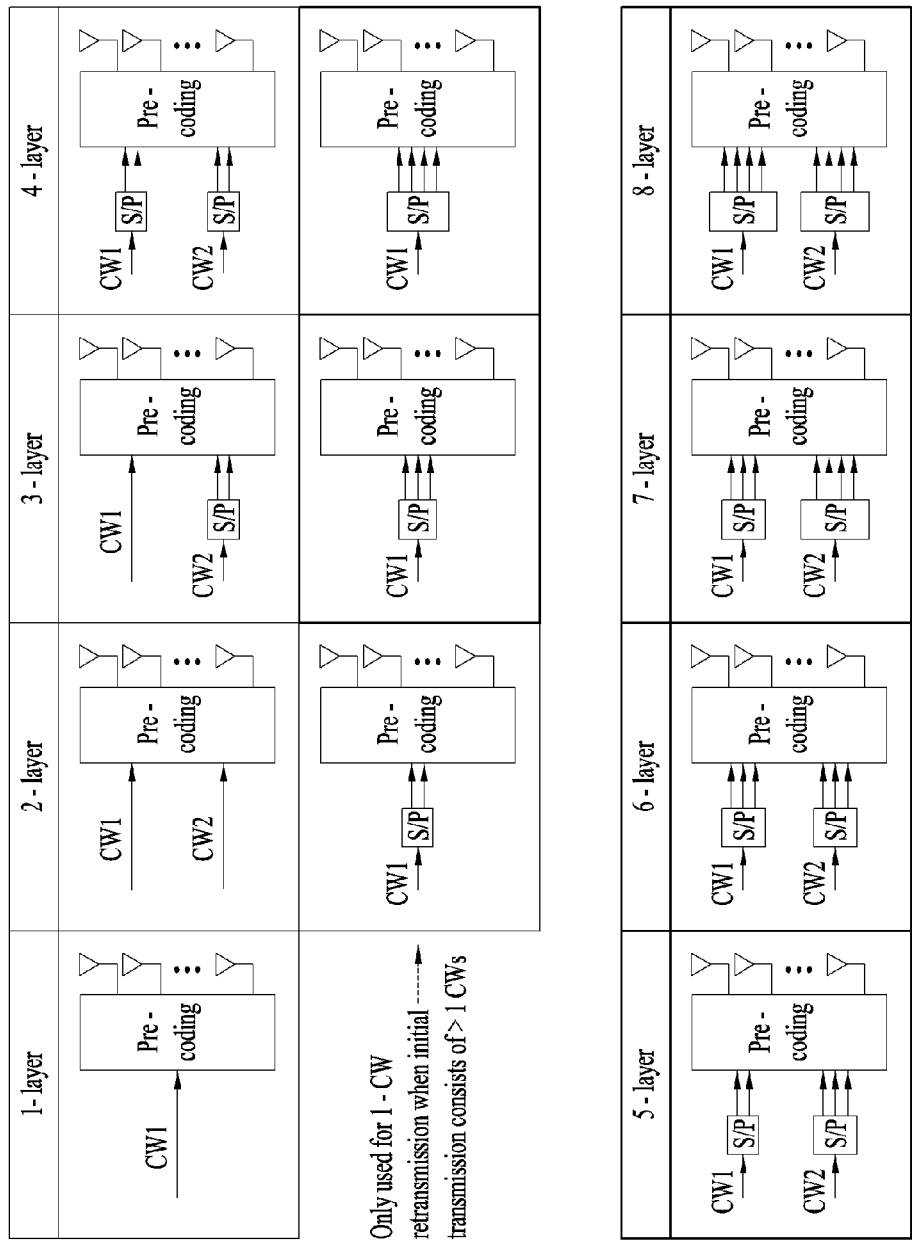
FIG. 16 is a diagram for describing a codeword-to-layer mapping rule defined for a legacy LTE system.

FIG. 16 is a diagram for describing a codeword-to-layer mapping rule defined for a legacy LTE system.

In FIG. 16, when one CW is mapped to one layer, although a mapping block is not separately illustrated, it should be understood that the CW is mapped one-to-one to the layer. Mapping of one CW to multiple layers is expressed as a serial/parallel (S/P) block. Signals input to precoding blocks refer to different layers, and the layers may be mapped to one or more antenna ports through the precoding blocks.

Furthermore, FIG. 16 shows that, when 2 codewords are mapped to multiple layers, the 2 codewords are mapped to as equal numbers of layers as possible. That is, equal numbers of layers are mapped to the 2 CWs when a total number of layers is an even number, and the difference between the number of layers mapped to one CW and the number of layers mapped to the other CW does not exceed 1 when a total number of layers is an odd number.

As illustrated in FIG. 16, in initial transmission, transmission of 1 codeword is defined for a rank value of 1 (i.e., the number of layers is 1), and transmission of 2 CWs is defined for a rank value exceeding 1 (i.e., the number of layers is 2 or more). Meanwhile, although the 2 CWs are transmitted, if any one CW is not successfully decoded by a receiver (i.e., NACK), the CW should be retransmitted. In this case, even 1 CW may be transmitted using 2 or more layers. Here, retransmission of 1 CW may be expressed as enabling of only one codeword and disabling of other codewords.

As described above, based on a currently defined LTE or LTE-A system (e.g., a wireless communication system according to standards before 3GPP LTE Release-11), CQI is configured for 2 CWs if the value of RI is equal to or greater than 2 (i.e., if the rank exceeds 1) for N-port CSI-RS, and CQI is configured for 1 CW if the value of RI is 1 (i.e., if the rank is 1).

In a system supporting 3D beamforming using a 2D antenna array, the UE should determine CSI (RI/PMI/CQI) based on L-port CSI-RS of the horizontal direction (H-direction), determine CSI (RI/PMI/CQI) based on M-port CSI-RS of the vertical direction (V-direction), and thus finally determine CSI (RI/PMI/CQI) appropriate for 3D beamforming.

Here, if a legacy CQI determination method based on N-port CSI-RS is applied to CQI based on H-direction L-port CSI-RS and applied to CQI based on V-direction M-port CSI-RS, 3 or more CWs need to be supported. Meanwhile, if the system supporting 3D beamforming supports up to only 2 codewords, a legacy codeword-to-layer mapping rule or CQI calculation method may not be easily applied. Accordingly, the present invention proposes a new codeword-to-layer mapping rule and a new CQI calculation method.

CQI Calculation Method for 2D Antenna Array

For convenience of explanation, a precoding method using a Kronecker product is used among precoding methods applicable to a 2D antenna array to describe embodiments of the present invention. However, the scope of the present invention is not limited thereto and the principle of the present invention may be equally applied to other precoding methods.

For example, it is assumed that a final PMI is determined in the form of [V-PM] ⊗ [H-PM] due to Kronecker product operation of H-PM and V-PM as given by Equation 9. At this time, since a final rank in this case is determined according to a product of a rank value (i.e., Rank_V) serving as a basis of V-PM and a rank value (i.e., Rank_H) serving as a basis of H-PM, the final rank may be determined in the form of a product rank.

Here, assuming a system supporting up to 32 antenna ports (e.g., 8*4 2D antenna array) to which the final PMI is to be applied as in the example of Equation 9, a rank of any natural number value of 1, 2, 3, . . . , 32 is supported in a simple sense, and preliminarily designing of all PMIs for the rank values in the form of a codebook can be regarded as the codebook design principle of a legacy LTE system. However, designing of a codebook for all rank values as described above causes excessive overhead and UE feedback complexity thus can be inefficient in a massive antenna or 3D beamforming environment.

Accordingly, in the product rank method, if the final rank is determined as only a value corresponding to a common multiple of RI_V and RI_H, feedback overhead may be reduced, the number of rank value candidates assumed to select V-PM and H-PM may also be reduced, and thus UE feedback complexity may not be greatly increased while supporting 3D beamforming.

As such, when the UE calculates and reports RI_H/ PMI_H/CQI_H (or a part thereof) for H-direction L-port CSI-RS, and calculates and reports RI_V/PMI_V/CQI_V (or a part thereof) for V-direction M-port CSI-RS, a final rank may be determined as a product rank value such as RI_V*RI_H, and a final PM may be determined according to PMI_V and PMI_H which allow a result of Kronecker product operation between V-PM determined based on PMI_V and H-PM determined based on PMI_H, i.e., [V-PM]⊗[H-PM], to be an optimal PM.

Here, when RI and PMI are determined based on a product rank, the following two methods may be considered to calculate and report CQI_V and CQI_H by the UE. Method 1 may be a method for independently determining and feeding back CQI_V and CQI_H transparently to the UE. Method 2 may be a method for determining and feeding back CQI in consideration of a final RI and a final PMI non-transparently to the UE.

A detailed description is now given of Method 1.

According to Method 1, the UE may calculate CQI_V based on only V-direction M-port CSI-RS (i.e., without considering H-direction CSI-RS or CSI determined based thereon). That is, when CQI_V is calculated, CQI_V capable of achieving a frame error rate (FER) of 10% when only RI_V and PMI_V determined for V-direction M-port CSI-RS are applied may be selected. In addition, CQI_H may be calculated based on only H-direction L-port CSI-RS (i.e., without considering V-direction CSI-RS or CSI determined based thereon). That is, when CQI_H is calculated, CQI_H capable of achieving an FER of 10% when only RI_H and PMI_H determined for H-direction L-port CSI-RS are applied may be selected. This method may be a method for independently/separately calculating CQI_V and CQI_H, and may be understood as simple extension of a legacy CQI determination method based on N-port CSI-RS in a 1D antenna array. However, when CQI_V and CQI_H are separately calculated, a final PMI determined in the form of a Kronecker product using a product rank method may be additionally considered.

According to this method, not only CQI for a rank value of 1 (i.e., CQI for transmission of 1 CW) but also CQI for a rank value exceeding 1 (i.e., CQI for transmission of 2 or more CWs) may be calculated in each of the H-direction and the V-direction.

CQI_H and CQI_V calculated as described above may be used in various manners by the eNB. For example, if CQI_V based on RI_V=1 is reported, the eNB may determine a gain achievable when PMI_V serving as a basis to calculate CQI_V is applied to V-direction antenna elements. In addition, the eNB may predict the level of a gain achieved when CQI_V is applied, according to statistical estimates or a specific rule, and thus may correct H-direction CQI_H reported by the UE, in view of the eNB. That is, while CQI_H reported by the UE is calculated without considering a gain achieved V-direction precoding, the eNB may predict the value of CQI_H achievable when V-direction precoding is applied, in consideration of both CQI_V and CQI_H, and thus may predict a precoding matrix and CQI level more appropriate for 3D beamforming.

Additionally, for example, if CQI_V based on RI_V>1 is reported, CQI_V is calculated on the assumption of 2 CWs. Meanwhile, if RI_H=1, CQI_H is calculated on the assumption of transmission of 1 CW. If RI_H>1, CQI_H is calculated on the assumption of transmission of 2 CWs. Here, a final rank $RI_{ALL}$ (=RI_V*RI_H) may be regarded as an RI_V multiple of RI_H. In this case, when the eNB corrects CQI_H in consideration of CQI_V, CQI_H may be corrected according to a ratio of a CQI value for each CW (i.e., f(CW1) and f(CW2)) in CQI_V calculated on the assumption of 2 CWs. Specifically, the eNB may determine which one of CW1 and CW2 of CQI_V is mapped to each VAL layer (a codeword-to-layer mapping rule used in this case will be described in detail below), and correct CQI_H by a ratio of the determined CW in CQI_V.

In addition, when Method 1 is applied, the UE independently determines CQI_V and CQI_H. However, if CQI is determined based on the assumption of a product rank and a PM according to Kronecker product operation, UE capability, e.g., the number of Rx antennas of the UE, should be considered. Specifically, the UE may calculate RI/PMI/CQI in consideration of a restriction that the value of a final product rank should not exceed a maximum rank receivable by the UE.

For example, capability information about the maximum number of antennas receivable by the UE (or a parameter related thereto) or the maximum rank value (or the maximum number of layers) supportable by the UE may be defined. This capability information may be provided from the UE to the eNB upon a request of the eNB, when the UE performs initial access, when a specific event occurs, or according to a predefined rule.

The UE may calculate CSI for each of the H-direction and the V-direction according to a restriction that RI_H and RI_V should be selected within the maximum supportable rank value of the UE (i.e., the maximum supportable rank value in view of a product rank). Alternatively, CSI may be calculated in consideration of the restriction of the maximum supportable rank value of the UE only when the eNB gives an indication (e.g., through higher layer signaling (e.g., RRC signaling) or through dynamic signaling using DCI).

That is, even when the UE independently determines and separately feeds back CQI_V and CQI_H according to Method 1, RI_H and RI_V should be selected in consideration of a restriction that a final rank $RI_{ALL}$ (=RI_H*RI_V) should not exceed the maximum supportable rank value of the UE, and the other types of CSI (e.g., PMI_H, PMI_V, CQI_H, and CQI_V) may be calculated and reported based on the rank values.

A detailed description is now given of Method 2.

The UE may calculate CQI for a 2D antenna array (i.e., simultaneously considering H-direction and V-direction channel characteristics) based on the assumption of a product rank and a final PM determined in the form of a Kronecker product. Specifically, the UE may estimate a channel matrix $H_H$ by performing channel measurement based on H-direction L-port CSI-RS, and may estimate a channel matrix $H_V$ by performing channel measurement based on V-direction M-port CSI-RS. As such, a total channel matrix for the 2D antenna array (i.e., L*M panel antenna structure) may be estimated using $H_H$ and $H_V$. For example, if a total channel matrix $H_{ALL}$ is estimated according to interpolation of $H_H$ and $H_V$, the total channel matrix $H_{ALL}$ may be expressed as $H_{ALL} = H_V \otimes H_H$.

For $H_{ALL}$ estimated by the UE as described above, the UE may calculate optimal RI_V/PMI_V/CQI_V and RI_H/PMI_H/CQI_H on the assumption of the final product rank and the final PM having a form of a Kronecker product. In this case, a reception signal-to-interference plus noise ratio (SINR) may be calculated per layer (or per rank) in additional consideration of receiver beamforming assumptions (e.g., minimum mean square error (MMSE) and MMSE-interference rejection combiner (IRC)) of the UE.

Among these SINR values of multiple layers, a CQI value may be calculated based on an average SINR value of layers belonging to a certain group. Here, the layers belonging to a certain group may be defined as layers mapped to the same CW. Since the average SINR value varies depending on which layer is mapped to which CW, a codeword-to-layer mapping rule is important. Embodiments of the present invention related thereto will be described in detail below.

Method 2 described above may be a method for estimating $H_H$ based on only H-direction CSI-RS, estimating $H_V$ based on only V-direction CSI-RS, and then calculating CSI based on a total channel matrix $H_{ALL}$ estimated based on $H_H$ and $H_V$. Accordingly, the total channel matrix $H_{ALL}$ estimated by combining a few component channel matrices (e.g., $H_H$ and $H_V$) may be more appropriately used in an environment capable of reflecting actual channel state without large error. For example, the eNB may determine whether a current channel environment is the above-described channel environment, and may configure the UE to calculate and feedback CSI according to Method 2 only in that channel environment.

In addition, the CQI value determined based on the average SINR value of the layers mapped to the specific CW according to Method 2 may be calculated/reported as only CQI_H, calculated/reported as only CQI_V, separately calculated/reported as CQI_H and CQI_V, or calculated/reported as a total CQI $CQI_{ALL}$ irrespective of CQI_H and CQI_V. The CQI calculation/reporting method may be applied differently according to a codeword-to-layer mapping rule, and a detailed description thereof will be given below.

Codeword-to-Layer Mapping Method for 2D Antenna Array

As described above, the UE may determine $Rank_{ALL}$ (e.g., a product rank value of Rank_H indicated by RI_H and Rank_V indicated by RI_V) and $PM_{ALL}$ (e.g., a PM determined due to Kronecker product operation of H-PM indicated by PMI_H and V-PM indicated by PMI_V). In addition, the UE may determine $Rank_{ALL}$ and $PM_{ALL}$ in additional consideration of receiver beamforming. Hereinafter, for brevity, $RI_{ALL}$ is defined to refer to a value indicating $Rank_{ALL}$ or the $Rank_{ALL}$ value, and $PMI_{ALL}$ is defined to refer to a value indicating $PM_{ALL}$ or the $PM_{ALL}$ value.

Here, the UE may calculate an optimal SINR value for each of $RI_{ALL}$ layers (or streams). At this time, SINR values to be averaged to calculate a CQI value per CW among the $RI_{ALL}$ SINR values corresponding to the $RI_{ALL}$ layers may be determined according to a codeword-to-layer mapping rule.

Figure 17:
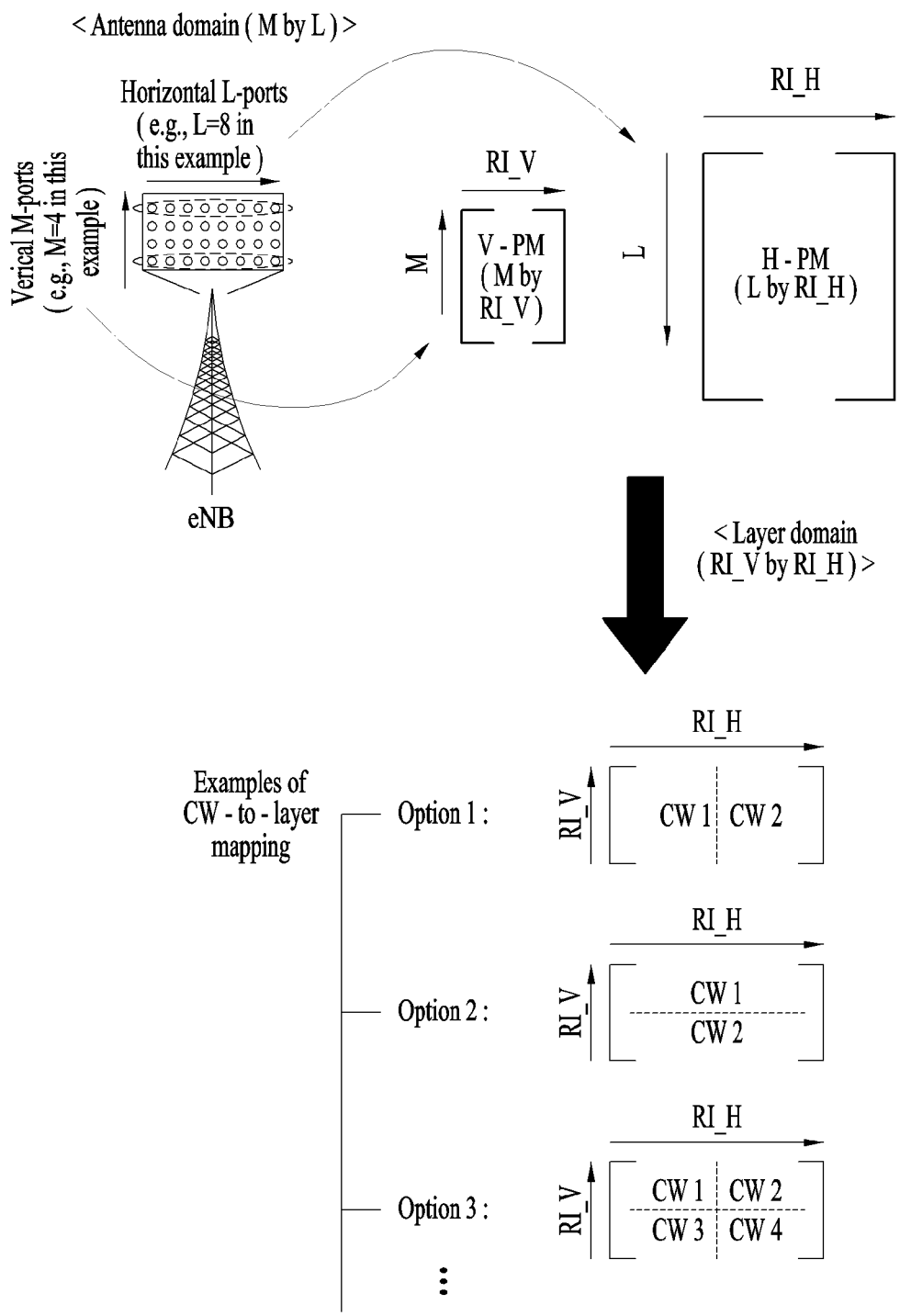
FIG. 17 is a diagram for describing examples of a codeword-to-layer mapping rule according to the present invention.

FIG. 17 is a diagram for describing examples of a codeword-to-layer mapping rule according to the present invention.

FIG. 17 illustrates three options of the codeword-to-layer mapping rule, Option 1, Option 2 and Option 3. Before describing the codeword-to-layer mapping relationship, a brief description is now given of the mutual relationship among ranks, antenna ports and layers, for example, in a 2D antenna array.

It is assumed that the 2D antenna array of the eNB consists of M antenna ports in the V-direction, and L antenna ports in the H-direction. As such, the 2D antenna array may be expressed using an M by L matrix in the antenna domain (or antenna port domain).

Furthermore, a V-direction precoding matrix V-PM defines the layer-to-antenna port mapping relationship in the V-direction. For example, if RI_V layers are present in the V-direction, V-PM may be expressed as an M by RI_V matrix. In addition, an H-direction precoding matrix H-PM defines the layer-to-antenna port mapping relationship in the H-direction. For example, if RI_H layers are present in the H-direction, H-PM may be expressed as an L by RI_H matrix.

In view of the layer domain, layers formable by the 2D antenna array may be expressed as an RI_V by RI_H matrix. In this case, RI_V*RI_H different layers may be specified. That is, each element of the RI_V by RI_H matrix corresponds to one layer. Furthermore, in view of layers having SINR values to be averaged to calculate CQI, each of the elements of the RI_V by RI_H matrix may be an SINR value of the corresponding layer.

Here, information about which layer is mapped to which codeword may be defined in various manners. Examples thereof are illustrated as Option 1, Option 2, and Option 3 in FIG. 17.

Option 1 is an example for distinguishing between CW1 and CW2 only in the RI_H direction. That is, multiple layers defined in the H-direction are mapped to CW1 and CW2 in a distributed manner (e.g., as evenly distributed as possible as in FIG. 16). Meanwhile, layer(s) defined in the V-direction is mapped to only one of CW1 and CW2 (i.e., not mapped to CW1 and CW2 in a distributed manner).

Option 2 is an example for distinguishing between CW1 and CW2 only in the RI_V direction. That is, multiple layers defined in the V-direction are mapped to CW1 and CW2 in a distributed manner (e.g., as evenly distributed as possible as in FIG. 16). Meanwhile, layer(s) defined in the H-direction is mapped to only one of CW1 and CW2 (i.e., not mapped to CW1 and CW2 in a distributed manner).

Option 3 is an example applicable to a system supporting 3 or more TBs to exceed the limitation of a legacy LTE system supporting up to 2 TBs. In this case, a CW is generated for each of the 3 or more TBs, and thus the 3 or more CWs may be mapped to the TBs to be as evenly distributed as possible in both the H-direction and the V-direction as illustrated in Option 3. Alternatively, the TB-to-CW mapping relationship may be newly defined. Even when an extended number of TBs are supported as described above, the maximum number of supportable TBs may be predefined. For example, the maximum number of supportable TBs may be 4 as in Option 3. In this case, layer indexes (i.e., 1, 2, 3, . . . , $RI_{ALL}$) may be given to a total number of layer elements of $RI_{ALL}$ (=RI_H*RI_V) according to a specific predefined rule.

A detailed description is now given of Option 1 and Option 2 of the codeword-to-layer mapping rule of FIG. 17.

In view of CQI calculation, Option 1 may be expressed as a method for averaging of SINR values per column (i.e., elements corresponding to the same column in the H-direction). Option 2 may be expressed as method for averaging of SINR values per row (i.e., elements corresponding to the same row in the V-direction).

Then, Option 1 may be expressed as a method for determining CQI for CW1 by averaging SINR values of elements belonging to a column group corresponding to CW1, and determining CQI for CW2 by averaging SINR values of elements belonging to a column group corresponding to CW2 in the H-direction. Option 2 may be expressed as a method for determining CQI for CW1 by averaging SINR values of elements belonging to a row group corresponding to CW1, and determining CQI for CW2 by averaging SINR values of elements belonging to a row group corresponding to CW2 in the V-direction.

That is, in view of CQI calculation, since SINR values corresponding to all layers are averaged in the RI_V direction, Option 1 may be expressed as a method for calculating CQI in consideration of CW-to-layer mapping only in the RI_H direction. Thus, a final CQI may be calculated as CQI for 2 CWs in the H-direction.

Likewise, Option 2 may be expressed as a method for calculating CQI in consideration of CW-to-layer mapping only in the RI_V direction by regarding that SINR values corresponding to all layers are averaged in the RI_H direction. Thus, a final CQI may be calculated as CQI for 2 CWs in the V-direction.

As such, feedback contents to be reported by the UE include RI_H, RI_V, PMI_H, and PMI_V, and one CQI may be additionally reported. That is, for CQI, CQI_V and CQI_H may not be separately calculated and reported, but one final CQI (e.g., $CQI_{ALL}$) may be calculated and reported. That is, CQI_H' may correspond to $CQI_{ALL}$ according to Option 1, and CQI_V' may correspond to $CQI_{ALL}$ according to Option 2. Here, it should be noted that CQI_H' according to Option 1 is not the same as CQI_H calculated without considering V-direction channel characteristics but considering only H-direction channel characteristics according to Method 1, and that CQI_V' according to Option 2 is not the same as CQI_V calculated without considering H-direction channel characteristics but considering only V-direction channel characteristics according to Method 1.

Meanwhile, a CSI feedback transmission method includes aperiodic CSI feedback and periodic CSI feedback. Aperiodic CSI feedback is a method for transmitting CSI feedback information when a specific event such as a request of the eNB occurs. Periodic CSI feedback is a method for transmitting CSI using a container having restricted capacity at a preset transmission timing.

In aperiodic CSI feedback, all or some of these five types of feedback contents (i.e., RI_H, RI_V, PMI_H, PMI_V, and $CQI_{ALL}$) proposed by the present invention may be reported in one subframe.

Although aperiodic CSI feedback is transmitted through, for example, PUSCH and thus has sufficient transmission capacity, periodic CSI feedback is transmitted through PUCCH and thus a transmission timing (e.g., transmission period, offset) should be predefined per CSI type due to limited transmission capacity.

Accordingly, the periodic CSI feedback configuration should be newly designed for the above-described five types of feedback contents.

According to the present invention, different periods and/or offsets may be applied to RI_H and RI_V. For example, RI_H and RI_V may be configured with a common transmission period but different offsets and thus may be transmitted at different timings. Alternatively, RI_H and RI_V may be configured with a common transmission period and a common transmission offset and thus may be transmitted at the same timing through multiplexing. Otherwise, RI_H and RI_V may be configured with different transmission periods and different transmission offsets.

Thereafter, different periods and/or offsets may be applied to PMI_H and PMI_V. In addition, for example, PMI_H and PMI_V may be configured with a common transmission period but different offsets and thus may be transmitted at different timings. Alternatively, PMI_H and PMI_V may be configured with a common transmission period and a common transmission offset and thus may be transmitted at the same timing through multiplexing. Otherwise, PMI_H and PMI_V may be configured with different transmission periods and different transmission offsets. Additionally, a transmission timing of PMI_H may be configured based on the transmission period of RI_H (e.g., PMI_H may be configured to be transmitted X times during N transmission cycles of RI_H, and an offset of PMI_H may be configured based on the transmission timing of RI_H), and a transmission timing of PMI_V may be configured based on the transmission period of RI_V.

Then, a transmission timing of $CQI_{ALL}$ (i.e., only CQI_H' for up to 2 CWs according to Option 1, or only CQI_V' for up to 2 CWs according to Option 2) may be determined according to a specific period and offset. For example, if CQI_H' is transmitted according to Option 1, CQI_H' may be configured to be multiplexed and transmitted with PMI_H based on the transmission period/offset of PMI_H, or to be transmitted at another timing in a disjointed manner. Otherwise, if CQI_V' is transmitted according to Option 2, CQI_V' may be configured to be multiplexed and transmitted with PMI_V based on the transmission period/offset of PMI_V, or to be transmitted at another timing in a disjointed manner.

That is, the periodic feedback configuration may be designed not to report both CQI_H' and CQI_V' but to report only one of CQI_H' or CQI_V' according to which one of Option 1 and Option 2 is used as a codeword-to-layer mapping method.

If only CQI_H' is reported according to Option 1, CQI_V' is not transmitted at a timing designed to transmit CQI_V' (this may be expressed as dropping of CQI_V'). Likewise, If only CQI_V' is reported according to Option 2, CQI_H' is not transmitted at a timing designed to transmit CQI_H' (this may be expressed as dropping of CQI_H').

In other words, transmission timings of $CQI_{ALL}$ (e.g., the union of a set of transmission timings of CQI_H' according to Option 1 and a set of transmission timings of CQI_V' according to Option 2) may be predefined according to candidates of the codeword-to-layer mapping rule, $CQI_{ALL}$ may be transmitted only at some of the transmission timings according to which candidate is applied (e.g., only at the transmission timings of CQI_H' according to Option 1, or only at the transmission timings of CQI_V' according to Option 2), and not transmitted (or dropped) at the other transmission timings (e.g., the transmission timings of CQI_V' according to Option 1, or the transmission timings of CQI_H' according to Option 2).

Additionally, for example, the UE may calculate CQIs based on the assumption of all candidates of the codeword-to-layer mapping rule, and report all of the calculated CQIs.

For example, the UE determines RI_H, RI_V, PMI_H and PMI_V, calculates CQI_H' on the assumption of a codeword-to-layer mapping rule according to Option 1, and calculates CQI_V' on the assumption of a codeword-to-layer mapping rule according to Option 2. Irrespective of which codeword-to-layer mapping rule is actually applied, the UE may report CQI_H' and CQI_V' to the eNB at transmission timings designed for Option 1 and Option 2, respectively. That is, both CQI_H' and CQI_V' are transmitted without being dropped.

As such, the eNB may determine the most appropriate CQI selectively using any one of CQI_H' and CQI_V', or in consideration of both. In addition, the eNB may determine which one of the candidates of the codeword-to-layer mapping rule is the most appropriate candidate. The eNB may signal the determined codeword-to-layer mapping rule to the UE, and schedule a downlink signal according to the rule. The eNB may signal information about the determined codeword-to-layer mapping rule to the UE semi-statically (e.g., through higher layer signaling (e.g., RRC signaling)) or dynamically (e.g., through DCI signaling). As such, the UE may acquire information about the applied codeword-to-layer mapping rule, and may correctly decode the downlink signal according to the rule.

Figure 18:
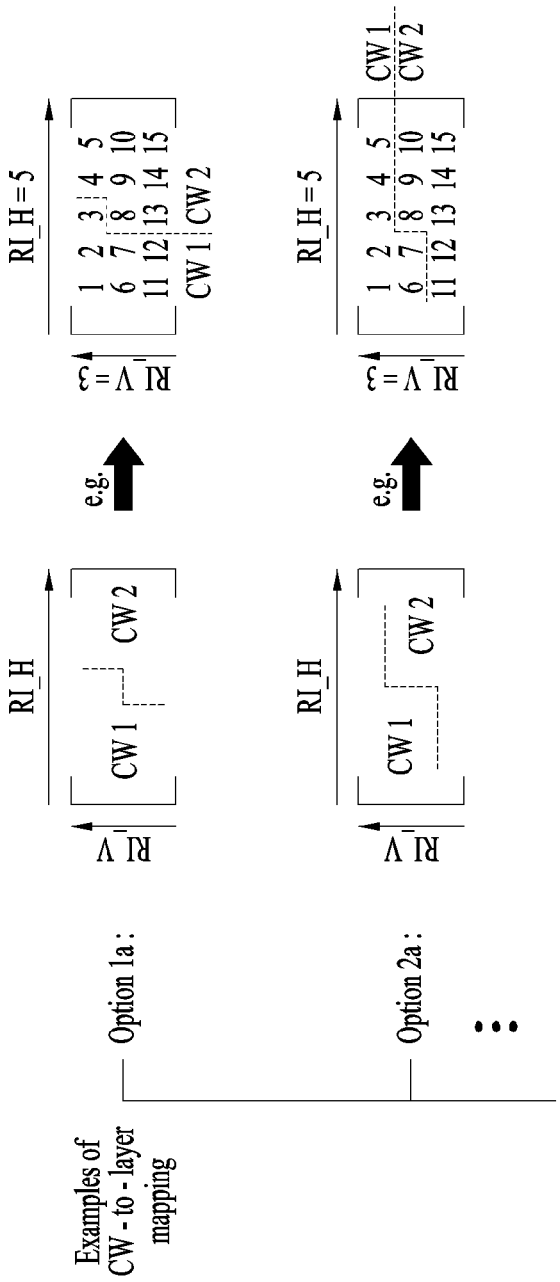
FIG. 18 is a diagram for describing additional examples of the codeword-to-layer mapping rule according to the present invention.

FIG. 18 is a diagram for describing additional examples of the codeword-to-layer mapping rule according to the present invention.

Examples of Option 1a and Option 2a of FIG. 18 may be understood as extensions of Option 1 and Option 2 of FIG. 17, respectively. FIG. 18 shows that a total of $RI_{ALL}=15$ layer elements (or SINR values corresponding to layers) of a layer domain matrix of RI_H=5 and RI_V=3 are indexed 1, 2, 3, . . . , 15 in a row first manner. These layer indexes are merely exemplary, and may also be provided in a column first manner or using another method. A description of various methods for providing layer indexes will be given below with reference to FIG. 21.

Option 1a is similar to Option 1 in that codeword-to-layer mapping is performed by distinguishing between CW1 and CW2 mostly in the RI_H direction. However, while Option 1 is a method for mapping layer elements to CW1 and CW2 to be as evenly distributed as possible on a column basis, Option 1a may be a method for mapping a total of $RI_{ALL}$ layer elements to CW1 and CW2 to be as evenly distributed as possible. As such, the layer elements in the first and second columns (e.g., layer indexes 1, 6, 11, 2, 7, and 12) may all be mapped to CW1, and the layer elements in the fourth and fifth columns (e.g., layer indexes 4, 9, 14, 5, 10, and 15) may all be mapped to CW2. However, one of 3 layer elements of the third column (e.g., layer index 3) may be mapped to CW1, and the other two (e.g., layer indexes 8 and 13) may be mapped to CW2. As such, 7 of a total of 15 layer elements may be mapped to CW1 and 8 thereof may be mapped to CW2. If the total number of layer elements is an even number, equal numbers of layer elements will be mapped to CW1 and CW2.

Option 2a is similar to Option 2 in that codeword-to-layer mapping is performed by distinguishing between CW1 and CW2 mostly in the RI_V direction. However, while Option 2 is a method for mapping layer elements to CW1 and CW2 to be as evenly distributed as possible on a row basis, Option 2a may be a method for mapping a total of $RI_{ALL}$ layer elements to CW1 and CW2 to be as evenly distributed as possible. As such, the layer elements in the first row (e.g., layer indexes 1, 2, 3, 4, and 5) may all be mapped to CW1, and the layer elements in the third row (e.g., layer indexes 11, 12, 13, 14, and 15) may all be mapped to CW2. However, two of 5 layer elements of the second row (e.g., layer indexes 6 and 7) may be mapped to CW1, and the other three (e.g., layer indexes 8, 9, and 10) may be mapped to CW2. As such, 7 of a total of 15 layer elements may be mapped to CW1 and 8 thereof may be mapped to CW2. If the total number of layer elements is an even number, equal numbers of layer elements will be mapped to CW1 and CW2.

As such, CQI for CW1 may be calculated by averaging SINR values corresponding to Set1 of the layer elements mapped to CW1, and CQI for CW2 may be calculated by averaging SINR values corresponding to Set2 of the layer elements mapped to CW2. Furthermore, a mapping method for allowing Set1 and Set2 to include as equal numbers of elements as possible among a total of $RI_{ALL}$ SINR values may be predefined as various methods in addition to Option 1a or Option 2a, and information about which mapping method is applied may be signaled from the eNB to the UE through higher layer signaling or dynamic signaling.

That is, the codeword-to-layer mapping method proposed by the present invention includes various methods for defining layer elements mapped to CW1 and CW2 in a 2D layer domain defined by RI_H and RI_V, using regions divided by a certain 2D boundary, and CQI for a corresponding codeword may be calculated by averaging SINR values corresponding to the layer elements belonging to each region.

Figure 19:
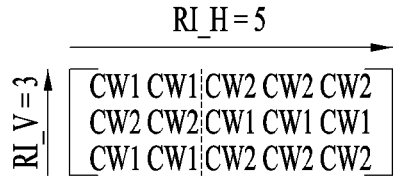
FIG. 19 is a diagram for describing additional examples of the codeword-to-layer mapping rule according to the present invention.
Figure 19:
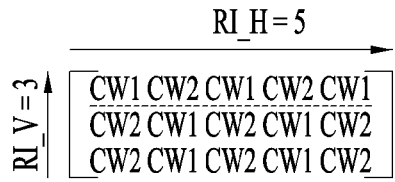

FIG. 19 is a diagram for describing additional examples of the codeword-to-layer mapping rule according to the present invention.

Option 1b is similar to Option 1 or Option 1a in that codeword-to-layer mapping is applied mostly in the RI_H direction. However, in Option 1b, layer elements mapped to CWs may be switched between rows. Specifically, Option 1b may assume that 5 layer elements belonging to the first row may be mapped to CW1 and CW2 to be as evenly distributed as possible. For example, 2 layer elements may be mapped to CW1 and 3 layer elements may be mapped to CW2. Then, among 5 layer elements belonging to the second row, 2 layer elements may be mapped to CW2 and 3 layer elements may be mapped to CW1. Thereafter, among 5 layer elements belonging to the third row, 2 layer elements may be mapped to CW1 and 3 layer elements may be mapped to CW2. As described above, the codeword-to-layer mapping method in the RI_H direction may be applied as in the legacy technology (e.g., FIG. 16) in one row, but the order of CW1 and CW2 may be changed or switched in another row. As such, diversity of beam directions of layers mapped to different codewords may be increased.

Option 2b is similar to Option 2 or Option 2a in that codeword-to-layer mapping is applied mostly in the RI_V direction. However, in Option 2b, layer elements mapped to CWs may be switched between columns. Specifically, Option 2b may assume that 3 layer elements belonging to the first column may be mapped to CW1 and CW2 to be as evenly distributed as possible. For example, 1 layer element may be mapped to CW1 and 2 layer elements may be mapped to CW2. Then, among 3 layer elements belonging to the second column, 1 layer element may be mapped to CW2 and 2 layer elements may be mapped to CW1. Thereafter, among 3 layer elements belonging to the third column, 1 layer element may be mapped to CW1 and 2 layer elements may be mapped to CW2. Then, among 3 layer elements belonging to the fourth column, 1 layer element may be mapped to CW2 and 2 layer elements may be mapped to CW1. Thereafter, among 3 layer elements belonging to the fifth column, 1 layer element may be mapped to CW1 and 2 layer elements may be mapped to CW2. As described above, the codeword-to-layer mapping method in the RI_V direction may be applied as in the legacy technology (e.g., FIG. 16) in one column, but the order of CW1 and CW2 may be changed or switched in another column. As such, diversity of beam directions of layers mapped to different codewords may be increased.

Information about whether the codeword-to-layer mapping rule proposed in FIG. 19 is applied, and information about which mapping method is applied may be signaled to the UE through higher layer signaling or dynamic signaling.

In the above-described embodiments of the present invention, information about which codeword-to-layer mapping rule is applied may be signaled from the eNB to the UE through dynamic signaling (e.g., DCI signaling), and this dynamic signaling may include information for triggering aperiodic CSI feedback.

Furthermore, information about the codeword-to-layer mapping rule according to the above-described embodiments of the present invention may be indicated for initial transmission or retransmission.

Figure 20:
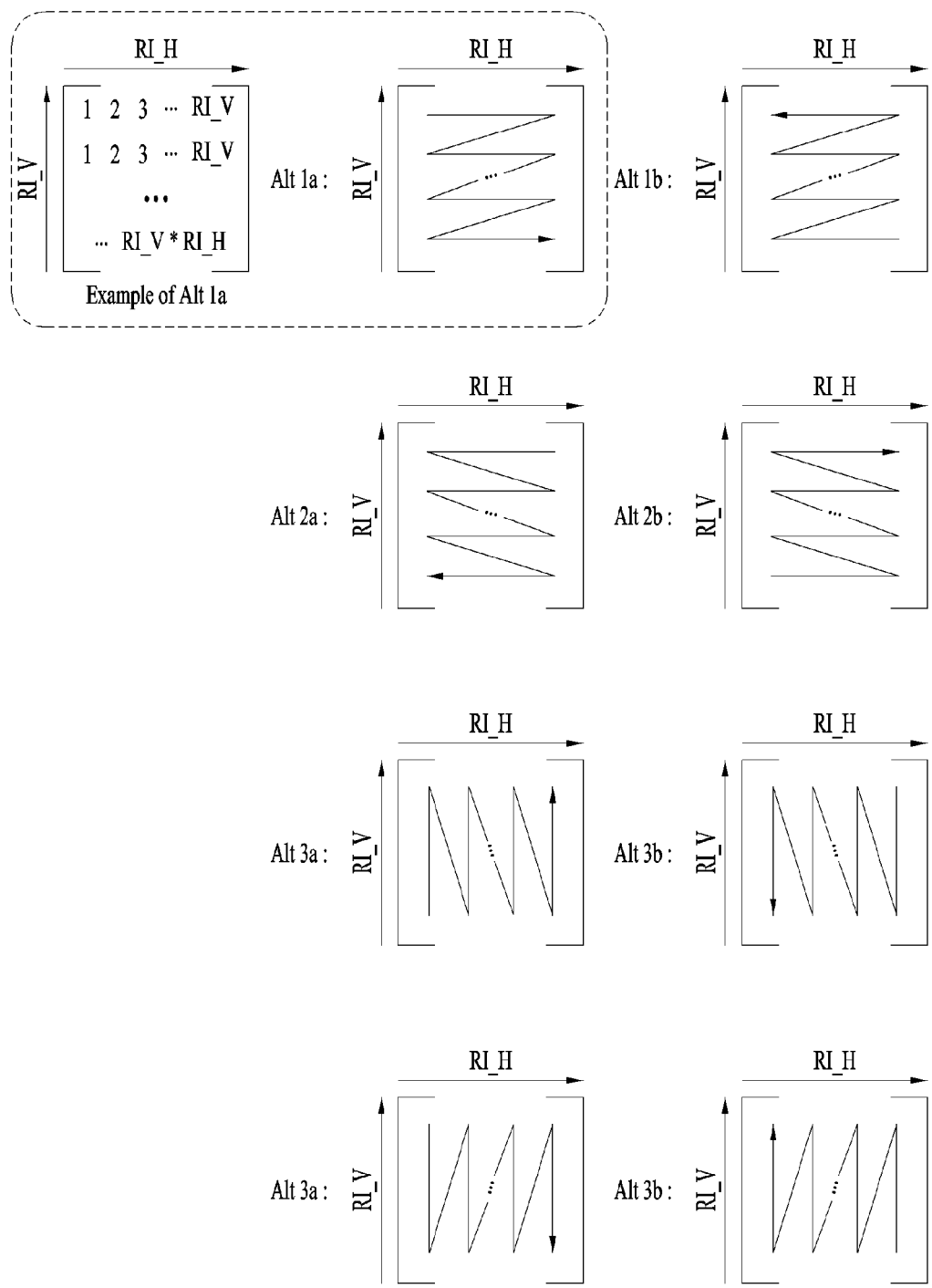
FIG. 20 is a diagram for describing a layer index mapping method according to the present invention.

FIG. 20 is a diagram for describing a layer index mapping method according to the present invention.

Among examples of FIG. 20, Alt 1a, Alt 1b, Alt 2a, and Alt 2b are methods for providing layer indexes in a row first manner, and Alt 3a, Alt 3b, Alt 4a, and Alt 4b are methods for providing layer indexes in a column first manner. The row first method is a method for providing layer indexes to all elements belonging to a row in a layer domain matrix (e.g., RI_V by RI_H matrix), and then providing layer indexes to elements belonging to a subsequent row. Similarly, the column first method is a method for providing layer indexes to all elements belonging to a column in a layer domain matrix, and then providing layer indexes to elements belonging to a subsequent column. As such, a total of $RI_{ALL}$ layer elements may be indexed 1, 2, 3, . . . , $RI_{ALL}$ (RI_V*RI_H).

In the RI_V by RI_H matrix of FIG. 20, RI_V elements are arranged in such a manner that a rank value increases from bottom to top, and RI_H elements are arranged in such a manner that a rank value increases from left to right. A description is now given of each example based the above-described arrangement.

Alt 1a is a method for providing layer indexes in the order from a low rank to a high rank in each row in the RI_H direction, and providing layer indexes in the order from a high rank to a low rank in the RI_V direction. Specifically, among layer elements of a row (e.g., the first row in FIG. 20) corresponding to the highest rank in the RI_V direction, an element corresponding to the lowest rank in the RI_H direction is indexed 1, the layer index is sequentially incremented by 1, and the last layer element is indexed RI_H. Layer elements of a subsequent row (i.e., a row corresponding to the second highest rank in the RI_V direction) are indexed RI_H+1, RI_H+2, . . . , 2RI_H. Layer elements of the last row (i.e., a row corresponding to the lowest rank in the RI_V direction) are indexed (RI_V−1)*RI_H+1, (RI_V−1)*RI_H+2, . . . , RI_V*RI_H.

Alt 1b is a method for providing layer indexes in the order from a high rank to a low rank in each row in the RI_H direction, and providing layer indexes in the order from a low rank to a high rank in the RI_V direction.

Alt 2a is a method for providing layer indexes in the order from a high rank to a low rank in each row in the RI_H direction, and providing layer indexes in the order from a high rank to a low rank in the RI_V direction.

Alt 2b is a method for providing layer indexes in the order from a low rank to a high rank in each row in the RI_H direction, and providing layer indexes in the order from a low rank to a high rank in the RI_V direction.

Alt 3a is a method for providing layer indexes in the order from a low rank to a high rank in each column in the RI_V direction, and providing layer indexes in the order from a low rank to a high rank in the RI_H direction.

Alt 3b is a method for providing layer indexes in the order from a high rank to a low rank in each column in the RI_V direction, and providing layer indexes in the order from a high rank to a low rank in the RI_H direction.

Alt 4a is a method for providing layer indexes in the order from a high rank to a low rank in each column in the RI_V direction, and providing layer indexes in the order from a low rank to a high rank in the RI_H direction.

Alt 4b is a method for providing layer indexes in the order from a low rank to a high rank in each column in the RI_V direction, and providing layer indexes in the order from a high rank to a low rank in the RI_H direction.

These various layer index mapping patterns may be predefined, and information about which layer index mapping pattern is applied may be signaled from the eNB to the UE, for example, through higher layer signaling. In addition, the examples of FIG. 20 are not restrictive and the scope of the present invention includes various methods for allocating indexes to distinguish layer elements of a 2D layer domain matrix.

Figure 21:
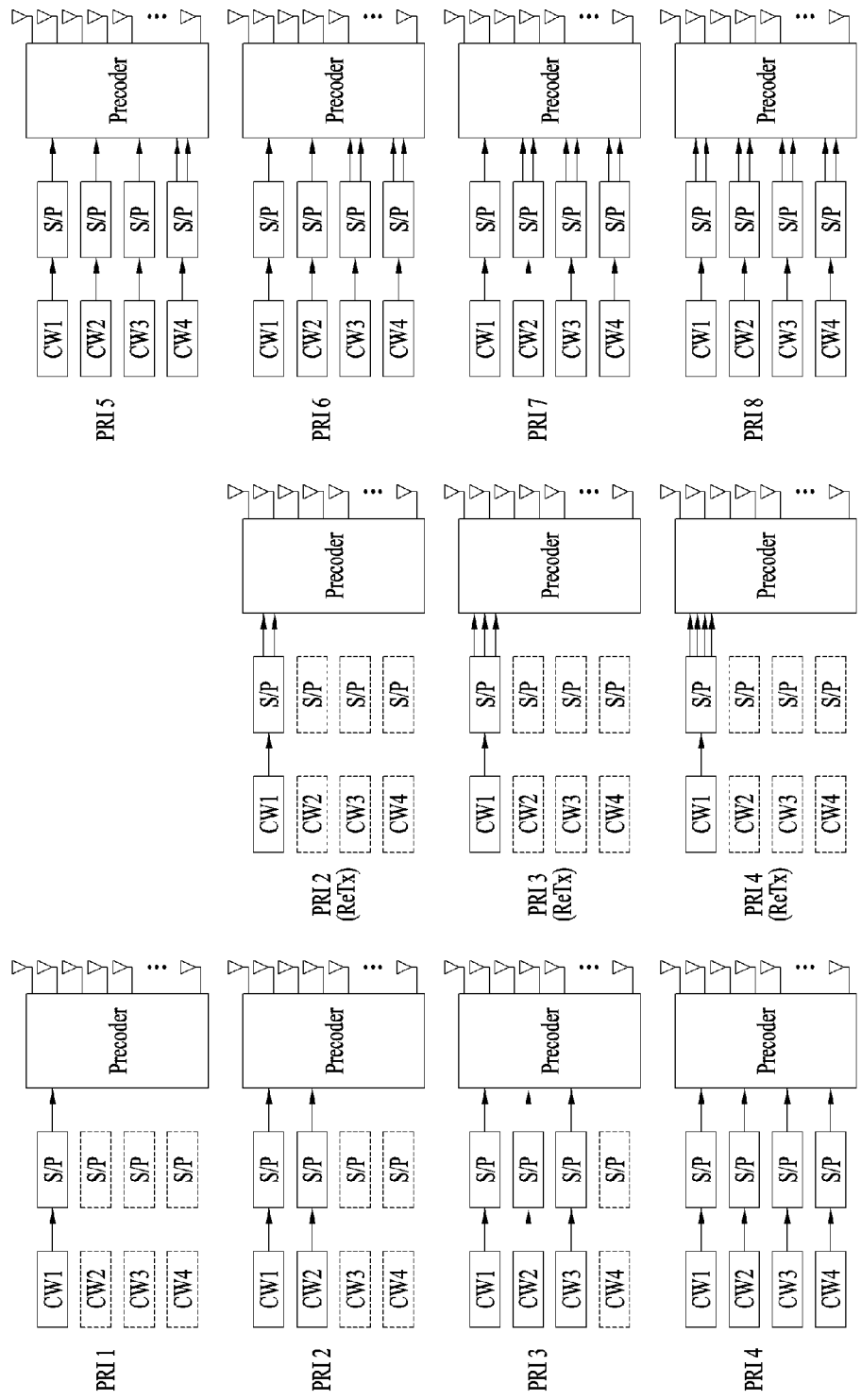
FIGS. 21 to 23 are diagrams illustrating examples of the codeword-to-layer mapping rule according to the present invention when up to 4 codewords are supported.
Figure 22:
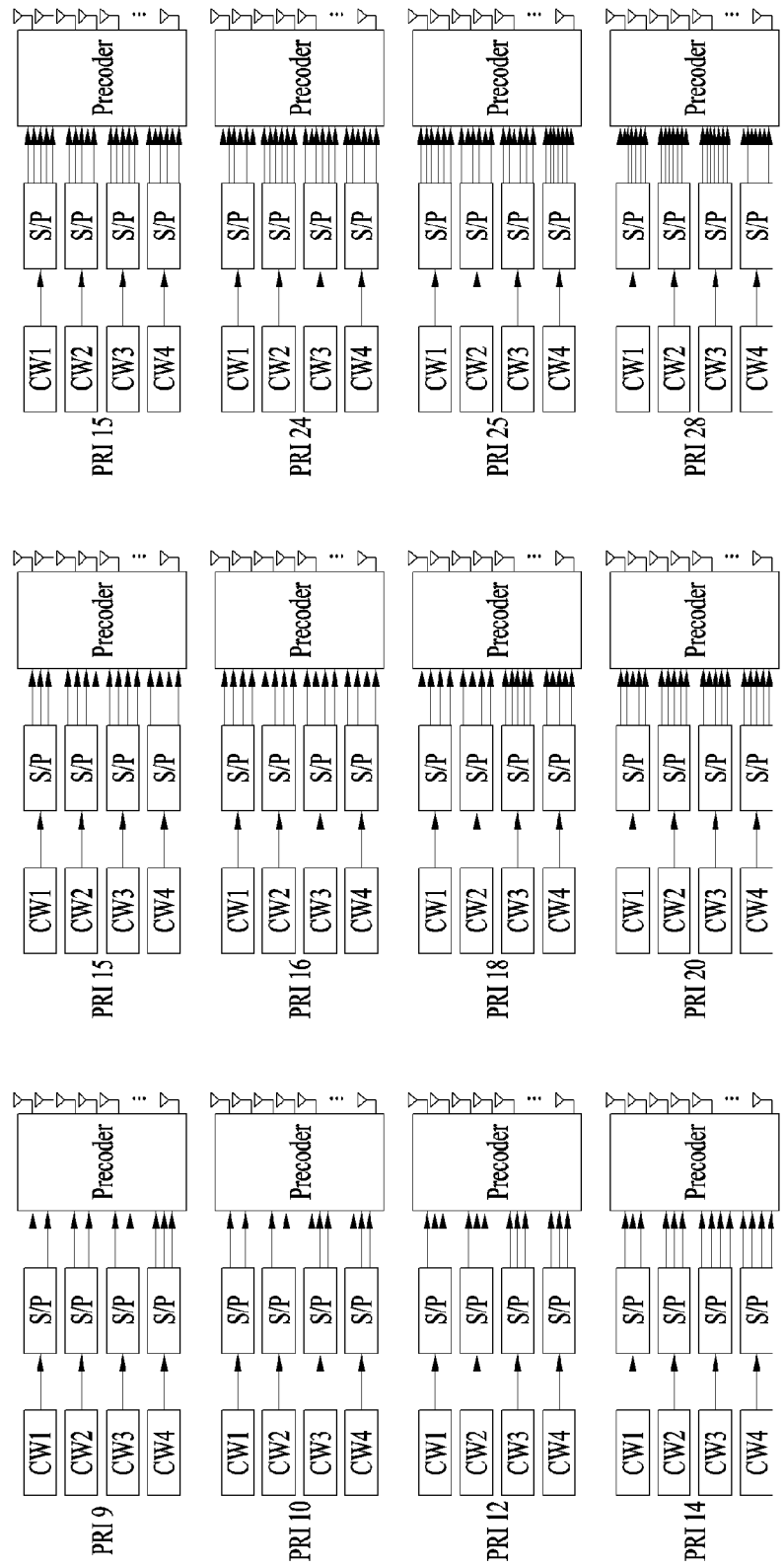
Figure 23:
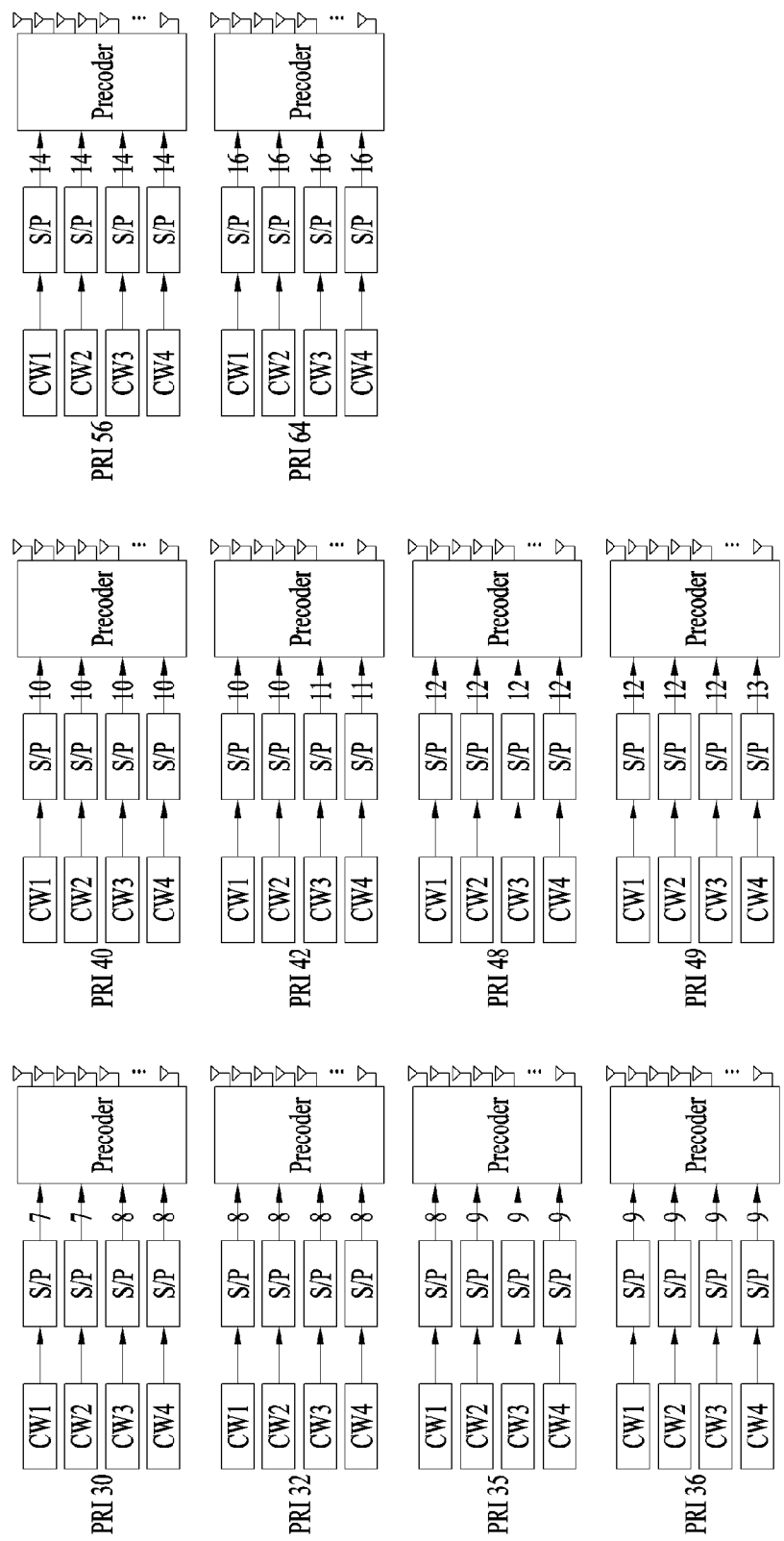

FIGS. 21 to 23 are diagrams illustrating examples of the codeword-to-layer mapping rule according to the present invention when up to 4 codewords are supported.

For example, in a system supporting up to 4 codewords, the codeword-to-layer mapping rule may be determined as a method for providing layer indexes in a layer domain 2D matrix using the method of FIG. 20, and defining information about which layer element is mapped to which codeword, using the method according to Option 3 of FIG. 17. Here, Option 3 of FIG. 17 is merely exemplary and various codeword-to-layer mapping methods may be defined.

In the examples of FIGS. 21 to 23, when the maximum number of supportable TBs is 4, RI_H has a value among 1, 2, 3, . . . , 8, and RI_V has a value among 1, 2, 3, . . . , 8, a product RI (PRI) value may have a value among 1, 2, 3, 4, 5, 6, 7, 8, 9, 10, 12, 14, 15, 16, 18, . . . , 64. Here, it should be noted that the PRI value is defined as RI_V*RI_H and thus does not have values of 11, 13, 17, 19, 23, . . . in the above example.

The examples of FIGS. 21 to 23 show that layers mapped to multiple codewords are as evenly distributed as possible.

Meanwhile, in the example of FIG. 21, the case of retransmission (ReTx) shows that, although multiple codeword transmission of PRI>1 (i.e., PRI≥2) has been performed in initial transmission, when one codeword is not successfully decoded by a receiver and thus the corresponding codeword is retransmitted, the codeword may be mapped to 2, 3 or 4 layers. Here, retransmission of one codeword may be expressed as enabling of only one codeword and disabling of other codewords. The codeword-to-layer mapping rule for retransmission of one codeword (or enabling of only one codeword and disabling of other codewords) is illustrated only in FIG. 21, but may be similarly applied to retransmission of 2 or 3 codewords (or enabling of multiple codewords and disabling of other codewords) in higher-rank transmission of FIG. 22 or FIG. 23.

A detailed description is now given of the above codeword-to-layer mapping method according to the present invention, based on the signal processing procedure of FIG. 15.

The procedure for scrambling encoded bits of 2 codewords and the procedure for modulating the scrambled bits in FIG. 15 may be equally performed here. However, when 2 or more codewords are supported, scrambling and modulation may be performed on each of the multiple codewords.

Modulation symbols having complex values may be generated as the scrambled bits are modulated. A block of complex modulation symbols for each codeword q may be expressed as $d^{(q)}(0), \ldots, d^{(q)}(M_{symb}^{(q)}-1)$. $M_{symb}^{(q)}$ is a value indicating the number of modulation symbols transmitted on a physical channel for the codeword q.

The block of the complex modulation symbols is input to a layer mapper. Output of the layer mapper is expressed as a matrix X(i).

A description is now given separately of a method (i.e., structure 1) for expressing each element of the matrix X(i) as a single index variable, and a method (i.e., structure 2) for expressing each element of the matrix X(i) as a pair of multiple index variables.

Structure 1 may be a method for expressing each element of the output matrix X(i) of the layer mapper as a single index variable (e.g., r=0, 1, . . . , υ).

When the matrix X(i) is expressed using a vector x(i), the block $d^{(q)}(0), \ldots, d^{(q)}(M_{symb}^{(q)}-1)$ of the complex modulation symbols for the codeword q is mapped to layers $x(i)=[x^{(0)}(i) \ldots x^{(r)}(i) \ldots x^{(r)}(i) \ldots x^{(\upsilon-1)}(i)]^T$. Here, i=0, 1, . . . , $M_{symb}^{layer}-1$, υ is the number of layers, and $M_{symb}^{layer}$ is the number of modulation symbols per layer.

Here, υ may be $\upsilon=RI_{ALL}=RI\_H*RI\_V$ as proposed by the present invention.

For example, in the case of layer mapping for spatial multiplexing, the codeword-to-layer mapping rule of Table 4 according to the legacy method may be newly defined as shown in Table 6 to be appropriate for a MIMO transmission structure supporting a 2D antenna array (or 3D beamforming).

TABLE 6

| Number of layers | Number of codewords | Codeword-to-layer mapping i = 0, 1, . . . , $M_{symb}^{layer}-1$ | |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$ | $M_{symb}^{layer} = M_{symb}^{(0)}/2$ |
|   |   | $x^{(1)}(i) = d^{(0)}(2i + 1)$ | |
| 2 | 2 | $x^{(0)}(i) = d^{(0)}(i)$ | $M_{symb}^{layer} = M_{symb}^{(0)} = M_{symb}^{(1)}$ |
|   |   | $x^{(1)}(i) = d^{(1)}(i)$ | |
| 3 | 1 | $x^{(0)}(i) = d^{(0)}(3i)$ | $M_{symb}^{layer} = M_{symb}^{(0)}/3$ |
|   |   | $x^{(1)}(i) = d^{(0)}(3i + 1)$ | |
|   |   | $x^{(2)}(i) = d^{(0)}(3i + 2)$ | |
| 3 | 2 | $x^{(0)}(i) = d^{(0)}(i)$ | $M_{symb}^{layer} = M_{symb}^{(0)} = M_{symb}^{(1)}/2$ |
|   |   | $x^{(1)}(i) = d^{(1)}(2i)$ | |
|   |   | $x^{(2)}(i) = d^{(1)}(2i + 1)$ | |
| 4 | 1 | $x^{(0)}(i) = d^{(0)}(4i)$ | $M_{symb}^{layer} = M_{symb}^{(0)}/4$ |
|   |   | $x^{(1)}(i) = d^{(0)}(4i + 1)$ | |
|   |   | $x^{(2)}(i) = d^{(0)}(4i + 2)$ | |
|   |   | $x^{(3)}(i) = d^{(0)}(4i + 3)$ | |
| 4 | 2 | $x^{(0)}(i) = d^{(0)}(2i)$ | $M_{symb}^{layer} = M_{symb}^{(0)}/2 = M_{symb}^{(1)}/2$ |
|   |   | $x^{(1)}(i) = d^{(0)}(2i + 1)$ | |
|   |   | $x^{(2)}(i) = d^{(1)}(2i)$ | |
|   |   | $x^{(3)}(i) = d^{(1)}(2i + 1)$ | |
| 5 | 2 | $x^{(0)}(i) = d^{(0)}(2i)$ | $M_{symb}^{layer} = M_{symb}^{(0)}/2 = M_{symb}^{(1)}/3$ |
|   |   | $x^{(1)}(i) = d^{(0)}(2i + 1)$ | |
|   |   | $x^{(2)}(i) = d^{(1)}(3i)$ | |
|   |   | $x^{(3)}(i) = d^{(1)}(3i + 1)$ | |
|   |   | $x^{(4)}(i) = d^{(1)}(3i + 2)$ | |
| 5 | 4 | $x^{(0)}(i) = d^{(0)}(i)$ | $M_{symb}^{layer} = M_{symb}^{(0)} = M_{symb}^{(1)} =$ |
|   |   | $x^{(1)}(i) = d^{(1)}(i)$ | $M_{symb}^{(2)} = M_{symb}^{(3)}/2$ |

TABLE 6-continued

| Number of layers | Number of codewords | Codeword-to-layer mapping $i = 0, 1, \ldots, M_{symb}^{layer} - 1$ | |
|---|---|---|---|
| | | $x^{(2)}(i) = d^{(2)}(i)$ <br> $x^{(3)}(i) = d^{(3)}(2i)$ <br> $x^{(4)}(i) = d^{(3)}(2i + 1)$ | |
| 6 | 2 | $x^{(0)}(i) = d^{(0)}(3i)$ <br> $x^{(1)}(i) = d^{(0)}(3i + 1)$ <br> $x^{(2)}(i) = d^{(0)}(3i + 2)$ <br> $x^{(3)}(i) = d^{(1)}(3i)$ <br> $x^{(4)}(i) = d^{(1)}(3i + 1)$ <br> $x^{(5)}(i) = d^{(1)}(3i + 2)$ | $M_{symb}^{layer} = M_{symb}^{(0)}/3 = M_{symb}^{(1)}/3$ |
| 6 | 4 | $x^{(0)}(i) = d^{(0)}(i)$ <br> $x^{(1)}(i) = d^{(1)}(i)$ <br> $x^{(2)}(i) = d^{(2)}(2i)$ <br> $x^{(3)}(i) = d^{(2)}(2i + 1)$ <br> $x^{(4)}(i) = d^{(3)}(2i)$ <br> $x^{(5)}(i) = d^{(3)}(2i + 1)$ | $M_{symb}^{layer} = M_{symb}^{(0)} = M_{symb}^{(1)} = M_{symb}^{(2)}/2 = M_{symb}^{(3)}/2$ |
| 7 | 2 | $x^{(0)}(i) = d^{(0)}(3i)$ <br> $x^{(1)}(i) = d^{(0)}(3i + 1)$ <br> $x^{(2)}(i) = d^{(0)}(3i + 2)$ <br> $x^{(3)}(i) = d^{(1)}(4i)$ <br> $x^{(4)}(i) = d^{(1)}(4i + 1)$ <br> $x^{(5)}(i) = d^{(1)}(4i + 2)$ <br> $x^{(6)}(i) = d^{(1)}(4i + 3)$ | $M_{symb}^{layer} = M_{symb}^{(0)}/3 = M_{symb}^{(1)}/4$ |
| 7 | 4 | $x^{(0)}(i) = d^{(0)}(i)$ <br> $x^{(1)}(i) = d^{(1)}(2i)$ <br> $x^{(2)}(i) = d^{(1)}(2i + 1)$ <br> $x^{(3)}(i) = d^{(2)}(2i)$ <br> $x^{(4)}(i) = d^{(2)}(2i + 1)$ <br> $x^{(5)}(i) = d^{(3)}(2i)$ <br> $x^{(6)}(i) = d^{(3)}(2i + 1)$ | $M_{symb}^{layer} = M_{symb}^{(0)} = M_{symb}^{(1)}/2 = M_{symb}^{(2)}/2 = M_{symb}^{(3)}/2$ |
| 8 | 2 | $x^{(0)}(i) = d^{(0)}(4i)$ <br> $x^{(1)}(i) = d^{(0)}(4i + 1)$ <br> $x^{(2)}(i) = d^{(0)}(4i + 2)$ <br> $x^{(3)}(i) = d^{(0)}(4i + 3)$ <br> $x^{(4)}(i) = d^{(1)}(4i)$ <br> $x^{(5)}(i) = d^{(1)}(4i + 1)$ <br> $x^{(6)}(i) = d^{(1)}(4i + 2)$ <br> $x^{(7)}(i) = d^{(1)}(4i + 3)$ | $M_{symb}^{layer} = M_{symb}^{(0)}/4 = M_{symb}^{(1)}/4$ |
| 8 | 4 | $x^{(0)}(i) = d^{(0)}(2i)$ <br> $x^{(1)}(i) = d^{(0)}(2i + 1)$ <br> $x^{(2)}(i) = d^{(1)}(2i)$ <br> $x^{(3)}(i) = d^{(1)}(2i + 1)$ <br> $x^{(4)}(i) = d^{(2)}(2i)$ <br> $x^{(5)}(i) = d^{(2)}(2i + 1)$ <br> $x^{(6)}(i) = d^{(3)}(2i)$ <br> $x^{(7)}(i) = d^{(3)}(2i + 1)$ | $M_{symb}^{layer} = M_{symb}^{(0)}/2 = M_{symb}^{(1)}/2 = M_{symb}^{(2)}/2 = M_{symb}^{(3)}/2$ |
| 9 | 2 | $x^{(0)}(i) = d^{(0)}(4i)$ <br> $x^{(1)}(i) = d^{(0)}(4i + 1)$ <br> $x^{(2)}(i) = d^{(0)}(4i + 2)$ <br> $x^{(3)}(i) = d^{(0)}(4i + 3)$ <br> $x^{(4)}(i) = d^{(1)}(5i)$ <br> $x^{(5)}(i) = d^{(1)}(5i + 1)$ <br> $x^{(6)}(i) = d^{(1)}(5i + 2)$ <br> $x^{(7)}(i) = d^{(1)}(5i + 3)$ <br> $x^{(8)}(i) = d^{(1)}(5i + 4)$ | $M_{symb}^{layer} = M_{symb}^{(0)}/4 = M_{symb}^{(1)}/5$ |
| 9 | 4 | $x^{(0)}(i) = d^{(0)}(2i)$ <br> $x^{(1)}(i) = d^{(0)}(2i + 1)$ <br> $x^{(2)}(i) = d^{(1)}(2i)$ <br> $x^{(3)}(i) = d^{(1)}(2i + 1)$ <br> $x^{(4)}(i) = d^{(2)}(2i)$ <br> $x^{(5)}(i) = d^{(2)}(2i + 1)$ <br> $x^{(6)}(i) = d^{(3)}(3i)$ <br> $x^{(7)}(i) = d^{(3)}(3i + 1)$ <br> $x^{(8)}(i) = d^{(3)}(3i + 2)$ | $M_{symb}^{layer} = M_{symb}^{(0)}/2 = M_{symb}^{(1)}/2 = M_{symb}^{(2)}/2 = M_{symb}^{(3)}/3$ |
| 10 | 2 | $x^{(0)}(i) = d^{(0)}(5i)$ <br> $x^{(1)}(i) = d^{(0)}(5i + 1)$ <br> $x^{(2)}(i) = d^{(0)}(5i + 2)$ <br> $x^{(3)}(i) = d^{(0)}(5i + 3)$ <br> $x^{(4)}(i) = d^{(0)}(5i + 4)$ <br> $x^{(5)}(i) = d^{(1)}(5i)$ <br> $x^{(6)}(i) = d^{(1)}(5i + 1)$ <br> $x^{(7)}(i) = d^{(1)}(5i + 2)$ <br> $x^{(8)}(i) = d^{(1)}(5i + 3)$ <br> $x^{(9)}(i) = d^{(1)}(5i + 4)$ | $M_{symb}^{layer} = M_{symb}^{(0)}/5 = M_{symb}^{(1)}/5$ |
| 10 | 4 | $x^{(0)}(i) = d^{(0)}(2i)$ <br> $x^{(1)}(i) = d^{(0)}(2i + 1)$ <br> $x^{(2)}(i) = d^{(1)}(2i)$ <br> $x^{(3)}(i) = d^{(1)}(2i + 1)$ | $M_{symb}^{layer} = M_{symb}^{(0)}/2 = M_{symb}^{(1)}/2 = M_{symb}^{(2)}/3 = M_{symb}^{(3)}/3$ |

TABLE 6-continued

| Number of layers | Number of codewords | Codeword-to-layer mapping $i = 0, 1, \ldots, M_{symb}^{layer} - 1$ | |
|---|---|---|---|
| | | $x^{(4)}(i) = d^{(2)}(3i)$ | |
| | | $x^{(5)}(i) = d^{(2)}(3i + 1)$ | |
| | | $x^{(6)}(i) = d^{(2)}(3i + 2)$ | |
| | | $x^{(7)}(i) = d^{(3)}(3i)$ | |
| | | $x^{(8)}(i) = d^{(3)}(3i + 1)$ | |
| | | $x^{(9)}(i) = d^{(3)}(3i + 2)$ | |
| 12 | 2 | $x^{(0)}(i) = d^{(0)}(6i)$ | $M_{symb}^{layer} = M_{symb}^{(0)}/6 = M_{symb}^{(1)}/6$ |
| | | $x^{(1)}(i) = d^{(0)}(6i + 1)$ | |
| | | $x^{(2)}(i) = d^{(0)}(6i + 2)$ | |
| | | $x^{(3)}(i) = d^{(0)}(6i + 3)$ | |
| | | $x^{(4)}(i) = d^{(0)}(6i + 4)$ | |
| | | $x^{(5)}(i) = d^{(0)}(6i + 5)$ | |
| | | $x^{(6)}(i) = d^{(1)}(6i)$ | |
| | | $x^{(7)}(i) = d^{(1)}(6i + 1)$ | |
| | | $x^{(8)}(i) = d^{(1)}(6i + 2)$ | |
| | | $x^{(9)}(i) = d^{(1)}(6i + 3)$ | |
| | | $x^{(10)}(i) = d^{(1)}(6i + 4)$ | |
| | | $x^{(11)}(i) = d^{(1)}(6i + 5)$ | |
| 12 | 4 | $x^{(0)}(i) = d^{(0)}(3i)$ | $M_{symb}^{layer} = M_{symb}^{(0)}/3 = M_{symb}^{(1)}/3 = M_{symb}^{(2)}/3 = M_{symb}^{(3)}/3$ |
| | | $x^{(1)}(i) = d^{(0)}(3i + 1)$ | |
| | | $x^{(2)}(i) = d^{(0)}(3i + 2)$ | |
| | | $x^{(3)}(i) = d^{(1)}(3i)$ | |
| | | $x^{(4)}(i) = d^{(1)}(3i + 1)$ | |
| | | $x^{(5)}(i) = d^{(1)}(3i + 2)$ | |
| | | $x^{(6)}(i) = d^{(2)}(3i)$ | |
| | | $x^{(7)}(i) = d^{(2)}(3i + 1)$ | |
| | | $x^{(8)}(i) = d^{(2)}(3i + 2)$ | |
| | | $x^{(9)}(i) = d^{(3)}(3i)$ | |
| | | $x^{(10)}(i) = d^{(3)}(3i + 1)$ | |
| | | $x^{(11)}(i) = d^{(3)}(3i + 2)$ | |
| 14 | 2 | $x^{(0)}(i) = d^{(0)}(7i)$ | $M_{symb}^{layer} = M_{symb}^{(0)}/7 = M_{symb}^{(1)}/7$ |
| | | $x^{(1)}(i) = d^{(0)}(7i + 1)$ | |
| | | $x^{(2)}(i) = d^{(0)}(7i + 2)$ | |
| | | $x^{(3)}(i) = d^{(0)}(7i + 3)$ | |
| | | $x^{(4)}(i) = d^{(0)}(7i + 4)$ | |
| | | $x^{(5)}(i) = d^{(0)}(7i + 5)$ | |
| | | $x^{(6)}(i) = d^{(0)}(7i + 6)$ | |
| | | $x^{(7)}(i) = d^{(1)}(7i)$ | |
| | | $x^{(8)}(i) = d^{(1)}(7i + 1)$ | |
| | | $x^{(9)}(i) = d^{(1)}(7i + 2)$ | |
| | | $x^{(10)}(i) = d^{(1)}(7i + 3)$ | |
| | | $x^{(11)}(i) = d^{(1)}(7i + 4)$ | |
| | | $x^{(12)}(i) = d^{(1)}(7i + 5)$ | |
| | | $x^{(13)}(i) = d^{(1)}(7i + 6)$ | |
| 14 | 4 | $x^{(0)}(i) = d^{(0)}(3i)$ | $M_{symb}^{layer} = M_{symb}^{(0)}/3 = M_{symb}^{(1)}/3 = M_{symb}^{(2)}/4 = M_{symb}^{(3)}/4$ |
| | | $x^{(1)}(i) = d^{(0)}(3i + 1)$ | |
| | | $x^{(2)}(i) = d^{(0)}(3i + 2)$ | |
| | | $x^{(3)}(i) = d^{(1)}(3i)$ | |
| | | $x^{(4)}(i) = d^{(1)}(3i + 1)$ | |
| | | $x^{(5)}(i) = d^{(1)}(3i + 2)$ | |
| | | $x^{(6)}(i) = d^{(2)}(4i)$ | |
| | | $x^{(7)}(i) = d^{(2)}(4i + 1)$ | |
| | | $x^{(8)}(i) = d^{(2)}(4i + 2)$ | |
| | | $x^{(9)}(i) = d^{(2)}(4i + 3)$ | |
| | | $x^{(10)}(i) = d^{(3)}(4i)$ | |
| | | $x^{(11)}(i) = d^{(3)}(4i + 1)$ | |
| | | $x^{(12)}(i) = d^{(3)}(4i + 2)$ | |
| | | $x^{(13)}(i) = d^{(3)}(4i + 3)$ | |
| . | . | . | . |
| . | . | . | . |
| . | . | . | . |

The "Number of codewords" column of Table 6 includes examples for 2 codewords and examples for 4 codewords. That is, the codeword-to-layer mapping rule according to the present invention may be applied to 2 or more codewords.

In addition, the value of the "Number of layers" column of Table 6 is defined as the product rank value (i.e., PRI or $RI_{ALL}$) according to the present invention. That is, the PRI value may have a value among 1, 2, 3, 4, 5, 6, 7, 8, 9, 10, 12, 14, 15, 16, 18, . . . 64, and does not have values of 11, 13, 17, 19, 23, . . . .

Although Table 6 exemplarily shows codeword-to-layer mapping rules for 2 CWs or 4 CWs only in the case of PRI≤14, the PRI value is not limited thereto and codeword-to-layer mapping rules for 2 or more codewords in the case of PRI=15, 16, 18, 20, 21, may be determined based on the same principle.

Furthermore, the present invention proposes a method for configuring the output of the layer mapper of FIG. 15 in the form of a matrix X(i) having a size of RI_H by RI_V instead of the form of a vector $x(i)=[x^{(0)}(i) \ldots x^{(r)}(i) \ldots x^{(\upsilon-1)}(i)]^T$.

The matrix layer domain X(i) according to the present invention may be expressed as given by Equation 10.

$$X(i) = \begin{bmatrix} x^{(0)}(i) & \cdots & x^{(RI_V-1)}(i) \\ x^{(RI_V)}(i) & \cdots & x^{(2RI_V-1)}(i) \\ \vdots & & \vdots \\ x^{((RI_H-1)RI_V)}(i) & \cdots & x^{(RI_H RI_V-1)}(i) \end{bmatrix} \quad \text{[Equation 10]}$$

Equation 10 may be understood as being equivalent to the vector $x(i)=[x^{(0)}(i) \ldots x^{(r)}(i) \ldots x^{(\upsilon-1)}(i)]^T$. $x(i)$ and $x(i)$ may have a relationship that $x(i)$ is achieved by vectorizing the matrix $X(i)$ in a row direction, i.e., $x(i)=\text{vec}(X(i))$.

Equation 10 is merely exemplary. The matrix $X(i)$ may be configured as a matrix having RI_H rows and RI_V columns, and thus the mapping relationship between the vector $x(i)$ and the matrix $X(i)$ may be defined differently.

In the precoding structure for 3D beamforming according to the proposal of the present invention, the precoding matrices V-PM and H-PM of FIG. 17 may be expressed as matrices $W_H(i)$ and $W_V(i)$, respectively. In addition, the precoding matrices $W_H(i)$ and $W_V(i)$ are multiplied in the front of and at the back of the matrix $X(i)$. Here, the precoding matrix multiplied at the back of the matrix $X(i)$ is transposable. The position where $W_H(i)$ and $W_V(i)$ are multiplied by $X(i)$ may vary depending on whether the matrix $X(i)$ is a matrix having a size of RI_H by RI_V or a matrix having a size of RI_V by RI_H.

For example, a block $y(i)$ of vectors may be defined as given by Equation 11.

$$y(i) = \begin{bmatrix} y^{(0)}(i) \\ \vdots \\ y^{(P-1)}(i) \end{bmatrix} = \text{vec}(Y(i)), \quad \text{[Equation 11]}$$

where $Y(i) = W_H(i) X(i) (W_V(i))^T$

In Equation 11, the precoding matrix $W_H(i)$ is a matrix having a size of L by RI_H, and the precoding matrix $W_V(i)$ is a matrix having a size of M by RI_V. P=L*M. In addition, $i=0, 1, \ldots, M_{symb}^{ap}-1$ and $M_{symb}^{ap}$ is the number of modulation symbols transmitted per antenna port on a physical channel.

Here, the positions of $W_H(i)$ and $W_V(i)$ and the positions of RI_H and RI_V may be switched. That is, although $W_H(i)$ is put at the position of a legacy precoding matrix for convenience of explanation in the above examples, since the H direction and the V direction are symmetrical to each other, related equations may be symmetrically modified according to which direction parameters are described first.

According to the structure in which the output of the layer mapper is configured in the form of the matrix $X(i)$ as given by Equation 10 instead of the form of a vector, and the precoding matrices $W_H(i)$ and $W_V(i)$ for 3D beamforming are multiplied in the front of/at the back of the matrix $X(i)$, various codeword-to-layer mapping rules proposed by the present invention may be easily expressed as equations. Furthermore, since each of the precoding matrices $W_H(i)$ and $W_V(i)$ is expressed as general matrix operation as given by Equation 11, compared to a method using a Kronecker product, individual characteristics of the precoding matrices may be analyzed and optimized and thus precoding matrices appropriate for more efficient UE operation may be easily designed.

In addition, to allow layer mapping and precoding to follow the codeword-to-layer mapping rule of Table 6 according to the structure proposed using Equation 10 and Equation 11, index r may be provided in a row first manner (e.g., Alt 1a of FIG. 20) in Equation 10.

Structure 2 may be a method for expressing each element of the output matrix $X(i)$ of the layer mapper as multiple index variables (e.g., $r_H$ and $r_V$).

According to structure 2, the output matrix $X(i)$ of the layer mapper may be expressed as given by Equation 12.

$$X(i) = \begin{bmatrix} & \vdots & \\ \cdots & x^{(r_H, r_V)}(i) & \cdots \\ & \vdots & \end{bmatrix} = \quad \text{[Equation 12]}$$

$$\begin{bmatrix} x^{(0,0)}(i) & \cdots & x^{(0,RI_V-1)}(i) \\ x^{(1,0)}(i) & \cdots & x^{(1,RI_V-1)}(i) \\ \vdots & & \vdots \\ x^{(RI_H-1,0)}(i) & \cdots & x^{(RI_H-1,RI_V-1)}(i) \end{bmatrix}$$

In Equation 12, $r_H=0, 1, \ldots, RI\_H-1$, and $r_V=0, 1, \ldots, RI\_V-1$.

Even when $X(i)$ is expressed as given by Equation 12, Equation 11 and the description related thereto may be equally applied.

In addition, various codeword-to-layer mapping rules proposed by the present invention may be applied to each element of $X(i)$ expressed as given by Equation 12. For example, the codeword-to-layer mapping rule for spatial multiplexing shown in Table 4 may be newly defined as shown in Table 7.

TABLE 7

| Number of layers | Number of codewords | Codeword-to-layer mapping $i = 0, 1, \ldots, M_{symb}^{layer} - 1$ | |
|---|---|---|---|
| $\upsilon$ ($\geq 2$) | 2 | Set k = 0<br>for $r_H$ = 0 to $RI_H - 1$<br>  for $r_V$ = 0 to $RI_V - 1$<br>    if k < $\lfloor \upsilon/2 \rfloor$<br>      $x^{(r_H, r_V)}(i) = d^{(0)}(\lfloor \upsilon/2 \rfloor i + k)$<br>    else<br>      $x^{(r_H, r_V)}(i) = d^{(1)}((\upsilon - \lfloor \upsilon/2 \rfloor)i + k - \lfloor \upsilon/2 \rfloor)$<br>    end<br>    k = k + 1<br>  end<br>end | $M_{symb}^{layer} = M_{symb}^{(0)}/\lfloor \upsilon/2 \rfloor =$<br>$M_{symb}^{(1)}/(\upsilon - \lfloor \upsilon/2 \rfloor)$ |
| $\upsilon$ ($\geq 4$) | 4 | Set k = 0<br>for $r_H$ = 0 to $RI_H - 1$<br>  for $r_V$ = 0 to $RI_V - 1$ | $M_{symb}^{layer} = M_{symb}^{(0)}/\lfloor \upsilon/4 \rfloor =$<br>$M_{symb}^{(1)}/(\lfloor \upsilon/2 \rfloor - \lfloor \upsilon/4 \rfloor) =$<br>$M_{symb}^{(2)}/(\lfloor 3\upsilon/4 \rfloor - \lfloor \upsilon/2 \rfloor) =$ |

TABLE 7-continued

| Number of layers | Number of codewords | Codeword-to-layer mapping $i = 0, 1, \ldots, M_{symb}^{layer} - 1$ | |
|---|---|---|---|
| | | if $k < \lfloor v/4 \rfloor$<br>  $x^{(r_H, r_V)}(i) = d^{(0)}(\lfloor v/4 \rfloor i + k)$<br>else if $\lfloor v/4 \rfloor \leq k < \lfloor v/2 \rfloor$<br>  $x^{(r_H, r_V)}(i) = d^{(1)}((\lfloor v/2 \rfloor - \lfloor v/4 \rfloor)i + k - \lfloor v/4 \rfloor)$<br>else if $\lfloor v/2 \rfloor \leq k < \lfloor 3v/4 \rfloor$<br>  $x^{(r_H, r_V)}(i) = d^{(2)}((\lfloor 3v/4 \rfloor - \lfloor v/2 \rfloor)i + k - \lfloor v/2 \rfloor)$<br>else<br>  $x^{(r_H, r_V)}(i) = d^{(3)}((v - \lfloor 3v/4 \rfloor)i + k - \lfloor 3v/4 \rfloor)$<br>end<br>    $k = k + 1$<br>  end<br>end | $M_{symb}^{(3)}/(v - \lfloor 3v/4 \rfloor)$ |

The "Number of codewords" column of Table 7 includes examples for 2 codewords and examples for 4 codewords as in FIG. 22 or FIG. 23. That is, the codeword-to-layer mapping rule according to the present invention may be applied to multiple (2 or more) codewords (e.g., N CWs) as shown in Table 7.

In addition, the "Number of layers" column of Table 7 corresponds to a product rank (or $RI_{ALL}$) value defined by the present invention, is defined as $v=RI_{ALL}=RI\_V*RI\_H$, and thus may have a value among 1, 2, 3, 4, 5, 6, 7, 8, 9, 10, 12, 14, 15, 16, 18, . . . , 64. Here, it should be noted that values of 11, 13, 17, 19, 23, . . . are not allowed in the above example.

Furthermore, although Table 7 shows only the case of initial transmission, the description exemplarily given above in relation to FIG. 21 or Table 6 may be applied equally or through index modification to 1 layer transmission or retransmission.

Besides, FIG. 21 or Table 6 exemplarily shows that, when 4 CWs are initially transmitted and then some codewords are retransmitted (or only some of the 4 CWs are enabled and the others are disabled), only 1 codeword is retransmitted (or only 1 codeword is enabled). However, the present invention is not limited thereto. 2 CWs may be retransmitted (or only 2 codewords may be enabled), 3 CWs may be retransmitted (or only 3 codewords may be enabled), and information thereof may be indicated using scheduling information for retransmission (i.e., scheduling information through DCI signaling).

As such, if it is assumed that N codewords are initially transmitted and then some or all of the N codewords are retransmitted (or only ≤N codeword(s) are enabled and the other codeword(s) are disabled), the eNB may trigger retransmission of selective codewords (or transmission of enabled codewords) through ≤N pieces of scheduling information (e.g., DCI signaling). To this end, a mapping table for providing information such as the number of layers, the number of DMRS ports, and scrambling identifier information (e.g., nSCID) may be defined in a DCI format. For a case in which only k (k=<N) codewords among the N codewords are enabled and N−k codewords are disabled, mapping tables separately defined for values of k (e.g., 1, 2, . . . , N) may be predefined between the eNB and the UE, or the eNB may signal information indicating that a specific table is used, to the UE through higher layer signaling.

Table 7 corresponds to the example of Option 1a of FIG. 18 among various codeword-to-layer mapping rules proposed by the present invention. The codeword-to-layer mapping rule according to Option 2a of FIG. 18 may be expressed as shown in Table 8.

TABLE 8

| Number of layers | Number of codewords | Codeword-to-layer mapping $i = 0, 1, \ldots, M_{symb}^{layer} - 1$ | |
|---|---|---|---|
| $v$ (≥2) | 2 | Set $k = 0$<br>for $r_V = 0$ to $RI_V - 1$<br>  for $r_H = 0$ to $RI_H - 1$<br>    if $k < \lfloor v/2 \rfloor$<br>      $x^{(r_H, r_V)}(i) = d^{(0)}(\lfloor v/2 \rfloor i + k)$<br>    else<br>      $x^{(r_H, r_V)}(i) = d^{(1)}((v - \lfloor v/2 \rfloor)i + k - \lfloor v/2 \rfloor)$<br>    end<br>    $k = k + 1$<br>  end<br>end | $M_{symb}^{layer} = M_{symb}^{(0)}/\lfloor v/2 \rfloor =$<br>$M_{symb}^{(1)}/(v - \lfloor v/2 \rfloor)$ |
| $v$ (≥4) | 4 | Set $k = 0$<br>for $r_V = 0$ to $RI_V - 1$<br>  for $r_H = 0$ to $RI_H - 1$<br>    if $k < \lfloor v/4 \rfloor$<br>      $x^{(r_H, r_V)}(i) = d^{(0)}(\lfloor v/4 \rfloor i + k)$<br>    else if $\lfloor v/4 \rfloor \leq k < \lfloor v/2 \rfloor$<br>      $x^{(r_H, r_V)}(i) = d^{(1)}((\lfloor v/2 \rfloor - \lfloor v/4 \rfloor)i + k - \lfloor v/4 \rfloor)$<br>    else if $\lfloor v/2 \rfloor \leq k < \lfloor 3v/4 \rfloor$<br>      $x^{(r_H, r_V)}(i) = d^{(2)}((\lfloor 3v/4 \rfloor - \lfloor v/2 \rfloor)i + k - \lfloor v/2 \rfloor)$<br>    else<br>      $x^{(r_H, r_V)}(i) = d^{(3)}((v - \lfloor 3v/4 \rfloor)i + k - \lfloor 3v/4 \rfloor)$ | $M_{symb}^{layer} = M_{symb}^{(0)}/\lfloor v/4 \rfloor =$<br>$M_{symb}^{(1)}/(\lfloor v/2 \rfloor - \lfloor v/4 \rfloor) =$<br>$M_{symb}^{(2)}/(\lfloor 3v/4 \rfloor - \lfloor v/2 \rfloor) =$<br>$M_{symb}^{(3)}/(v - \lfloor 3v/4 \rfloor)$ |

TABLE 8-continued

| Number of layers | Number of codewords | Codeword-to-layer mapping $i = 0, 1, \ldots, M_{symb}^{layer} - 1$ |
|---|---|---|
| | | end<br>k = k + 1<br>end<br>end |

When Table 7 and Table 8 are compared, it is shown that Table 8 is configured by changing the order of for loop syntax elements for RI_H and RI_V of Table 7.

In addition, to apply the codeword-to-layer mapping rule according to Option 1b or Option 2b of FIG. 19, modulo operation may be used as given by Equation 13.

$$x^{(rH,rV)}(i) = d^{(mod(rH+rV,2))}(ai+b) \quad \text{[Equation 13]}$$

In Equation 13, parameters a and b may be configured as appropriate parameters for indexes to apply the algorithm of Table 7 or Table 8. That is, Equation 13 is merely exemplary and the scope of the present invention may include various modifications using a function such as module operation to alternately map CW1 and CW2 in a layer domain 2D matrix as in Option 1b or Option 2b of FIG. 19.

The codeword-to-layer mapping rules according to Option 1 and Option 2 of FIG. 17 may be expressed as shown in Table 9 and Table 10, respectively.

In addition, Option 1 and Option 2 of <FIG. 17> may be described as shown in <Table 9> and <Table 10>, respectively

TABLE 9

| Number of layers | Number of codewords | Codeword-to-layer mapping $i = 0, 1, \ldots, M_{symb}^{layer} - 1$ | |
|---|---|---|---|
| $\upsilon$ ($\geq$2) | 2 | Set k = 0<br>for $r_H$ = 0 to $RI_H$ - 1<br>  for $r_V$ = 0 to $RI_V$ - 1<br>    if k < $RI_V \lfloor RI_H/2 \rfloor$<br>      $x^{(rH,rV)}(i) = d^{(0)}(RI_V \lfloor RI_H/2 \rfloor i + k)$<br>    else<br>      $x^{(rH,rV)}(i) = d^{(1)}((\upsilon - RI_V \lfloor RI_H/2 \rfloor)i + k - RI.$<br>    end<br>    k = k + 1<br>  end<br>end | $M_{symb}^{layer} = M_{symb}^{(0)}/(RI_V \lfloor RI_H/2 \rfloor) =$<br>$M_{symb}^{(1)}/(\upsilon - RI_V \lfloor RI_H/2 \rfloor)$ |
| $\upsilon$ ($\geq$4) | 4 | Set k = 0<br>for $r_H$ = 0 to $RI_H$ - 1<br>  for $r_V$ = 0 to $RI_V$ - 1<br>    if k < $RI_V \lfloor RI_H/4 \rfloor$<br>      $x^{(rH,rV)}(i) = d^{(0)}(RI_V \lfloor RI_H/4 \rfloor i + k)$<br>    else if $RI_V \lfloor RI_H/4 \rfloor \leq k < RI_V \lfloor RI_H/2 \rfloor$<br>      $x^{(rH,rV)}(i) = d^{(1)}((RI_V \lfloor RI_H/2 \rfloor - RI_V \lfloor RI_H/4 \rfloor)i + k - RI_V \lfloor RI_H/4 \rfloor)$<br>    else if $RI_V \lfloor RI_H/2 \rfloor \leq k < RI_V \lfloor 3RI_H/4 \rfloor$<br>      $x^{(rH,rV)}(i) = d^{(2)}((RI_V \lfloor 3RI_H/4 \rfloor - RI_V \lfloor RI_H/2 \rfloor)i + k - RI_V \lfloor RI_H/2 \rfloor)$<br>    else<br>      $x^{(rH,rV)}(i) = d^{(3)}((\upsilon - RI_V \lfloor 3RI_H/4 \rfloor)i + k - RI_V \lfloor 3RI_H/4 \rfloor)$<br>    end<br>    k = k + 1<br>  end<br>end | $M_{symb}^{layer} = M_{symb}^{(0)}/(RI_V \lfloor RI_H/4 \rfloor) =$<br>$M_{symb}^{(1)}/(RI_V \lfloor RI_H/2 \rfloor - RI_V \lfloor RI_H/4 \rfloor) =$<br>$M_{symb}^{(2)}/(RI_V \lfloor 3RI_H/4 \rfloor - RI_V \lfloor RI_H/2 \rfloor) =$<br>$M_{symb}^{(3)}/(\upsilon - RI_V \lfloor 3RI_H/4 \rfloor)$ |

TABLE 10

| Number of layers | Number of codewords | Codeword-to-layer mapping $i = 0, 1, \ldots, M_{symb}^{layer} - 1$ | |
|---|---|---|---|
| $\upsilon$ ($\geq$2) | 2 | Set k = 0<br>for $r_V$ = 0 to $RI_V$ - 1<br>  for $r_H$ = 0 to $RI_H$ - 1<br>    if k < $RI_H \lfloor RI_V/2 \rfloor$<br>      $x^{(rH,rV)}(i) = d^{(0)}(RI_H \lfloor RI_V/2 \rfloor i + k)$<br>    else<br>      $x^{(rH,rV)}(i) = d^{(1)}((\upsilon - RI_H \lfloor RI_V/2 \rfloor)i + k - RI_1$<br>    end<br>    k = k + 1<br>  end<br>end | $M_{symb}^{layer} = M_{symb}^{(0)}/(RI_H \lfloor RI_V/2 \rfloor) =$<br>$M_{symb}^{(1)}/(\upsilon - RI_H \lfloor RI_V/2 \rfloor)$ |
| $\upsilon$ ($\geq$4) | 4 | Set k = 0<br>for $r_V$ = 0 to $RI_V$ - 1<br>  for $r_H$ = 0 to $RI_H$ - 1<br>    if k < $RI_H \lfloor RI_V/4 \rfloor$<br>      $x^{(rH,rV)}(i) = d^{(0)}(RI_H \lfloor RI_V/4 \rfloor i + k)$ | $M_{symb}^{layer} = M_{symb}^{(0)}/(RI_H \lfloor RI_V/4 \rfloor) =$<br>$M_{symb}^{(1)}/(RI_H \lfloor RI_V/2 \rfloor - RI_H \lfloor RI_V/4 \rfloor) =$<br>$M_{symb}^{(2)}/(RI_H \lfloor 3RI_V/4 \rfloor - RI_H \lfloor RI_V/2 \rfloor) =$<br>$M_{symb}^{(3)}/(\upsilon - RI_H \lfloor 3RI_V/4 \rfloor)$ |

TABLE 10-continued

| Number of layers | Number of codewords | Codeword-to-layer mapping $i = 0, 1, \ldots, M_{symb}^{layer} - 1$ |
|---|---|---|
| | | else if $RI_H \lfloor RI_V/4 \rfloor \le k < RI_H \lfloor RI_V/2 \rfloor$<br>    $x^{(rH,rV)}(i) = d^{(1)}((RI_H \lfloor RI_V/2 \rfloor - RI_H \lfloor RI_V/4 \rfloor)i + k - RI_H \lfloor RI_V/4 \rfloor)$<br>else if $RI_H \lfloor RI_V/2 \rfloor \le k < RI_H \lfloor 3RI_V/4 \rfloor$<br>    $x^{(rH,rV)}(i) = d^{(2)}((RI_H \lfloor 3RI_V/4 \rfloor - RI_H \lfloor RI_V/2 \rfloor)i + k - RI_H \lfloor RI_V/2 \rfloor)$<br>else<br>    $x^{(rH,rV)}(i) = d^{(3)}((\upsilon - RI_H \lfloor 3RI_V/4 \rfloor)i + k - RI_H \lfloor 3RI_V/4 \rfloor)$<br>end<br>k = k + 1<br>end<br>end |

In addition, like the method for dividing the layer domain 2D matrix in a grid structure and mapping divided elements to N codewords (e.g., N=4) according to Option 3 of FIG. 17, Table 9 or Table 10 may be generalized and thus $r_H$ and $r_V$ indexes may be expressed using an indexing and loop structure to divide the layer domain 2D matrix in the grid structure.

The above precoding structure and the codeword-to-layer mapping method for 3D beamforming (or 3D MIMO) based on a 2D antenna array, which are proposed by the present invention, may be summarized as described below.

For example, when the codeword-to-layer mapping rule according to Option 1 of FIG. 17 (or Table 9) is applied, the H direction may be expressed as having "evenly distributed" characteristics for mapping multiple CWs (e.g., CW0 and CW1) to as equal numbers of layer(s) as possible, and the V direction may be expressed as having "one-to-all" characteristics for mapping all layers to one codeword. Here, the evenly distributed characteristics mean that equal numbers of layers are mapped to codewords when an even number of layers are mapped to an even number of codewords in a distributed manner, or mean that the difference between the number of layers mapped to one codeword and the number of layers mapped to another codeword is equal to or less than 1 (i.e., 0 or 1) when the number of layers or the number of codewords is an odd number.

That is, multiple transmission beams of the H direction are as evenly distributed as possible to multiple codewords in the H dimension. For example, among N transmission beams in the H direction, k transmission beams may be used to transmit CW0 and the other N-k transmission beams may be used to transmit CW1. In addition, all of multiple transmission beams of the V direction may be used to transmit one codeword in the V dimension.

For example, when the codeword-to-layer mapping rule according to Option 2 of FIG. 17 (or Table 10) is applied, the V direction may be expressed as having "evenly distributed" characteristics for mapping multiple CWs (e.g., CW0 and CW1) to as equal numbers of layer(s) as possible, and the H direction may be expressed as having "one-to-all" characteristics for mapping all layers to one codeword.

That is, multiple transmission beams of the V direction are as evenly distributed as possible to multiple codewords in the V dimension. For example, among N transmission beams in the V direction, k transmission beams may be used to transmit CW0 and the other N-k transmission beams may be used to transmit CW1. In addition, all of multiple transmission beams of the H direction may be used to transmit one codeword in the H dimension.

In overall consideration of the above-described characteristics, the codeword-to-layer mapping rule according to the proposal of the present invention may be generally express as described below. Multiple layer elements of a first dimension are mapped to multiple codewords to be as evenly distributed as possible, and multiple layer elements of a second dimension are mostly mapped to one codeword.

As such, the codeword-to-layer mapping rule according to Option 1 of FIG. 17 is expressed as described below. Multiple layer elements of a first dimension (the H direction in this example) are mapped to multiple codewords to be as evenly distributed as possible. Multiple layer elements of a second dimension (the V direction in this example) are all mapped to one codeword.

The codeword-to-layer mapping rule according to Option 2 of FIG. 17 is expressed as described below. Multiple layer elements of a first dimension (the V direction in this example) are mapped to multiple codewords to be as evenly distributed as possible. Multiple layer elements of a second dimension (the H direction in this example) are all mapped to one codeword.

The characteristics of the above-described codeword-to-layer mapping rules may be expressed as applying of different codeword-to-layer mapping rules to 2 different dimensions (e.g., the H direction and the V direction) which are totally symmetrical to each other in the antenna domain.

The codeword-to-layer mapping rule according to Option 1a of FIG. 18 is expressed as described below. Multiple layer elements of a first dimension (the H direction in this example) are mapped to multiple codewords to be as evenly distributed as possible. Multiple layer elements of a second dimension (the V direction in this example) may be mapped to one codeword (e.g., first mapping type) or mapped to multiple codewords to be as evenly distributed as possible (e.g., second mapping type). Here, the number of cases of the first mapping type is greater than the number of cases of the second mapping type (or only one case follows the second mapping type, and the other cases follow the first mapping type). Here, a sum of the number of cases of the first mapping type and the number of cases of the second mapping type equals the number of elements of the first dimension.

The codeword-to-layer mapping rule according to Option 2a of FIG. 18 is expressed as described below. Multiple layer elements of a first dimension (the V direction in this example) are mapped to multiple codewords to be as evenly distributed as possible. Multiple layer elements of a second dimension (the H direction in this example) may be mapped to one codeword (e.g., first mapping type) or mapped to multiple codewords to be as evenly distributed as possible (e.g., second mapping type). Here, the number of cases of the first mapping type is greater than the number of cases of the second mapping type (or only one case follows the second mapping type, and the other cases follow the first mapping type). Here, a sum of the number of cases of the first mapping type and the number of cases of the second mapping type equals the number of elements of the first dimension.

Additionally, the codeword-to-layer mapping rule according to the present invention may be defined to map all of the multiple layer elements of the second dimension to one codeword in the case of codeword retransmission (or enabling of some of multiple codewords and disabling of the other codewords). Unlike the codeword-to-layer mapping rule of a legacy wireless communication system (e.g., FIG. 16) which follows the "evenly distributed" mapping scheme for initial transmission but follows the "one-to-all" mapping scheme for retransmission (or enabling of only one codeword), the present invention follows the "one-to-all" codeword-to-layer mapping rule for both initial transmission and retransmission in a second dimension.

Furthermore, although the above-described embodiments of the present invention assume two spatial dimensions such as the H direction and the V direction, the scope of the present invention is not limited to the number of dimensions. That is, the principle proposed by the present invention may be equally applied to 3 or more dimensions. For example, multiple CWs may be mapped to multiple layers to be as evenly distributed as possible only in a specific dimension among D (D>=2) dimensions, and multiple layers may be mostly mapped to one CW in the other D−1 dimensions. Alternatively, multiple CWs may be mapped to multiple layers to be as evenly distributed as possible only in a specific dimension among D (D>=2) dimensions, and multiple layers may be mostly mapped to one CW only in a specific dimension among the other D−1 dimensions.

In addition, the above-described codeword-to-layer mapping rule may be used to calculate CQI for 3D beamforming (that is, CQI may be calculated using an average of SINR values corresponding to layer elements mapped to one codeword).

The above-described proposal of the present invention may be equally or similarly extended to another reference signal (e.g., CRS, SRS, tracking RS (TRS), or DMRS) subject to CSI measurement for the above L*M panel antenna capable of 3D beamforming, or another type of cell-specific or UE-specific reference signal.

Figure 24:
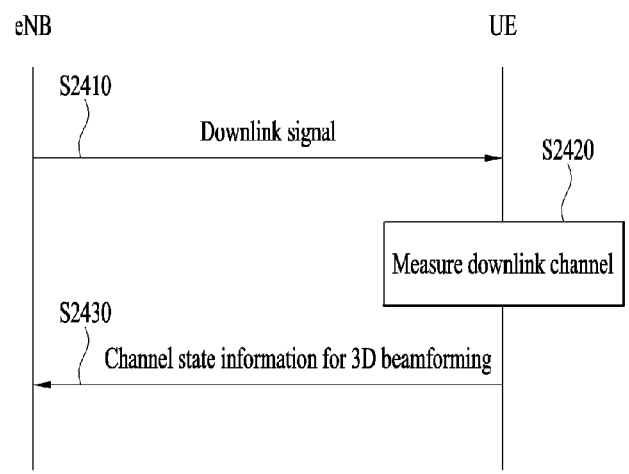
FIG. 24 is a diagram for describing a method for transmitting and receiving channel state information (CSI) according to an embodiment of the present invention.

FIG. 24 is a diagram for describing a method for transmitting and receiving channel state information (CSI) according to an embodiment of the present invention.

In step S2410, an eNB may transmit a downlink signal (e.g., a downlink reference signal) used to measure a downlink channel, to a UE, and the UE may receive the same.

In step S2420, the UE may measure the downlink channel using the downlink signal. The UE may determine and/or calculate CSI for 3D beamforming, based on the measured downlink channel. For example, the UE may determine rank values (e.g., RI_H and RI_V) appropriate for multiple dimensions (e.g., the H direction and the V direction) based on a product rank, respectively. Furthermore, the UE may determine an optimal total precoding matrix $P_{MALL}$ based on the determined product rank, and determine PMIs (e.g., PMI_H and PMI_V) of the dimensions in this case. In addition, the UE may determine CQIs (e.g., CQI_H and CQI_V) for the dimensions, or a total CQI. Here, according to a codeword-to-layer mapping rule, the UE may determine layer(s) mapped to each codeword, and determine CQI appropriate for the codeword using an average of SINR values of the layer(s).

In step S2430, the UE may report CSI (e.g., one or more of RI_H, RI_V, PMI_H, PMI_V, and CQI (CQI_H, CQI_V and/or $CQI_{ALL}$)) for 3D beamforming, to the eNB. CSI reporting may be performed in a periodic or aperiodic manner.

Although the exemplary method of FIG. 24 is described as a series of steps for brevity of explanation, the above description does not limit the order of those steps and some or all of the steps may be performed simultaneously or in different orders as necessary. In addition, not all steps of FIG. 24 are inevitably necessary to implement the method proposed by the present invention.

In the above-described method of the present invention, the descriptions given in the above embodiments of the present invention may be applied independently or in combination.

Figure 25:
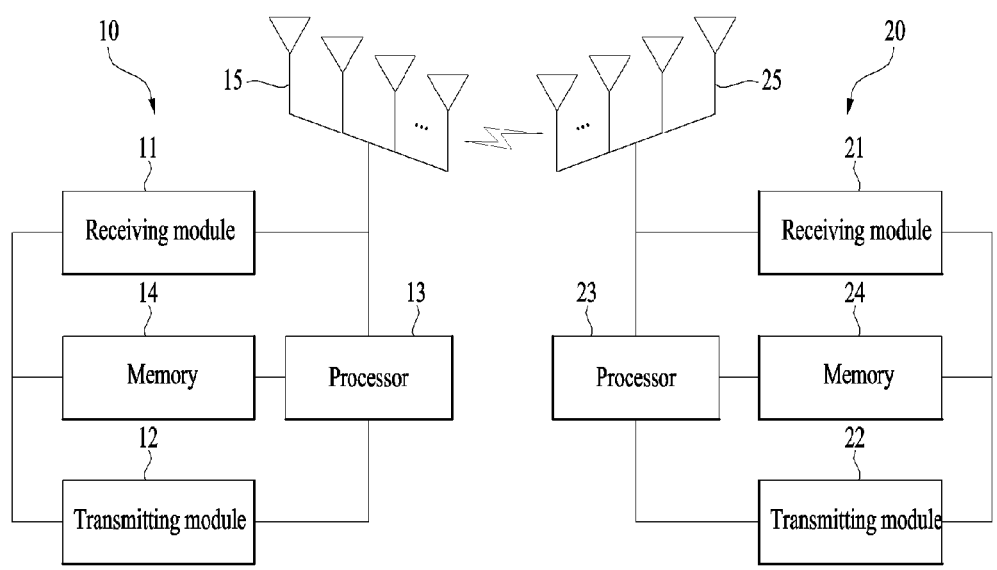
FIG. 25 is a block diagram of a user equipment (UE) and a base station according to an embodiment of the present invention.

FIG. 25 is a block diagram of a UE 20 and a base station 10 according to an embodiment of the present invention.

Referring to FIG. 25, the base station 10 according to the present invention may include a transmitter 11, a receiver 12, a processor 13, a memory 14 and multiple antennas 15. The transmitter 11 may transmit a variety of signals, data and information to an external device (e.g., UE). The receiver 12 may receive a variety of signals, data and information from an external device (e.g., UE). The processor 13 may provide overall control to the base station 10. The multiple antennas 15 may be configured based on, for example, a 2D antenna array.

The processor 13 of the base station 10 according to an embodiment of the present invention may be configured to receive CSI based on the proposals of the present invention. Furthermore, the processor 13 of the base station 10 may process information received and to be transmitted by the base station 10, and the memory 14 may store the processed information for a predetermined time and is replaceable by another component such as a buffer (not shown).

Referring to FIG. 25, the UE 20 according to the present invention may include a transmitter 21, a receiver 22, a processor 23, a memory 24 and multiple antennas 25. The multiple antennas 25 refer to a device supporting MIMO transmission/reception. The transmitter 21 may transmit a variety of signals, data and information to an external device (e.g., base station). The receiver 22 may receive a variety of signals, data and information from an external device (e.g., base station). The processor 23 may provide overall control to the UE 20.

The processor 23 of the UE 20 according to an embodiment of the present invention may be configured to transmit CSI based on the proposals of the present invention. Furthermore, the processor 23 of the UE 20 may process information received and to be transmitted by the UE 20, and the memory 24 may store the processed information for a predetermined time and is replaceable by another component such as a buffer (not shown).

The above configuration of the UE 20 may be implemented in such a manner that the above-described embodiments of the present invention are applied independently or two or more embodiments are simultaneously applied thereto, and repeated descriptions thereof are not given here for clarity.

A base station is exemplified as a downlink transmission entity or an uplink reception entity and a UE is exemplified as a downlink reception entity or an uplink transmission entity to describe the embodiments of the present invention, but the scope of the present invention is not limited thereto. For example, the description of the base station may be equally applied to a case in which a cell, an antenna port, an antenna port group, an RRH, a transmission point, a reception point, an access point or a relay serves as an entity of downlink transmission to the UE or an entity of uplink reception from the UE. In addition, the principle of the present invention described through various embodiments may be equally applied to a case in which a relay serves as an entity of downlink transmission to the UE or an entity of uplink reception from the UE or a case in which a relay serves as an entity of uplink transmission to the base station or an entity of downlink reception from the base station.

The above-described embodiments of the present invention may be implemented by various means, for example, hardware, firmware, software, or a combination thereof.

In a hardware configuration, the methods according to embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to embodiments of the present invention may be implemented in the form of modules, procedures, functions, etc. for performing the above-described functions or operations. Software code may be stored in a memory unit and executed by a processor. The memory unit may be located inside or outside the processor and exchange data with the processor via various known means.

The detailed descriptions of the preferred embodiments of the present invention have been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

Although a method for reporting channel state information (CSI) for 3-dimensional (3D) beamforming in a wireless communication system, and an apparatus therefor according to the present invention are applied to a 3GPP LTE system in the above description, the method and apparatus are also applicable to a variety of wireless communication systems other than the 3GPP LTE system.

The invention claimed is:

1. A method for transmitting channel state information (CSI) for 3-dimensional multi-input multi-output (3D-MIMO) beamforming by a user equipment (UE) in a wireless communication system, the method comprising:
receiving a reference signal from a base station supporting a 2-dimensional (2D) antenna array;
determining the CSI using the reference signal; and
transmitting the determined CSI to the base station,
wherein the CSI comprises a channel quality indicator (CQI),
wherein the CQI is determined using a codeword-to-layer mapping rule,
wherein a codeword-to-layer mapping rule for a first dimension is different from a codeword-to-layer mapping rule for a second dimension,
wherein the first dimension and the second dimension each correspond to a horizontal or vertical direction in the 2D antenna array,
wherein the codeword-to-layer mapping rule for the first dimension is defined to map multiple layers of the first dimension to multiple codewords to be as evenly distributed as possible,
wherein the codeword-to-layer mapping rule for the second dimension is defined to comprise a first mapping type for mapping all of multiple layers of the second dimension to one codeword, and a second mapping type for mapping multiple layers of the second dimension to multiple codewords to be as evenly distributed as possible,
wherein a number of cases of the first mapping type is greater than a number of cases of the second mapping type, and
wherein a sum of the number of cases of the first mapping type and the number of cases of the second mapping type equals a number of the multiple layers of the first dimension.

2. The method according to claim 1, wherein the number of cases of the second mapping type is 1.

3. The method according to claim 1, wherein, according to the codeword-to-layer mapping rule for the first dimension and the codeword-to-layer mapping rule for the second dimension, a CQI for one codeword is calculated using an average of signal-to-interference plus noise ratio (SINR) values of multiple layers corresponding to the one codeword.

4. The method according to claim 1, wherein multiple CQIs are determined based on a plurality of candidates of the codeword-to-layer mapping rule, and
wherein the CSI comprises the multiple CQIs and is transmitted.

5. The method according to claim 4, wherein, when periodic CSI feedback is applied, the multiple CQIs are transmitted at different transmission timings.

6. The method according to claim 1, wherein one CQI is determined based on a plurality of candidates of the codeword-to-layer mapping rule, and
wherein the CSI comprising the CQI is transmitted.

7. The method according to claim 1, wherein information indicating the codeword-to-layer mapping rule is provided from the base station to the UE through higher layer signaling or dynamic signaling.

8. The method according to claim 7, wherein the dynamic signaling comprises information for triggering aperiodic CSI transmission.

9. A user equipment (UE) for transmitting channel state information (CSI) for 3-dimensional multi-input multi-output (3D-MIMO) beamforming in a wireless communication system, the UE comprising:
a transmission module;
a reception module; and
a processor,
wherein the processor is configured to:
control the reception module to receive a reference signal from a base station supporting a 2-dimensional (2D) antenna array,
determine the CSI using the reference signal, and
control the transmission module to transmit the determined CSI to the base station,
wherein the CSI comprises a channel quality indicator (CQI),
wherein the CQI is determined using a codeword-to-layer mapping rule,
wherein a codeword-to-layer mapping rule for a first dimension is different from a codeword-to-layer mapping rule for a second dimension, wherein the first dimension and the second dimension each correspond to a horizontal or vertical direction in the 2D antenna array, wherein the codeword-to-layer mapping rule for the first dimension is defined to map multiple layers of the first dimension to multiple codewords to be as evenly distributed as possible, wherein the codeword-to-layer mapping rule for the second dimension is defined to comprise a first mapping type for mapping all of multiple layers of the second dimension to one codeword, and a second mapping type for mapping multiple layers of the second dimension to multiple codewords to be as evenly distributed as possible, wherein a number of cases of the first mapping type is greater than a number of cases of the second mapping type, and wherein a sum of the number of cases of the first mapping type and the number of cases of the second mapping type equals a number of the multiple layers of the first dimension.

\* \* \* \* \*